United States Patent

Jezioranski et al.

[15] 3,636,263

[45] Jan. 18, 1972

[54] TELEPHONE SWITCHING SYSTEM

[72] Inventors: Joseph S. Jezioranski, Stittsville, Ontario; Robert Kenedi; Real Gagnier, both of Ottawa, Ontario, all of Canada

[73] Assignee: Northern Electric Company Limited, Montreal, Quebec, Canada

[22] Filed: Dec. 17, 1968

[21] Appl. No.: 785,072

[30] Foreign Application Priority Data

Oct. 31, 1968 Canada ..................................034044

[52] U.S. Cl. ..........................................................179/18 E
[51] Int. Cl. .........................................................H04q 3/42
[58] Field of Search .........................179/18 EA, 18 EB, 18 E

[56] References Cited

UNITED STATES PATENTS 2,966,551 12/1960 Lomax.............................179/18 F X
3,303,288 2/1967 Wirsing ...........................179/18 EA

*Primary Examiner*—William C. Cooper
*Attorney*—Curphey & Erickson

[57] ABSTRACT

A telephone switching office with a unique arrangement of path interconnections wherein originating junctors and incoming trunks enter one side of a route network, and terminating junctors and terminating trunks leave the other side of the route network. Both types of junctors are connected to a line circuit switching network. This structure allows the concentrating of service circuits which are connected to a service network. The service network interfaces the originating junctors, allowing line access to the service circuits without need to set up a path through the route network.

30 Claims, 31 Drawing Figures

INVENTORS
J. S. JEZIORANSKI
R. GAGNIER
R. KENEDI
BY Carphey + Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey + Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS

PATENTED JAN 18 1972

3,636,263

SHEET 08 OF 22

INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey + Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS

PATENTED JAN 18 1972 3,636,263

SHEET 18 OF 22

INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS INVENTORS
J. S. JEZIORANSKI
R. GAGNIER
R. KENEDI
BY Curphey & Erickson
PATENT AGENTS

CONTENTS OF REGISTER

| | Z | Y | X |
|---|---|---|---|
| START + 0 | EQDT | START + 20 | - |
| START + 1 | SCAN | START + 19 | DR, 11, 00 |
| START + 2 | SDIST | – | 0, DR, A |
| START + 3 | NEXT | START + 19 | – |
| START + 4 | SCAN | START + 19 | DR, 11, 01 |
| START + 19 | LINK SC | – | TR LIST |
| START + 20 | CGL IDLE | – | – |
| START + 21 | CLUCR | – | – |

INVENTORS
J. S. JEZIORANSKI
R. GAGNIER
R. KENEDI
BY *Curphey & Erickson*
PATENT AGENTS

TELEPHONE SWITCHING SYSTEM

This invention relates to a telephone switching system which utilizes a highly efficient switching network configuration and a program-controlled common control system.

Common controlled types of switching systems generally have a number of elements in common, for instance a switching network through which transmission paths may be switched, a shared control which operates the switching network, service circuits such as digit receivers, dial tone oscillators, ringing tone oscillators, pulse or tone transmitters for subscribers' lines, trunks, etc. A well-known type of common control system such as the one described in U.S. Pat. No. 2,585,904 by . J. Busch has its switching network divided into two main blocks, a line link network which can interconnect a great quantity of subscribers' lines terminated thereon to a fraction of that quantity of junctor terminals, and a trunk link frame which interconnects the fractional number of junctor terminals to a number of different types of trunk circuits and service circuits. Junctors interconnect the junctor terminals on the line link frames to those on the trunk link frames in a distributed manner. Therefore, any subscribers' lines can be switched through the line link network, junctor array and trunk link network to a trunk or service circuit. The ratio of junctors to subscribers' lines is determined by traffic requirements, as is the ratio of trunks and service circuits to the number of junctors.

In this type of switching system it is required that all subscribers' lines, when connected to either a trunk or service circuits are switched through both line and trunk link networks. Therefore in spite of the relative "importance" of the connection, the same type of path through the cross-points of both networks are used. In considering "importance," it is here presumed that the maintenance of a talking transmission path is more important than the provision of dial tone or ringing current from a service circuit. Therefore, in certain high-traffic situations, a large number of transmission paths through the networks connected to service circuits such as a source of dial tone can block the setting up of new, but related transmission paths which may be deemed to have higher priority, for instance the setting up of a talking path.

In addition, an intraoffice call requires two transmission paths through the trunk link frame, the first from a junctor to an intraoffice trunk, and the second a return path from the intraoffice trunk to another junctor. Needless to say, if a method were found to connect the transmission path to an intraoffice subscriber without the return path, an extra forward transmission path would be available resulting in increased efficiency of the trunk link frame with equivalent equipment.

We have found that a new configuration of line link networks and trunk link networks, (the latter being designated herein as the destination switching network) can increase by a significant factor the efficiency of utilization of predetermined numbers of cross-points in such networks. In addition, the service circuits are removed completely from direct connection to the destination switching frame and are provided access to the subscribers' lines, etc., via a service circuit switching means. Access to the service circuits being provided through the service circuit switching means allows a common pooling of a minimum number of service circuits with a further increase in efficiency of the switching system. The probability of blocking in the destination switching means due to subscribers' lines being connected to service circuits is minimized.

With the achievement of this novel switching network arrangement, it has been found that special telephone services can also be provided in a highly efficient manner. A program-controlled common control system, wherein the programs are readily changeable to provide additional and new types of services to individual subscribers interfaces with a rudimentary unprogrammed marker to operate the switching network. In order to effect special services, a novel junctor disclosed herein can be used to allow the service circuits to be connected to an already existing transmission path without disconnecting such transmission path. Therefore, the combination of the program-controlled common control system and rudimentary marker, with a novel switching network comprising a special type of junctor allows the provision of highly efficient telephone switching system changeable as the needs of the subscribers, in an economic manner.

In basic form, this telephone switching office comprises a line circuit switching network, a destination switching network having a first and second set of terminals which preferably are respectively used for calls incoming to, and outgoing from the destination switching network. Predetermined numbers of the first and second set of terminals are connected to the line circuit switching network, another predetermined number of the second set of terminals is connected to first trunk means, and another predetermined number of the first set of terminals is connected to the second trunk means. The first trunk means can be composed of incoming trunks, and the second trunk means can be composed of outgoing trunks.

Therefore, a transmission path traversing the line circuit switching network enters the destination switching network via the predetermined number of the first set of terminals, and is routed back to the line circuit switching network, as an intraoffice call, directly from the predetermined number of the second set of terminals on the destination switching network. A single pass through a set of cross-points in the destination switching network is thus achieved, as discussed as being desirably earlier.

The structure and operation of this invention will now be described with reference to the following figures.

Figure 12:
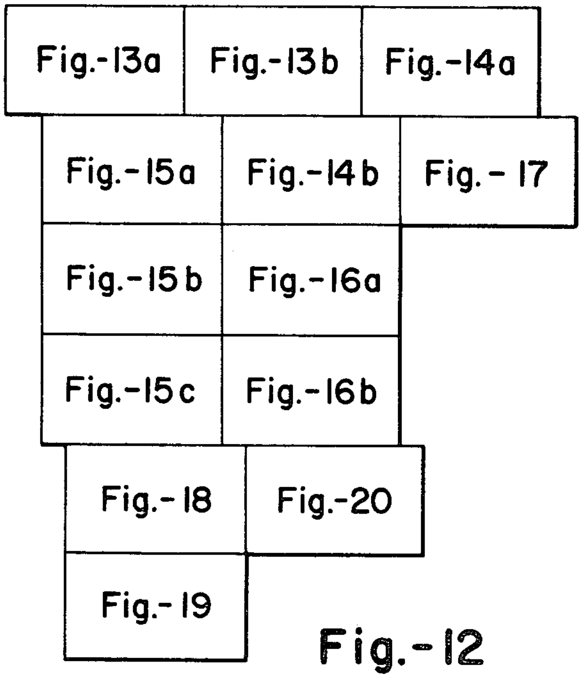
Figure 11:
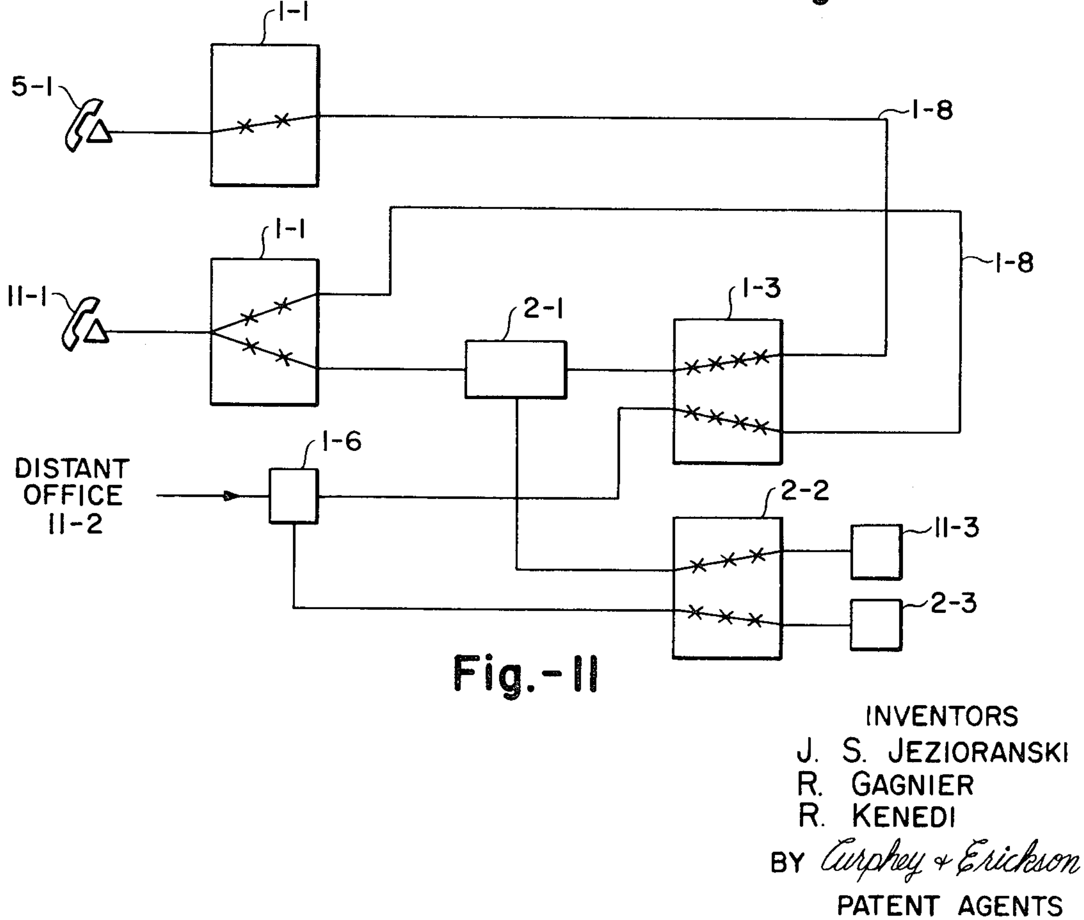
Figure 21:
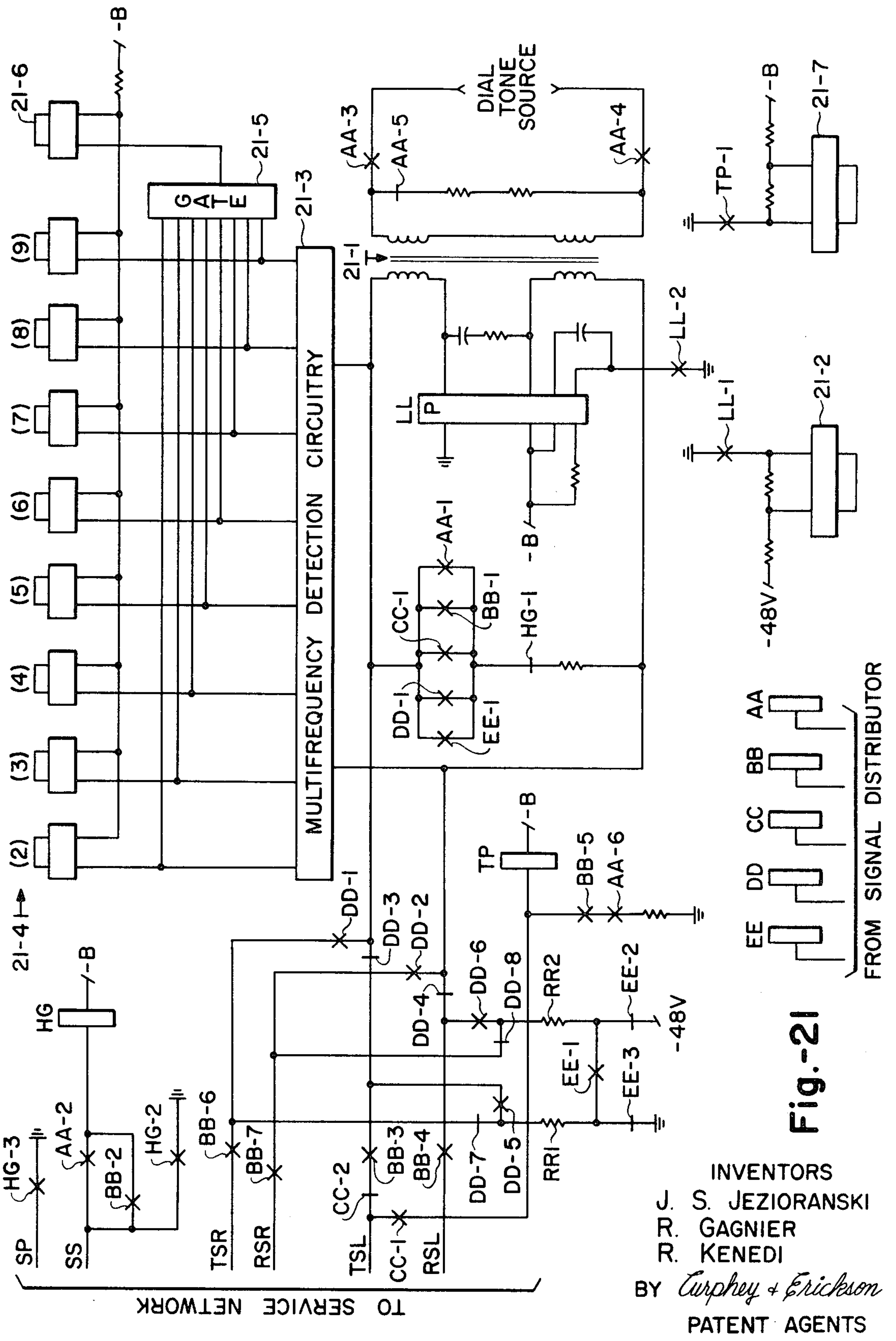
Figure 22:
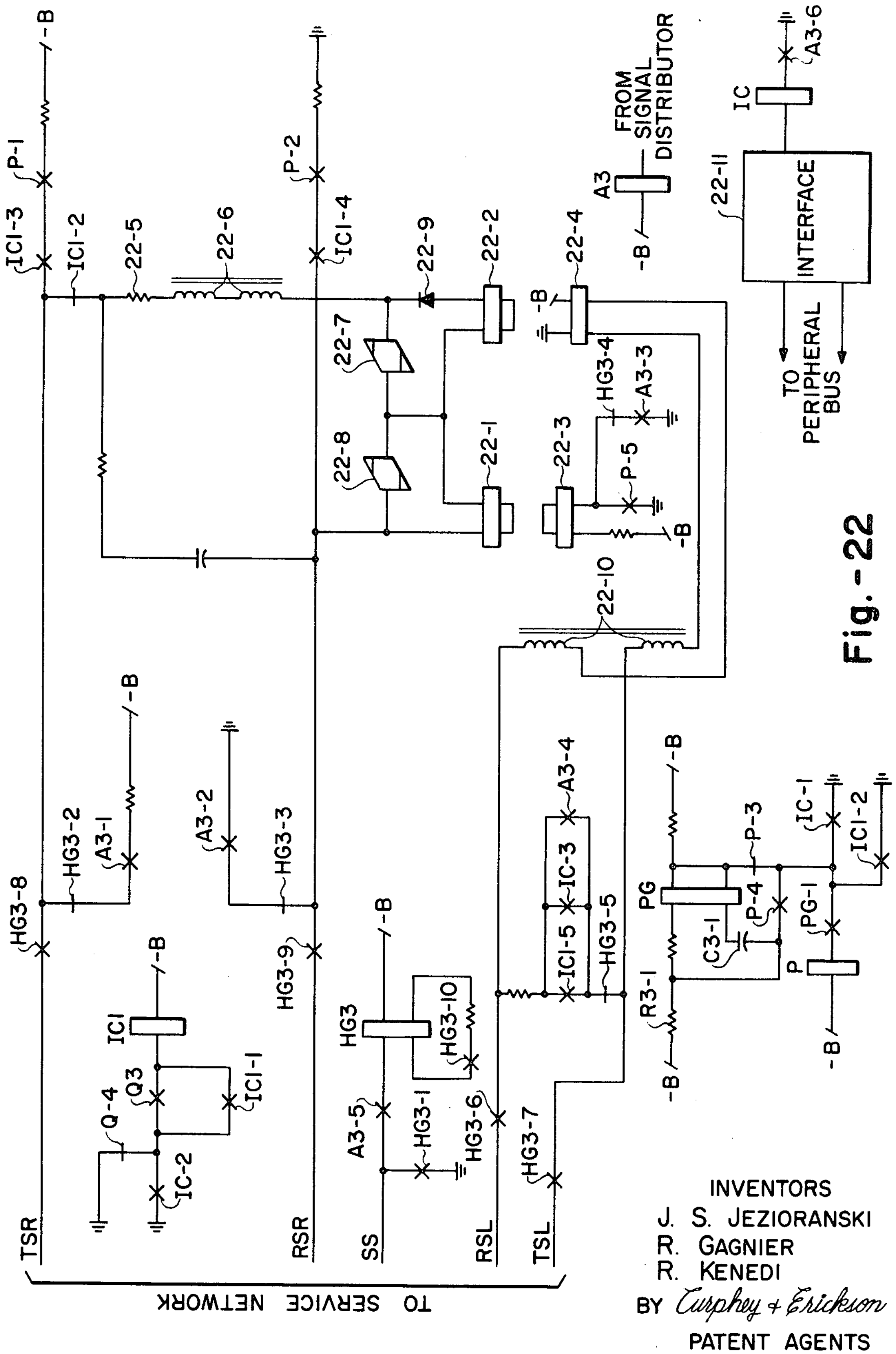
Figure 23:
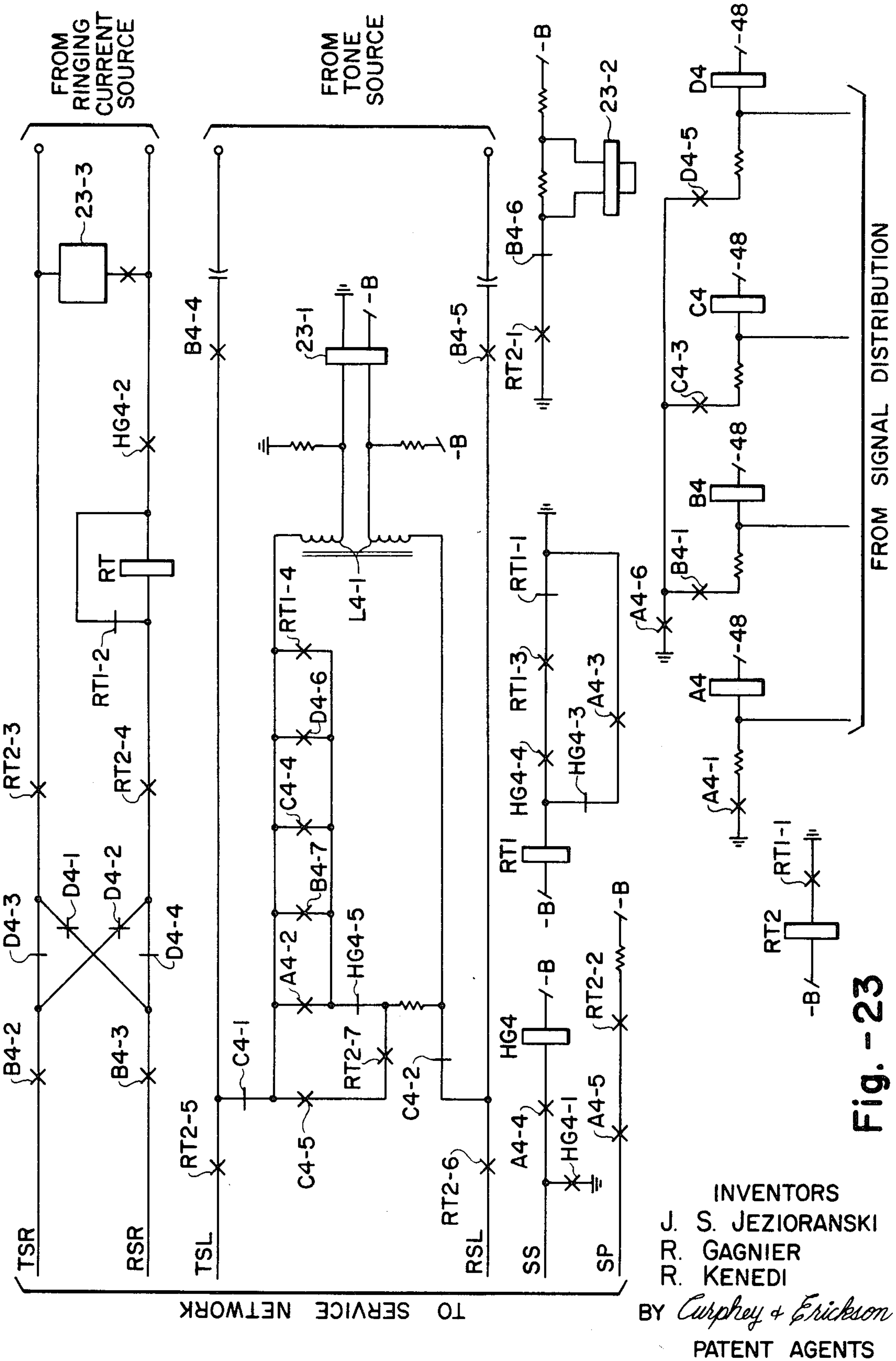
Figures 24, 25, 26:
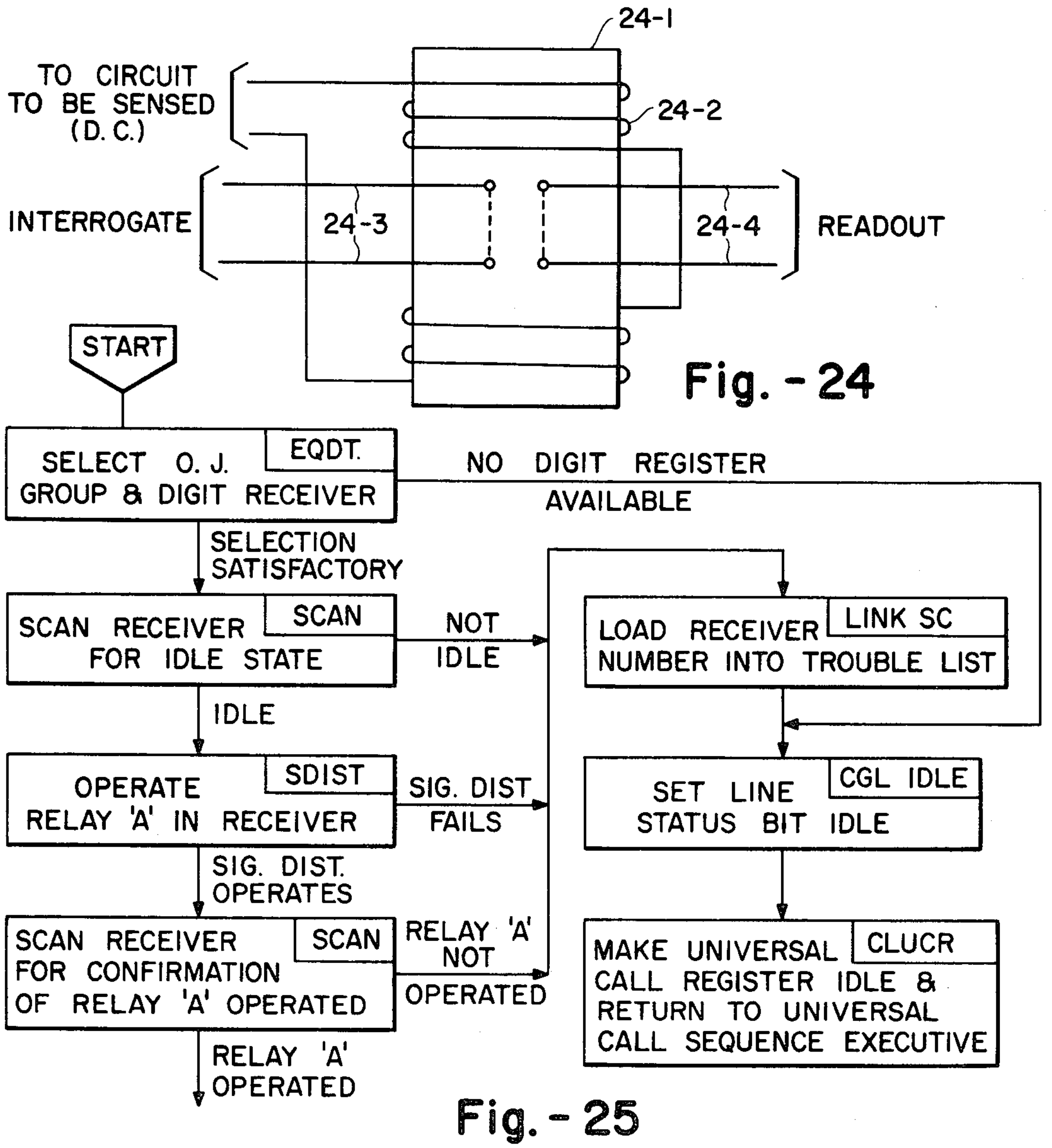

FIG. 11 shows in block diagrammatic form those elements needed to simply describe the setting up of a special service type of call entitled call waiting, FIG. 12, out of its regular order, on the first sheet of the drawings, shows the arrangement of the drawing sheets of FIGS. 13 to 20 required to describe the invention in detail, FIGS. 13 to 20 show the invention in detail, partly in block schematic form; the sheets of figures being assembled according to the diagram in FIG. 12;

FIG. 21 is a schematic diagram of a combination multifrequency and dial pulse receiver service circuit;

FIG. 22 is a schematic diagram of a pulse transmitter service circuit;

FIG. 23 is a schematic diagram of a common ringing service circuit;

FIG. 24 is a schematic representation of a ferrod, such as is used in a scanning means disclosed herein;

FIG. 25 is an example of a decision flow chart, upon which a program segment is based; and FIG. 26 is a table giving an example of the contents of certain registers during the processing of a program.

This invention will be described in sections as indicated in the index below.

INDEX
General Description
General Operation
Detailed Description
A. General Arrangement
B. The Networks, Originating Junctor and Service Circuits; Structure and Operation
C. Bus System and Interface Circuits; Structure and Operation
D. The Signal Distributor; Structure and Operation
E. The Scanner; Structure and Operation
F. The Marker; Structure and Operation
G. Central Control; Structure and Operation
H. The Software System
Detailed Operation
A. Examples of Calls
B. Examples of Special Calls In order to facilitate reference to the drawings, the following organization of reference designations will be used. Reference numerals will consist of two numbers, the first number followed by a dash, and a second number. The first number will refer to a drawing figure number in which the element is first referred in the disclosure, and the number following the dash will relate to the reference number of that sheet. For instance, if in discussing FIG. 10 reference 2–5 is referred to, it will be noted that the element was first introduced with reference to FIG. 2 and relates to element 5 on that sheet.

GENERAL DESCRIPTION

Figure 1:
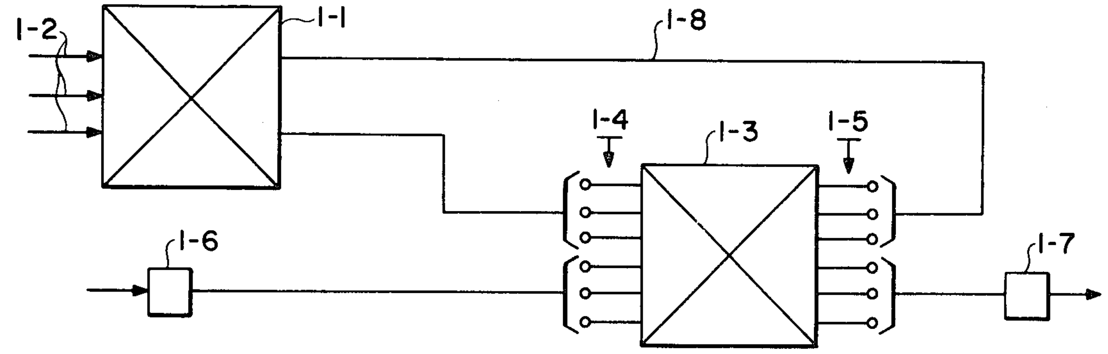
FIG. 1 shows the invention in its broadest aspect, in basic block form.

FIG. 1 shows a block diagram with the basic elements of the inventive telephone switching system, including a line circuit switching network 1—1 to which line circuits 1–2 are connected, and a destination switching network 1–3 which switches lines and incoming trunks connected to it, to terminating junctors 1–8 returning to the line switching network 1—1 and to terminating trunks 1–7 leading to other offices. Therefore, the destinating switching network routes the incoming lines and trunks to various destinations, and will be called a route network. The route network 1–3 comprises first and second sets of terminals 1–4 and 1–5 respectively, the first set of terminals 1–4 (which will be called input terminals for convenience) being connected to lines and trunks requiring destination switching, and the second set of terminals 1–5 being connected to destination paths such as output trunks 1–7 and terminating junctors 1–8. As may be seen, the line circuit switching network 1—1 is connected to predetermined ones of the first set of terminals 1–4 on the route network 1–3, and input trunks 1–6 may be connected to another predetermined number of first set of terminals 1–4 connected to the route network 1- 3. Predetermined ones of the second set of terminals 1–5 are connected via terminating junctors 1–8 back to the line circuit switching network 1—1 for the completion of an intraoffice call, for instance, and other predetermined numbers of the second set of terminals 1–5 are connected to output trunks 1–7 for completion of an interoffice call, for instance.

It may be seen that all calls being set up from trunks and lines connected to the first set of terminals are input portions of calls, and that all calls being set up finally through trunks and junctors connected to the second set of terminals are output portions of calls. Therefore, in setting up a call traversing the route network 1–3, only a single metallic transmission path passing therethrough is necessary. By an input portion of call and output portion of call, it is of course meant that the call originates therefrom, or terminates thereto, the calls being two-way transmission paths in their usual form, this being the preferred embodiment. However, this invention is not limited to two-way transmission paths, it being obvious that one-way, or four-wire, etc., transmission paths are just as applicable.

In operation, a call originating from a subscriber's line 1–2 traverses the line circuit switching network 1—1 and is connected to a predetermined terminal of the first set of terminals 1–4 of the route network 1–3. If the call is to be terminated in another switching office, the call is routed through the route network 1–3 and outgoing trunk 1–7, and thence to another switching office. However, if the call is to be an intraoffice call, it is routed through the route network 1–3 to the one of a predetermined terminal of the second set of terminals 1–5, through the terminating junctor 1–8 and back through the line circuit switching network 1—1 to another line circuit 1–2.

If a call originates and is received from an incoming trunk 1–6, it is connected via one of another predetermined number of the first set of terminals 1–4 through route network 1–3. The call can be connected to outgoing trunk 1–7 in a tandem manner, or if it is to be terminated in the local office, it is switched through the route network 1–3 to the terminating junctor 1–8 and back through the line circuit switching network 1—1 to a line circuit 1–2.

Figure 2:
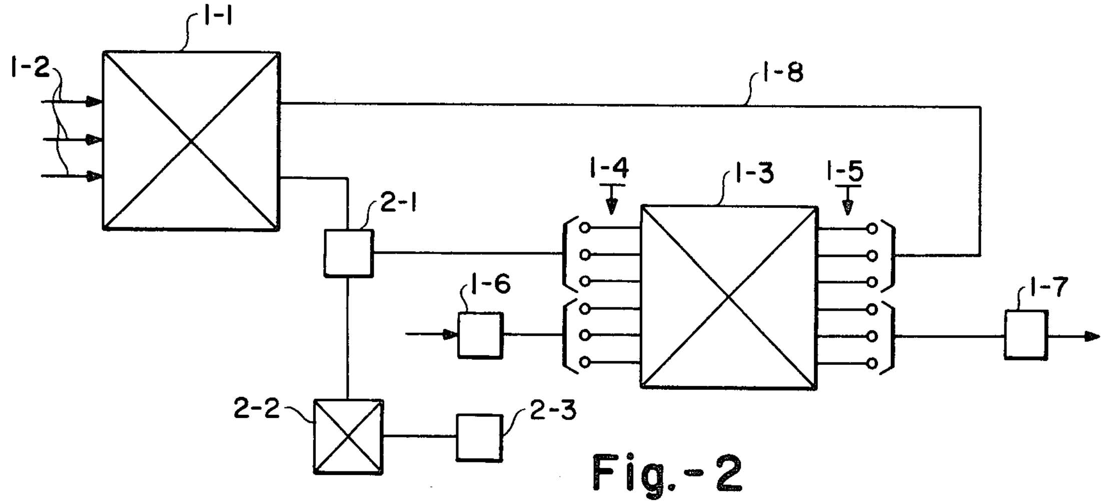
FIG. 2 shows the invention in more detail, including the three switching networks and a novel junctor, in block form.

FIG. 2 shows a block diagram of the invention, with an originating junctor 2–1 interconnecting the line circuit switching network 1—1 and the predetermined numbers of the first set of terminals 1–4 on the route network 1–3. Connected to the originating junctor 2–1 is a service network 2—2 to which service circuits 2–3 are connected. The service circuits perform functions which can be handled more economically by concentrated few special service circuits than by providing additional equipment in every trunk circuit and originating junctor. The circuits include transmitters and receivers for handling the signalling information needed to set up a call, ringing circuits for alerting called subscribers, coin control circuits for connecting or refunding coins, etc. The service network 2—2 interconnects junctors 2–1 with the service circuits on an economical concentrated basis.

The originating junctor 2–1 is used to first interconnect the service network with the line circuit switching network, thus connecting the aforementioned service circuits with line circuits 1–2 without the necessity of setting up a transmission path through a route network 1–3. At the proper time, the originating junctor 2–1 can interconnect the service network 2—2 with the line circuit switching network 1—1 and the route network 1–3, or drop the service network 2—2, keeping a connection between the line circuit switching network 1—1 and route network 1–3. The remainder of the block diagram is as was described with reference to FIG. 1.

Figure 3:
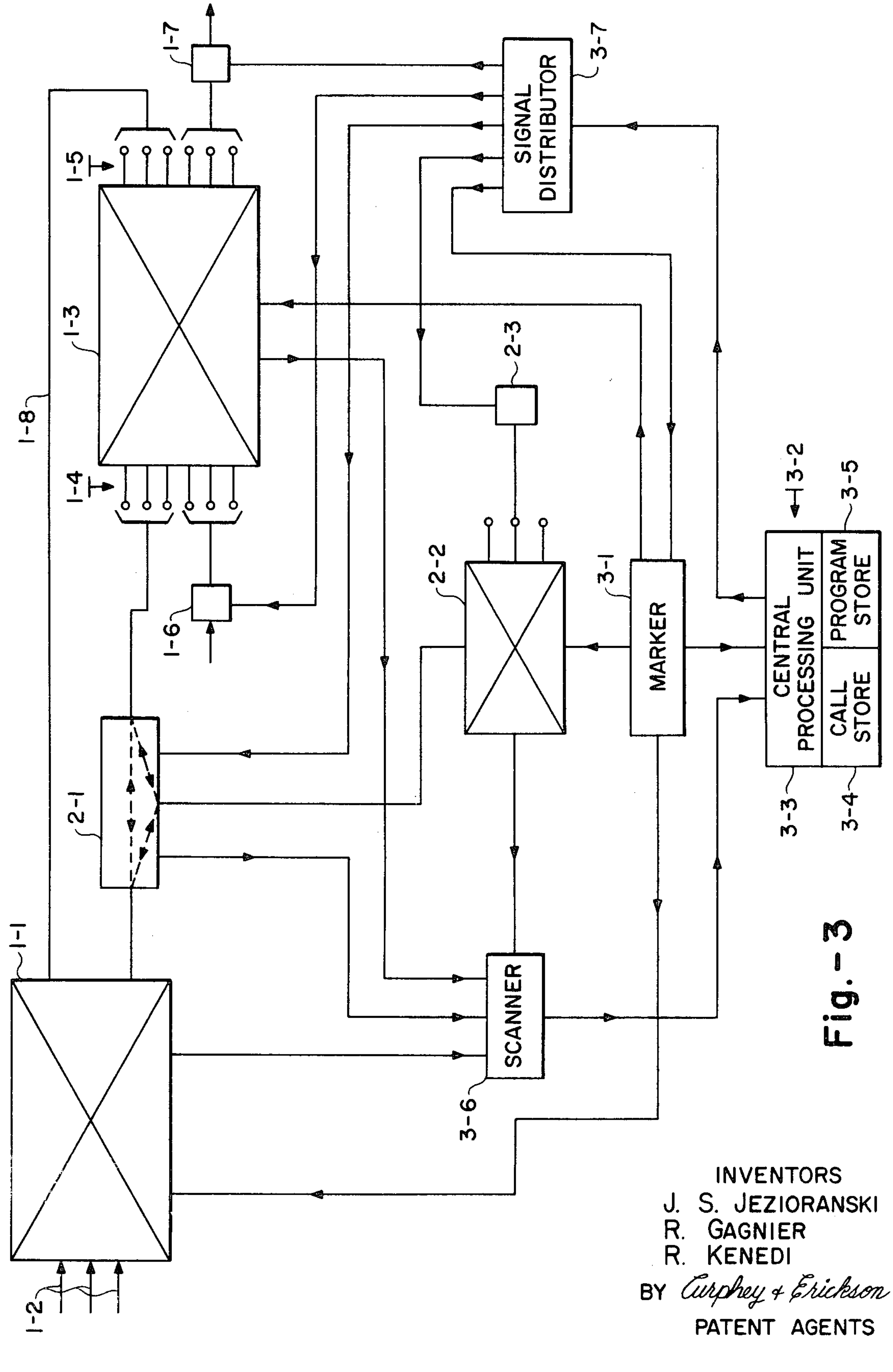
FIG. 3 shows the telephone switching system of this invention in a more detailed block form.

Referring to FIG. 3, a complete telephone switching system according to this invention is shown in basic block diagrammatic form. Line circuits 1–2 are connected to the line circuit switching network 1—1. Originating junctors 2–1 interconnect the line circuit switching network 1—1 with first predetermined numbers of the first set of terminals 1–4 of the route network 1–3. Incoming trunks 1–6 are connected to a second predetermined number of the first set of terminals 1–4. A first predetermined number of output terminals 1–5 are connected via terminating junctors 1–8 to the line circuit switching network 1—1. A second predetermined number of the second set of terminals 1–5 are connected to outgoing trunks such as 1–7.

The originating junctors 2–1 are connected to a service network 2—2, to which are connected service circuits 2—2.

Controlling the line circuit switching network 1—1, route network 1–3, and service circuit 2—2 is marker 3–1. Control by the marker may be effected via connectors, but as the mode of control is well known, it has not been shown in this figure, and the connectors are assumed to be part of the individual networks. Controlling the marker, and thus the complete system is a program-controlled central control 3–2, composed of a central processing unit 3—3, a call memory 3–4, and a program memory 3–5. The function of the program memory 3–5, which will be referred to below as program store, is to hold the programs needed to operate the entire system. The function of the call memory 3–4, which will be referred to below as call store, is to hold the temporary information used during the processing of individuals calls, for instance the states of busy or idleness, progress data relating to a call, etc. The central processing unit 3—3 coacts with the contents of the call store and program store and derives instructions which control the entire system.

Sensing the states of lines 1–2, the line circuit switching network 1—1, the route network 1–3, the junctors 2–1, the service network 2—2 etc., is scanning means 3–6. The scanning means is used for detecting service requests and monitoring the state equipment during calls in progress and during idleness, by gathering information relating to the states of lines, junctors, trunks, service circuits, markers, signal distributors, and miscellaneous diagnostic points. This information is gathered at specific time intervals, as specified by the program in central control 3–2. Each circuit to be sampled by the scanner is connected to one or more sensing elements. On instruction from central control, the information relating to the state of the scan point is collected and sent by the scanner to central control. The operate time of the scanner is extremely fast, since it operates at electronic speeds.

A signal distributor 3–7 is connected to the central control 3–2 and is directly operated therefrom. The signal distributor operates individual control points, for instance by operating relays in certain of the special-service circuits, trunks, and the originating junctor, etc.

Figure 4:
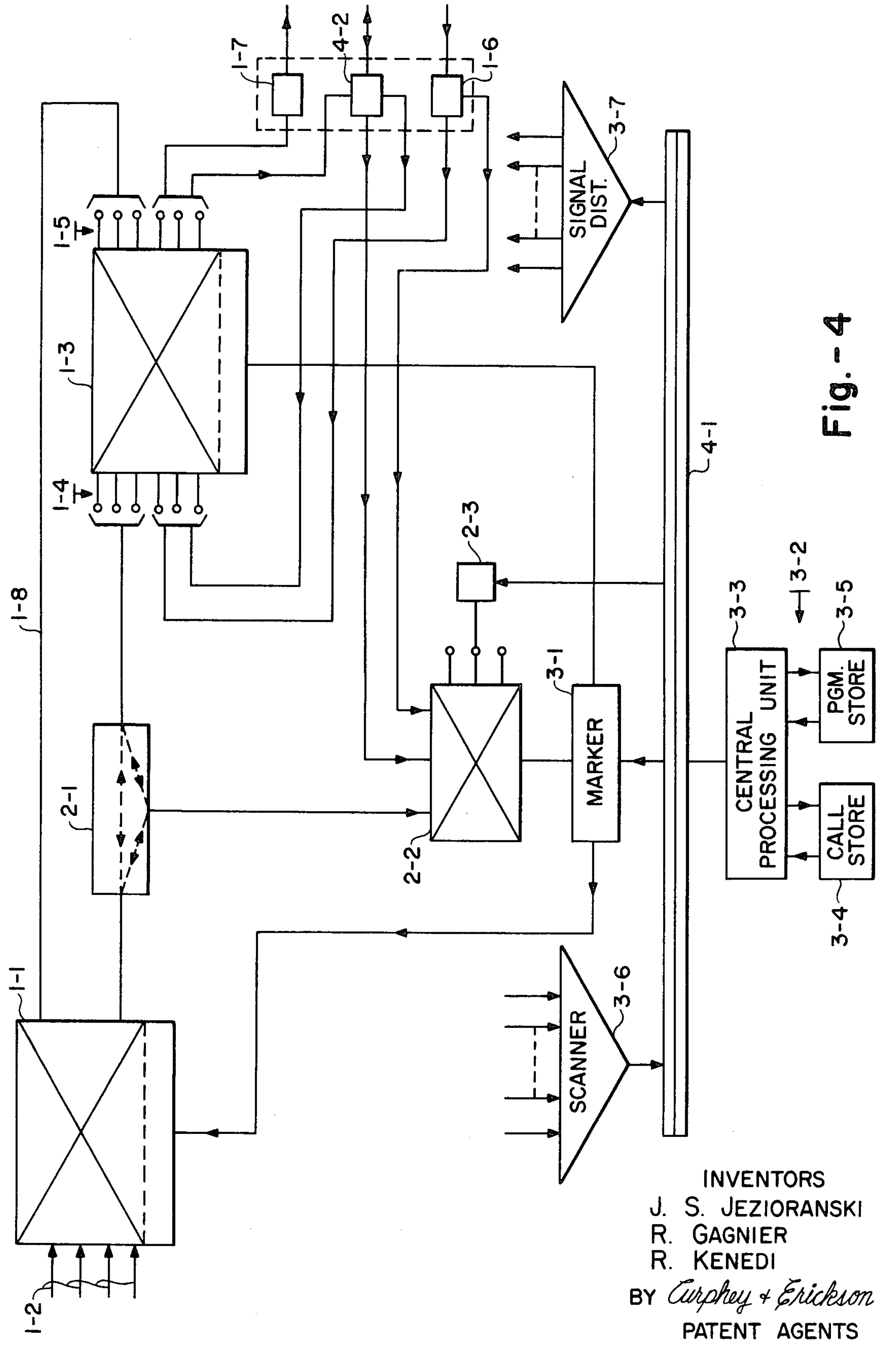
FIG. 4 shows the telephone switching system of FIG. 3 in a rearranged manner approximating more closely the preferred embodiment.

FIG. 4 is essentially the same as FIG. 3, but arranged in a slightly different form. The basic difference between the structures shown in FIGS. 3 and 4 is to provide that all communications from the central control 3–2 be made via a peripheral bus 4–1. Therefore, access by the scanner 3–6 to the central processing unit 3—3 is made via the peripheral bus 4–1, as is the communication between the central processing unit 3—3 and the signal distributor 3–7 and the marker 3–1. Access is also provided between the peripheral bus 4–1 and the service circuits 2–3. It is preferred the central processing unit 3—3 apply output signals on either of two identical bus systems, for reliability purposes. However, for the sake of clarity only one will be described herein. The peripheral bus is composed of a number of busses such as an enable bus, an address bus, a scan return bus, and all-seems-well bus, each of which preferably is duplicated.

Also shown is a two-way trunk 4–2 which may be used in place of or in addition to both incoming and outgoing trunks. Two-way trunks allow a transmission path between two offices to be accessed from either end, thus making more efficient use of the facilities. The two-way trunk is comprised of an originating portion which is connected to the other predetermined number of the first set of terminals 1–4 on the route network, and a terminating portion connected to the other predetermined number of the second set of terminals 1–5. Both the two-way trunk 4–2 and the incoming trunk 1–6 is connected to the service network 2—2 in order that certain service circuits such as digit receivers may be connected thereto.

In summary, therefore, the line circuit switching network 1—1 interconnects subscriber's line circuits 1–2 and PBX trunks to originating junctors 2–1 and to terminating junctors 1–8. The route network 1–3 connects originating junctors 2–1, incoming trunks 1–6 and two-way trunks 4–2 to terminating junctors 1–8 and outgoing trunks 1–7 or terminating portions of two-way trunks 4–2. The service network connects originating junctors 2–1 and incoming trunks 1–6 or two-way trunks 4–2 to service circuits 2–3.

The marker 3–1 sets up paths through the line, route, and service networks by causing the closing of the required crosspoints in the crossbar switches thereof. It receives its orders from the central control 3–2 via the peripheral bus 4–1. The central control specifies a group of paths through the network, and the marker 3–1 selects an idle path from within this designated group by operating related connectors and control circuits, now shown. The sequence followed is determined by information contained in the central control order. The status or condition of the marker is continually made available to central control 3–2 via the scanner 3–6.

As mentioned above, a control circuit is associated with each network frame. It assists the marker in locating an idle path from within the group of specified paths in the associated network. After locating an idle path, the marker, via the network control circuit establishes a connection by operating the necessary select and hold magnets of the network crossbar switches. In this respect, the network control function is an integral part of the marker function.

The originating junctor 2–1 forms basically an intraoffice trunk for intraoffice calls. It is connected to the line circuit switching network 1—1 and route network 1–3 via, in this embodiment, three-wire connections, and supervises both the calling and called parties in this mode. The originating junctor, via six-wire connections, also provides access to the service network 2—2, so that services such as the provision for dial tone, digit receiving, digit transmission and ringing can be extended to either side of the originating junctor, either during the setting up of a call or on flashing for recall by either party during a talking connection. The ability to flash recall by either party is utilized in many of the special services required of electronic switching systems, although other methods of recalling may be used.

The originating junctor also performs the function of an interoffice trunks when reverse battery supervision and loop signalling is required. In this case, the outgoing trunk circuit 1–7 is required only as a pair of leads connected to terminals of the route network 1–3. Also provided by the originating junctor is impedance compensation, direct current isolation, etc.

Terminating junctors 1–8 are comprised of three wire paths to carry terminating traffic, and have no supervisory capacity.

The trunk circuits in this invention have been simplified in comparison with conventional trunk circuits in the sense that they provide only transmission paths, and in certain cases supervision, direct current isolation, and impedance compensation in a similar manner to the originating junctor which will be fully described. Other functions normally associated with conventional trunk circuits are performed by the central control 3–2 and service circuits 2–3.

The purpose of the signal distributor 3–7 is to operate relays, which may be, for instance, magnetically or electrically latching, located in trunk circuits, service circuits, markers, originating junctors etc. One signal distributor operates one relay at any one time. Unlike a marker which selects an idle path out of a specified group of paths, the signal distributor simply operates or releases a specific relay, while acting as a buffer between the high-speed central control 3–2 and the low-speed relay.

The operation is as follows. Central control 3–2 transmits information to an idle signal distributor 3–7 which then uses this information to select the path to the specified relay, called a signal distributor point. The relay is then either operated or released depending on the information contained in the information word, or order, from central control. Finally, the signal distributor returns itself to an idle state.

Among the service circuits 2–3 is an originating digit receiver, which may be provided in two or more versions. In a first version, a dial pulse receiver is used to receive rotary dial pulses. In a second version, the same dial pulse receiver may be used in conjunction with tone detection circuitry to receive dialing information from both multifrequency and rotary dial telephone sets. The dial tone receiver can send dial tone to the calling subscriber and then accept digital information dialed from the telephone set, making it available to central control 3–2 via the scanner 3–6.

An incoming digit receiver, another of the service circuits 2–3, provides the means for detecting signalling information on oncoming calls from another office. This information is arranged in a suitable form and made available to central control 3–2 via the scanner 3–6. An incoming digit receiver is generally used in situations of multifrequency pulsing. However, in the situation of rotary dial pulsing, normally associated with step-by-step offices, the digits are usually transmitted without prior signalling notification. This means that insufficient time is available to connect an incoming digit receiver. Therefore to ensure reception of all transmitted digits, scanning is performed by the scanner 3–6 at the incoming trunk 1–6.

Another service circuit is a transmitter, used for sending digital information to distant offices. A dial pulse transmitter may be used when the distant office is a step-by-step type. In order to signal another switching office of the type of this invention, or some other types of common control offices, a multifrequency transmitter may be used. Transmitters are controlled by central control 3–2 via the bus 4–1. Other types of service circuits are common ringing circuits used to cater to single and two-party lines, and special-ringing circuits used for operator access, etc.

The central control 3–2 preferably utilizes binary digits, and operates digitally. It consists of a central processing unit 3—3, call store 3–4, and program store 3–5. The program store stores the programs which are used to control the central processing unit 3—3. These programs consist of appropriate combinations of precisely defined instructions. The instructions are interpreted and executed by the central processing unit 3—3 to control the actions of all other units of the system. The instructions, though of many different types, are executed only one at a time. Therefore, by performing logic operations, the central processing unit 3—3 causes connections to be established through the networks, control trunks, markers, junctors, and service circuits. Also, by using maintenance and diagnostic programs it can analyze troubles and faults, and cause the results of tests to be printed out on a teletypewriter (not shown).

The program store 3–5 is a semipermanent memory, and the call store a temporary memory. The stored information in both memories is preferably word organized, which means that a single address presented to the memory will result in an entire word being sent from the memory into the central processing unit, or being inserted back into the memory.

The program store 3–5 acts as an instruction manual listing the plan of action which guides the system, step-by-step in its operation. Translation information is used to convert directory numbers to equipment locations or vice versa. Together, the program and translation information constitutes that which is necessary to cause performance of the switching function, as well as the rate of service commitment to each subscriber.

The call store 3–4 acts as a "scratch pad" type of memory; data is left there in the course of processing a call. Its prime function is to provide the read-write or erasable storage for all the call-related temporary information processed by the central processing unit 3—3.

GENERAL OPERATION

The following will be a description of the operation of this invention, relating to FIGS. 5 to 10. Each figure will be introduced as it is needed. However, FIG. 4 may be used as a master drawing for orientation.

Figure 5:
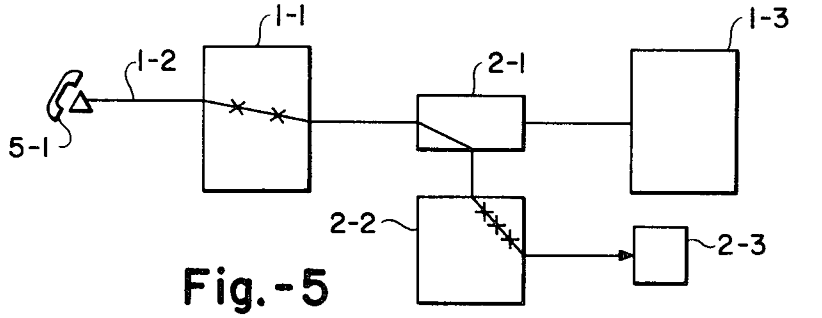
FIG. 5 shows in block diagrammatic form those blocks of FIG. 4 needed to simply describe a connection of a source of dial tone to a telephone subscriber.

Referring to FIG. 5, when a calling subscriber wishes to initiate a call, he removes the handset from his telephone set 5–1, thereby providing an off-hook indication via his line circuit 1–2 to the telephone switching office. The off-hook condition is sensed by the telephone switching office and a transmission path is set up via the line circuit switching network 1—1, originating junctor 2–1, and service network 2—2 to a service circuit 2—3. The service circuit in this case is a dial pulse or multifrequency receiver, which returns dial tone via the transmission path to the calling subscriber's telephone set 5–1. A route network 1–3 which is also connected to the originating junctor 2–1 is not connected to the transmission path at this time.

Figure 6:
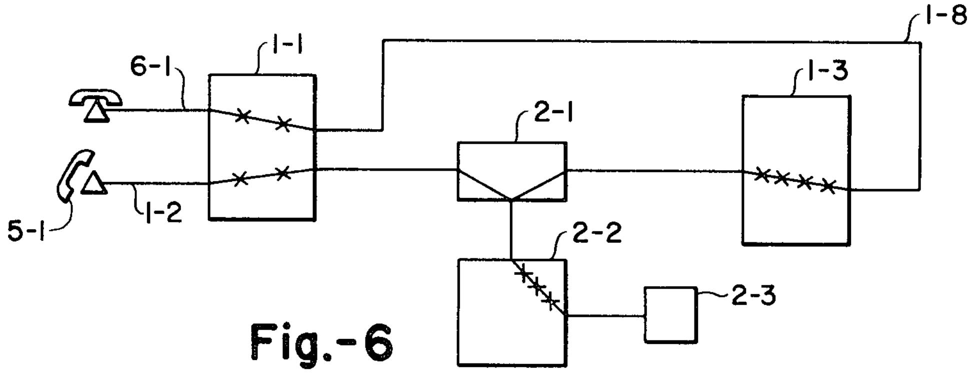
FIG. 6 shows in block diagrammatic form those elements needed to simply describe the setting up of a ringing connection in an intraoffice call.

When the calling subscriber hears the dial tone, he proceeds to dial a number identifying the telephone set where he may expect to contact a called party. The dialed digits are sensed by the telephone switching system and used to find the line location of the called subscriber's line. Turning to FIG. 6, an idle ringing service circuit is selected, which is to be connected to the service network 2—2, and thus to the calling and called subscriber's line.

If the service network frame to which the service circuit is to be connected is idle, as well as the line circuit switching network frame to which the called subscriber is connected, the switching system proceeds to find and connect an idle transmission path from the ringing service circuit 2–3, through service network 2—2 to the originating junctor 2–1 already selected. It connects the called subscriber's line 6–1 through a line circuit switching network 1—1, a terminating junctor 1–8 and via an idle transmission path through the route network 1—4 to originating junctor 2–1 and to the transmission path already set up. At this point, ringing tone is sent back to the calling party from the ringing circuit 2–3 via originating junctor 2–1, and ringing current sent to the called party's subscriber's line 6–1 via the route network 1–3, terminating junctor 1–8, and line circuit switching network 1—1. The telephone set of the called party will then ring.

If the called party telephone had been off-hook, the switching system would have selected a source of busy tone to be returned to the calling subscriber's telephone set 5–1, rather than the source of ringing current.

Figure 7:
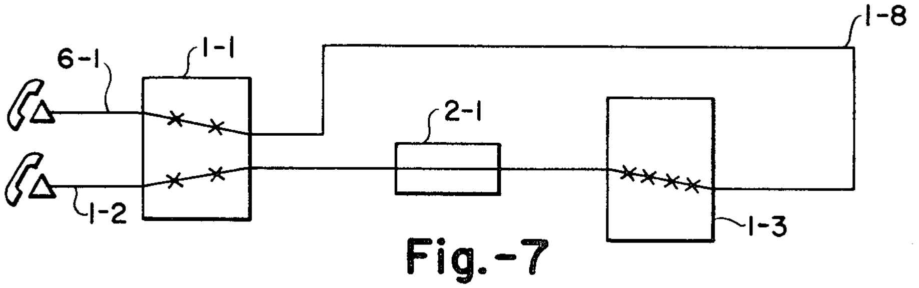
FIG. 7 shows in block diagrammatic form those elements needed to simply describe a signalling connection in an intraoffice call.

Referring to FIG. 7, once the called party has answered and his telephone handset is off-hook, the switching system senses this condition and disconnects the transmission path from originating junctor 2–1 through service network 2—2 to service circuit 2–3. The through transmission path is completed from calling subscriber line circuit 1–2, through line circuit switching network 1—1, originating junctor 2–1, route network 1–3, terminating junctor 1–8, line circuit switching network 1—1, to called subscriber's line 6–1.

Figure 8:
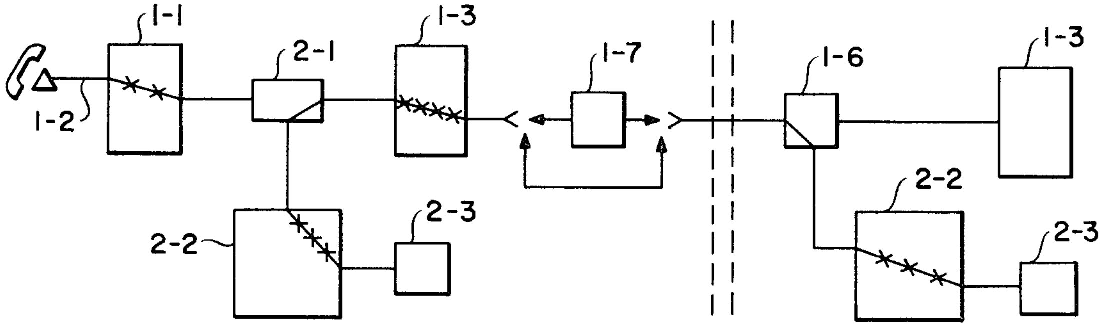
FIG. 8 shows in block diagrammatic form those elements needed to simply describe a signalling connection to an interoffice call.
Figure 9:
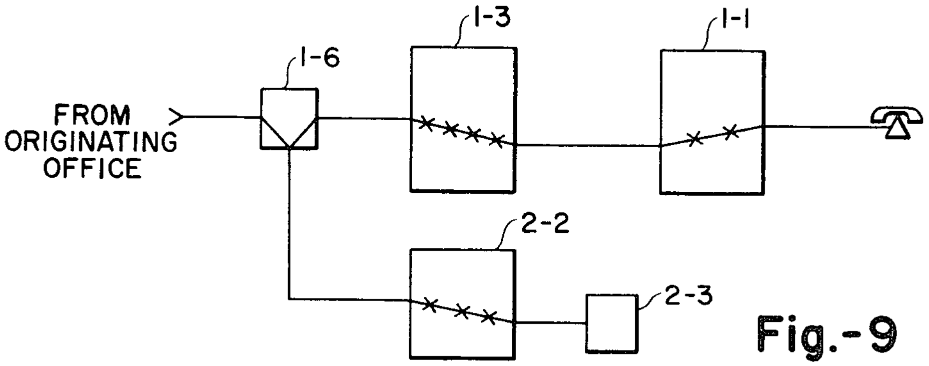
FIG. 9 shows in block diagrammatic form those elements needed to simply describe a ringing connection in an interoffice call.

FIGS. 8 and 9 show in block schematic form the essential elements used in an interoffice call, where the call is not to terminate in the local office. In this case, the call will be assumed to be terminating in another office of the same type as that described in this specification. However, it will become obvious that any well-known type of terminating office can be used.

After the calling subscriber has dialed his digits into a digit receiver as described earlier, the switching system determines that the call is to be terminated in a different central office. Therefore, it releases the digit receiver and selects an idle service circuit which will transmit the digits to the required central office. A transmission path is set up from a transmitter type of service circuit 2–3, through service network 2—2, originating junctor 2–1, route network 1–3 to an outgoing trunk 1–7 leading to the called central office. The proper outgoing trunk 1–7 is determined by the switching system after an analysis of the digits dialed by the calling subscriber.

The separation between the originating and terminating offices is shown by the pair of dashed vertical lines in FIG. 8.

At the terminating central office, a transmission path is set up from incoming trunk 1–6 via service network 2—2 to a digit receiver type of service circuit 2–3. The digits are then transmitted from the transmitting type of service circuit at the originating central office to the digit receiver type of service circuit at the terminating central office. Route network 1–3 at the terminating central office to which incoming trunk 1–6 is connected is not used at this time.

Referring to FIG. 9, after the terminating central office has analyzed the transmitted digits, a transmission path is set up from a ringing service circuit which is connected to the service network in the terminating central office, through the service network 2—2, the incoming trunk 1–6, the route network 1–3, and line circuit switching network 1—1 to the called subscriber's line. This connection is set up in a similar manner to that described above relating to the termination of a call in the local office, but in this case the incoming trunk 1–6 acts similar to the originating junctor. In the originating central office, a transmission path is completed through the originating junctor 2–1 from the subscriber's line 1–2 to the outgoing trunk 1–7, which completes the transmission path from the calling subscriber to the called subscriber. After ringing, the service networks and service circuits in both central offices are disconnected.

Figure 10:
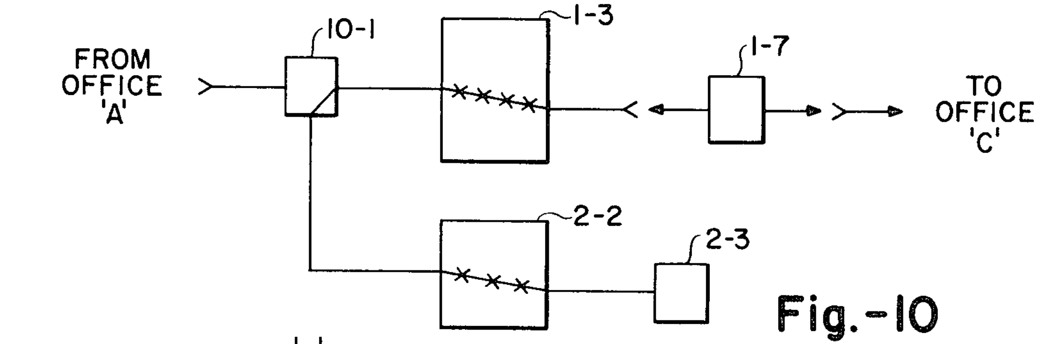
FIG. 10 shows in block diagrammatic form those elements needed to simply describe a tandem call.

FIG. 10 shows some of the basic elements used in processing of a tandem call, for instance one which is routed from office A, via a tandem office to office C.

In this case, the digits are received in a digit receiver service circuit similar to the manner described above with respect to the called office, but now the switching system determines that the call is not to terminate threat. Therefore, instead of connecting a transmission path to a local subscriber, it selects an idle transmitter type of service circuit 2–3, and prepares a transmission path from the transmitter through service network 2—2, through incoming trunk 10–1, route network 1–3, to an outgoing trunk 1–7. The procedure now followed is identical to that of an interoffice call, with the incoming trunk 10–1 in the tandem office replacing the originating junctor in the originating office. After the digits are transmitted and the complete transmission path from the calling to the called subscriber is set up, through incoming trunk 10–1, the line through the service network 2—2 from the transmitter to the trunk 10–1 is made idle.

FIG. 11 shows an arrangement of the basic elements used in one of the special service types of calls set up via this system. The special service type of call which will be described as "call waiting," wherein a first and second subscriber are conversing, and third wishes to contact one of the two. The first subscriber can alternately speak to the second, or third subscriber with this service.

A first subscriber at telephone set 11–1, who has the "call waiting feature," previously originated an interoffice to the subscriber at telephone set 5–1, and a transmission path exists therebetween via line circuit switching network 1—1, originating junctor 2–1, route network 1–3, terminating junctor 1–8, and a second line circuit switching network 1—1. At a distance office 11–2 a subscriber wishes to talk to the first subscriber at telephone set 11–1, and originates an interoffice call. This particular situation was chosen to simplify the description, although any other configuration can be handled just as readily by the system. The digits are dialed in the normal manner, and the telephone system interprets the digits in order to identify the called line. This then allows the system to determine that the called line is busy, and has a call-waiting feature. A call-waiting service circuit 2–3 is then connected through service network 2—2 to incoming trunk 1–6 to which the subscriber's office 11–2 is connected for this call.

The incoming trunk is also connected through route network 1–3 and a terminating junctor to the subscriber's line leading to called subscriber's telephone set 11–1 through line circuit switching network 1—1, thus establishing a double connection. Another call-waiting service circuit 11–3 is connected through service network 2—2 to the originating junctor 2–1 which is used in the transmission path of the call between the subscribers at telephone sets 11–1 and 5–1.

The call-waiting circuit 2–3 provides audible ringback to subscriber 11–2 via trunk 1–6, while call-waiting circuit 11–3 periodically causes the splitting of the talking path between subscriber at telephone sets 11–1 and 5–1 in the originating junctor 2–1, and also sends a "beep" tone to the subscriber at telephone set 11–1. The subscriber at telephone set 11–1 then flashes his hookswitch to notify the switching system he wishes to talk to the subscriber at telephone set 11–2.

Call-waiting circuit 11–3 then causes the splitting of the existing talking path between the subscribers at telephone sets 11–1 and 5–1 in the originating junctor 2–1, while maintaining the connections to both of those subscribers through the switching networks 1—1 and 1–3.

The call-waiting circuit 2–3 then causes the connection of a talking path through route network 1–3 between the incoming trunk 1–6 and the line circuit switching network 1—1 to which the subscriber's telephone set 11–1 is connected.

If the subscriber at telephone set 11–1 flashes his hookswitch for a second time, the connection between the subscribers at telephone set 11–1 and trunk 1–6 is split in the incoming trunk 1–6, while the connection between subscribers at telephone sets 11–1 and 5–1 is reestablished through the originating junctor 2–1. As long as either party remains off-hook, the subscriber at telephone set 11–1 can alternate between transmission paths leading to subscribers 5–1 and 11–2 as often as he desires.

Other types of special services can easily be incorporated in this system, as will become apparent to someone skilled in the art. For instance, a customer can place calls to any one of a group of frequently called numbers by dialing an abbreviated code instead of the seven or more digits that would normally be required. This is sometimes called speed calling. Another service call forwarding can give the subscriber the ability to have all incoming calls automatically forwarded to an alternate local telephone set. This service is activated by dialing a special code followed by the directory number of the telephone set to which the incoming calls are to be forwarded. The subscriber deactivates the service by dialing an appropriate alternate code. In another service, three way or conference calls, a subscriber can add a third party to an established connection, and may, if desired, disconnect the third party to reestablish to original connection. Private consultation with the third party is possible before establishing the conference.

DETAILED DESCRIPTION a. General Arrangement

FIG. 12 shows the arrangement of the drawing sheets containing FIGS. 13 to 20 which taken together show the inventive telephone switching system. The form of the telephone switching system shown corresponds to the form of FIG. 4.

FIGS. 13 to 20 show line circuits 1–2 connected to a line circuit switching network 1—1, the line circuit switching network being connected via originating junctors 2–1 to input terminals of a route network 1–3 and a service network 2—2. The route network 1–3 also has incoming trunks 1–6 connected to its input terminals as well as outgoing trunks 1–7 leading to a distant office and terminating junctors 1–8 connected to its output terminals and back to the line circuit switching network 1—1. The output side of the service network 2—2 contains service circuits 2–3, which include digit receivers, digit transmitters, ringing circuits, etc. The networks are arranged such that transmission paths can traverse all the networks via the originating junctors, and that subscribers line circuits 1–2 may be connected to service circuits, trunks and terminating junctors.

Connected to, and controlling the line circuit, route, and service networks, is one or more markers 3–1. The markers are arranged to receive digital orders via a peripheral bus 4–1, from central control 3–2. It is preferred that two central controls be provided, interconnected by data matching circuits 20–2. The two central controls are desirable for redundancy purposes in order to allow a high reliability of the telephone switching system.

Also connected to the peripheral bus 4–1 are one or more scanners 3–6 each of which senses a multiplicity of scan points throughout the system and effectively reports their condition via the peripheral bus 4–1 to the central control 3–2. A signal distributor 3–7, also connected to the peripheral bus 4–1, receives data word orders from the central control 3–2, and causes latching relays at designated signal distributor points throughout the system to be operated in order to initiate or release predetermined circuits defined by the word orders.

It will be appreciated that although this description in the main will be directed to one of each of the main elements such as scanners, markers, etc., it should be understood that for traffic, reliability, and system-size reasons, there may be more than one employed in the system.

The following will be a detailed description of the aforementioned blocks, within the context of this system.

b. The Networks and Junctors

The line circuit switching network in this embodiment is comprised of two arrays of crossbar switches, a line switch array 13–1, and a line junctor switch array 13–2. The basic line link network accommodates 20 line switches and 10 line junctor switches. The line switches are grouped in pairs by interconnecting switch verticals of the same number. The line switches and line junctor switches are connected through six-wire line links, and, for instance, the total of 100 line links may be used per line link network, made up of 10 links per switch X 10 switches.

Figure 13A:
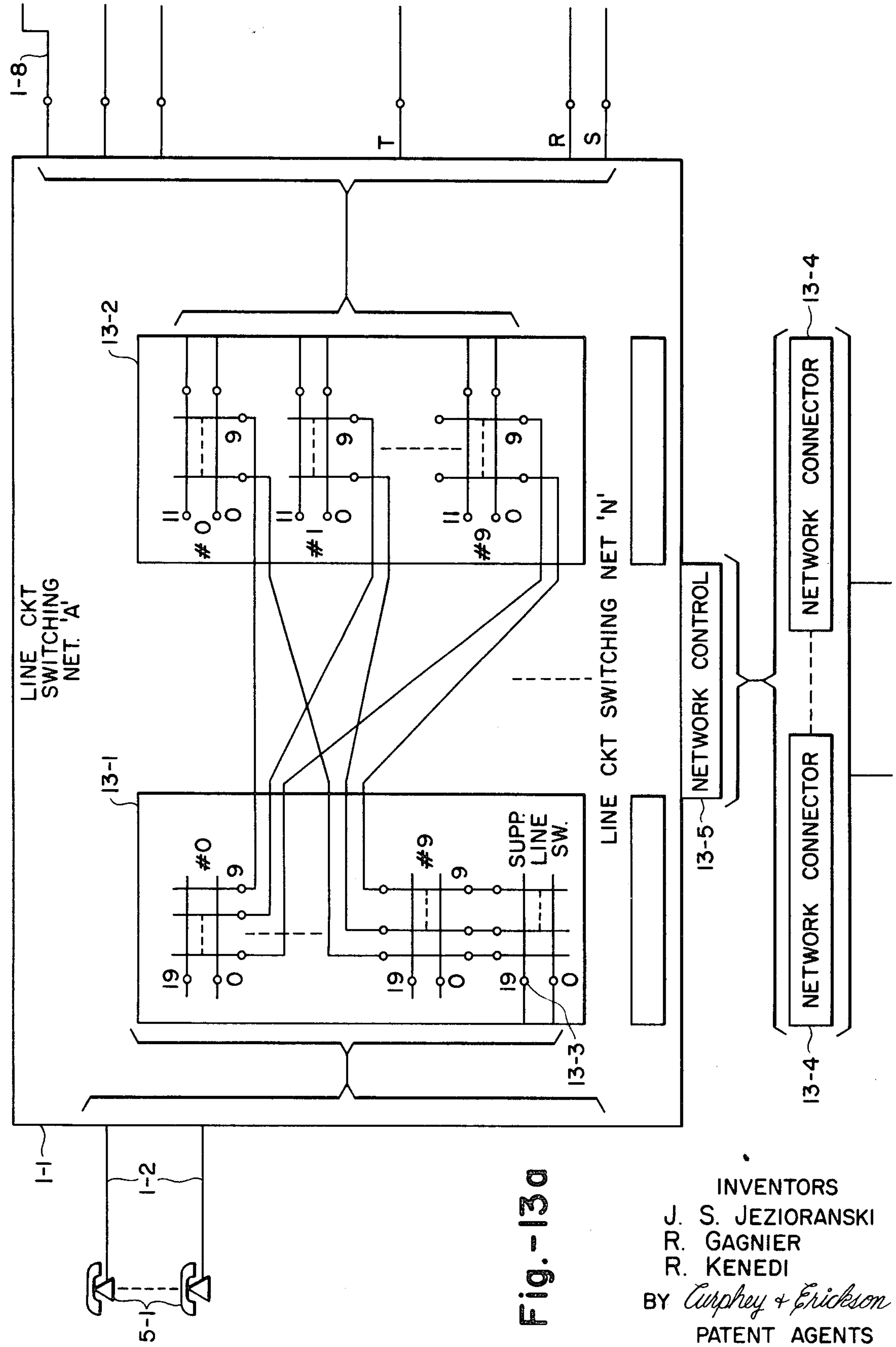
Figure 13B:
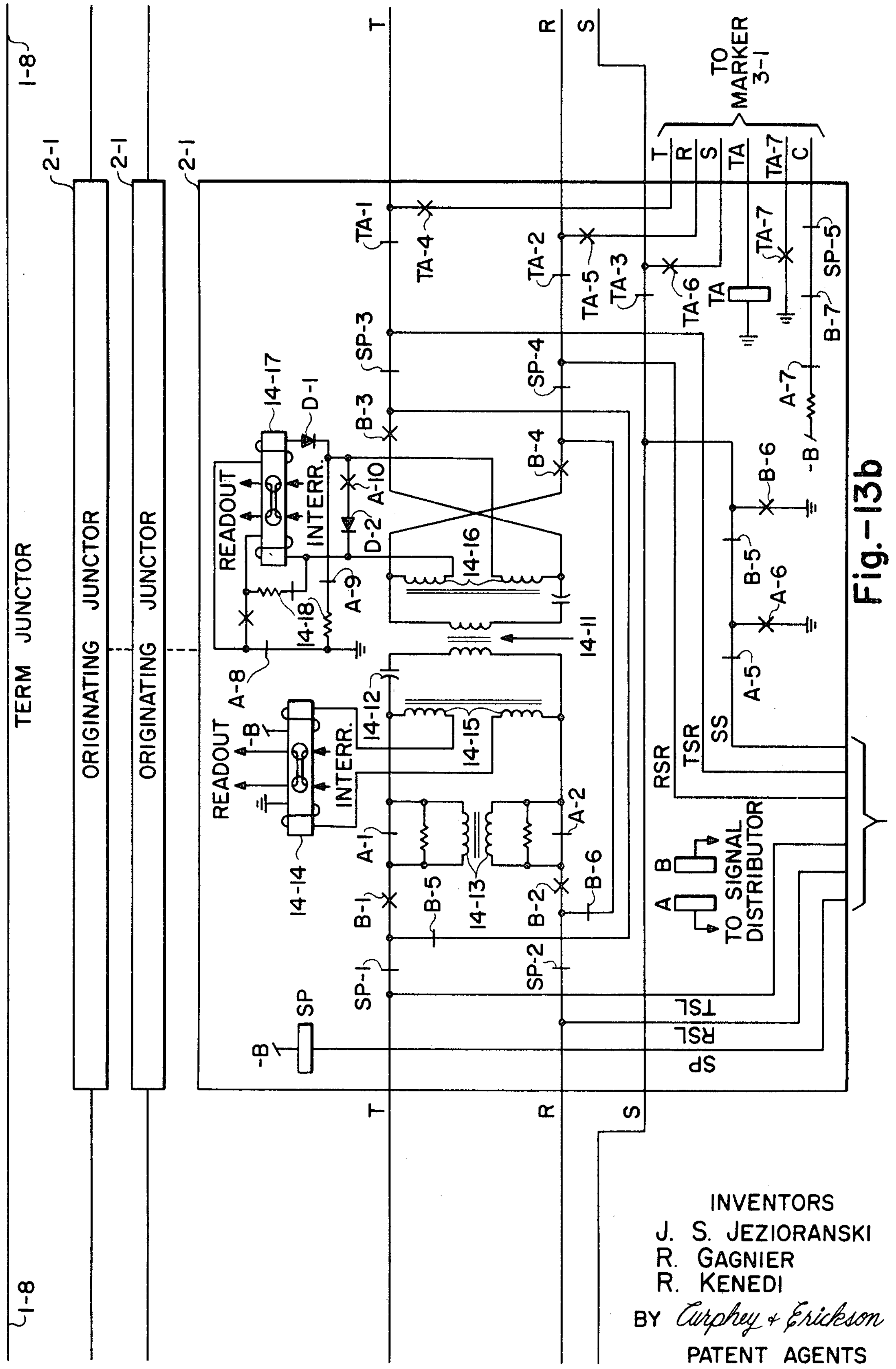

With the wiring pattern shown in FIG. 13, this permits access by each of 400 subscriber line circuits 1–2 (to 20 horizontals X 20 switches) to each of 120 output terminals connected to originating and terminating junctors (from 12 horizontals X 10 switches). The capacity of the line link network can be increased to, say, 600 subscribers lines by adding a supplementary line switch 13–3 to each pair of line switches, as shown attached to line switch No. 9. Since in this embodiment the system can accommodate up to 63 line link frames, the physical line capacity can be as high as 37,800 subscribers lines.

The 120 output terminals of a line junctor switch array 13–2 connect to a group of up to 60 originating junctors 2–1 and 60 terminating junctors 1–8. The junctors are further divided into groups of 10 junctors each, one junctor per group connected to each of the 10 line junctor switches. A set of originating junctors 2–1 from each line link frame interconnects that frame with two to six originating route link frames in the originating route switch array 14–1 of the route network 1–3, as well as two to six originating service link frames 14–2 of the service network 2—2, depending on the number of originating junctors 2–1 assigned per line link frame. The terminating junctors 1–8 associated with each line link frame interconnect that frame with two to six terminating route link frames of the terminating route switch array 14–3 of the route network 1–3. The number of junctors and the interconnection pattern depends on both the office size and the office traffic characteristics.

The route network 1–3 is built up of route link frames or route switching arrays in two sections, an originating section and a terminating section. The originating section is comprised of an originating route switching array 14–1, and an originating route junctor array 14–4 interconnected by originating route links 14–5. The terminating section is comprised of terminating route switch array 14–3 to which are connected the terminating junctors 1–8, and terminating route junctors array 14–6. The terminating route switching array 14–3 and terminating route junctor array 14–6 are interconnected by a terminating route link 14–7. The originating route junctor array 14–4 and terminating route junctor array 14–6 are interconnected by route junctor 14–8.

The originating route switching array 14–1 is made up in this embodiment of 10 originating route crossbar switches, and the originating route switching array 14–4 is made up of 20 originating route junctor switches. Each originating route switch is a complete 20 vertical crossbar switch. However, similar to the line circuit switching network 1—1, only three-wire circuits are required and therefore 10, six-wire horizontal levels of each crossbar switch can provide for the connection of 20 originating junctors and/or incoming trunks.

The originating route junctor switches are wired in the same manner as the line junctor switches, giving the effect of a switch which, through three cross-points, can connect any one of 10 inputs to any one of 12 outputs. The originating route links 14–5 are six-wire, and a total of 200 are used.

The wiring pattern of the originating route switch array 14–1 and originating route junctor array 14–4 with the originating route links 14–5 is such that 200 originating junctors and incoming trunks connected to the horizontals of the originating route switching array can connect to 240 outputs on the horizontals of the originating route junctor array. These are connected to the route junctors 14–8.

The arrangement of the terminating route junctor array 14–6 and the terminating route switch array 14–3 is the mirror image of the originating route switch array and originating junctor array, whereby 240 route junctors 14–8 are connected to 200 terminating junctors 1–8 and/or outgoing trunks. Each particular connection from an originating junctor or incoming trunk can occur for only one path through four cross-points in each of the arrays to a terminating junctor or outgoing trunk. Since each route network can accommodate up to 24 originating route switch arrays, the maximum number of inputs to it in this case is 4,800. The same is true for the number of output transmission paths to terminating junctors or outgoing trunks since the terminating route link network is the mirror image of the originating route link network.

The service network 2—2 interconnects originating junctors 2–1 with service circuits 2–3. While the line link switching network 1—1 is interconnected through originating junctors 2–1 to the route network 1–3 via three-wire links, the service network interconnects the originating junctors and service circuits via six-wire links.

Figure 14A:
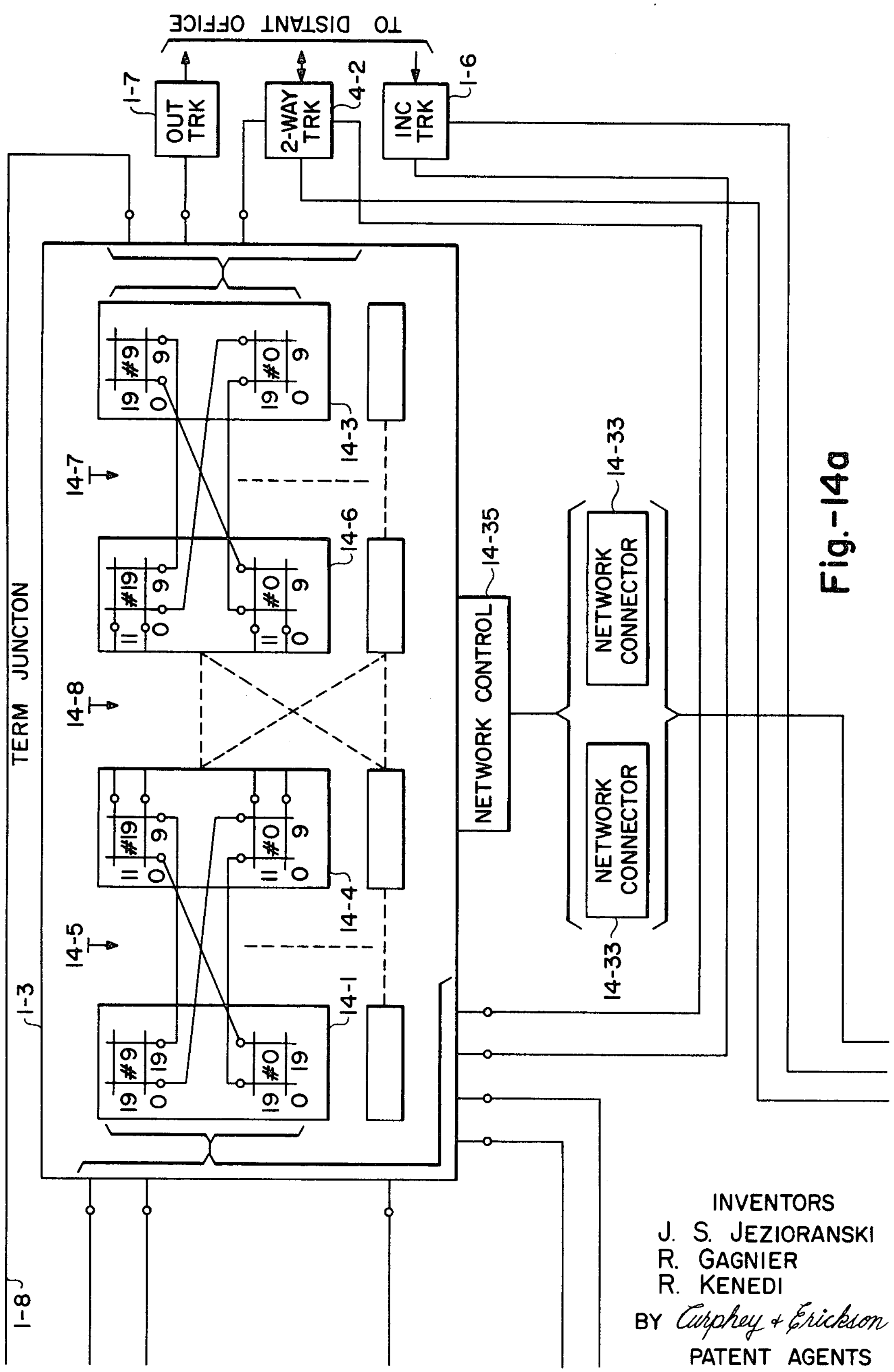
Figure 14B:
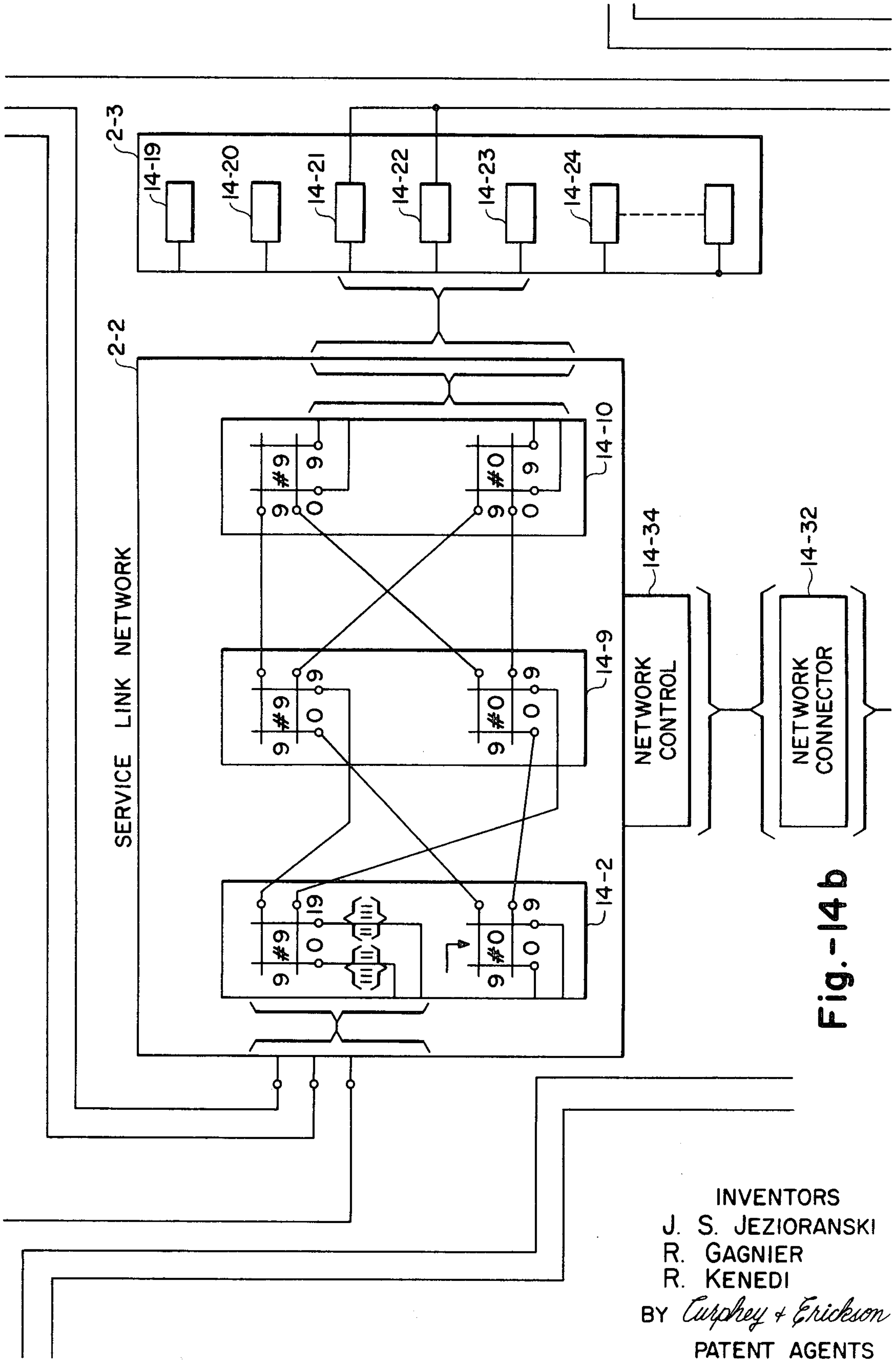

The service network is comprised of three stages, an originating service switch array 14–2, a service link switch array 14–9, and a terminating service switch array 14–10. Each of the arrays is comprised of 10 crossbar switches, and may be wired as shown in FIG. 14. Therefore, each of 200 input terminals connected to the verticals of the originating service switch array crossbar switches can be connected to each of 100 output terminals connected to the verticals of the terminating service switch array crossbar switches, which are connected to the service circuits 2–3. Extension of the basic service network may be achieved in a similar manner to the extension of the basic line circuit switching network. Supplementary switches can be multiplied with the basic originating service crossbar switches by interconnecting the horizontals of related switches. Nominal service network capacities, for instance when using two supplementary switches, can thus be 200, 400 or 600 input terminals, competing for 100 service circuits. Since in this embodiment the telephone switching system can accommodate up to eight service link networks, it could allow up to 4,800 originating junctors and/or incoming trunks to reach up to 800 service circuits. A crossbar switch useful for switching network application is manufactured by Northern Electric Co. Ltd., and was described in the Proceedings of the I.E.E.E. International Conference on Communications, June 12, 13 and 14, 1968, by H. J. DeSmet et al., entitled "A New Miniature Crossbar Switch and its Applications."

The originating junctor 2–1 interconnects the line circuit switching network 1—1 and the route network 1–3 via three-wire circuits, herein labeled T (tip), R (ring), and S (sleeve) leads. Six-wire circuits interconnect the originating junctor 2–1, the service link network 2—2 herein labeled TSL, RSL, SP, TSR, TSS, and SS. As mentioned earlier, the purpose of the originating junctor is to provide transmission paths at predetermined times between the line circuit switching network and route network, or from either or both of the networks to the service network. It can provide talking battery to a transmission path during intraoffice calls, or back to the calling line only during outgoing calls, as well as perform supervision of an incoming trunk from a distance office. Metallic paths between the networks or alternating current paths only can be provided. The marker can gain access to the tip, ring and sleeve leads in order to perform tests, and the scanner has access via ferrod sensors. Latching relays are also included in each individual circuit so that operation can be effected from the signal distributor.

FIG. 13 includes a detailed schematic of an originating junctor 2–1. The circuit comprises an A and B relay operable by the signal distributor, to provide four input states for the originating junctor. An additional SP relay is provided which is operable by a service circuit via an SP lead.

The tip and ring leads from the line circuit switching network 1—1 are continuous through a pair of break contacts SP–1 and SP–2 of the SP relay, a pair of make contacts B–1 and B–2 of the B relay, a pair of break contacts A–1 and A–2 of the A relay, to the primary of transformer 14–11. The tip lead also contains capacitor 14–12 as shown. Transformer 14–11 acts as an impedance matching network which provides alternating current coupling between the calling and the called side of the circuit.

In parallel with break contacts of A–1 and A–2 of the A relay is network 14–13, which can be comprised of a transformer with resistors in parallel with each of the windings, each winding being connected across a respective A relay break contact. This network is provided in order to compensate subscribers line impedances, so that they will present an approximately fixed impedance to the switching office at all frequencies within the voice spectrum.

A ferrod sensor 14—14 is also connected to the tip and ring leads on the primary side of transformer 14–11 through inductors 14–15. The ferrod sensor is comprised of a write winding or pair of windings, an interrogate winding, and a readout winding. One of the inductors 14–15, for instance the one connected to the ring lead, is connected via one of the pair of write windings to ground, while the other inductor 14–15 is connected via the other write winding of the ferrod sensor to a source of potential B, for instance –48 volts. Inductors 14–15 should be of high impedance so that they will effectively provide a high-impedance bridge; thus the ferrod sensor will not impair transmission on the talking path, comprised of the tip and ring leads.

The tip and ring leads extending from the route network 1–3 are continuous via SP relay break contacts SP–3 and SP–4, a pair of make contacts B–3 and B–4 of the B relay, to the secondary of transformer 14–11, through interposed leads. Inductors 14–16 connected to the tip and ring leads are also connected to the write windings of ferrod sensor 14–17. The other ends of the write windings are connected to ground.

The tip lead is also connected from between contacts B–3 and SP–3 through break contact B–5 of the B relay to the tip lead between contacts B–1 and SP–1. The ring lead is connected from between contacts B–4 and SP–4 to the ring lead between contacts B–2 and SP–2 via break contact B–6 of the B relay. The sleeve lead is a continuous metallic conductor between the line circuit switching network 1—1 and route network 1–3.

To the tip and ring leads on the line circuit switching network side of the SP–1 and SP–2 contacts are connected leads TSL and RSL which comprise two of the six leads leading from the originating junctor to the service network 2—2. To the tip and ring leads connected on the route network side of the SP–3 and SP–4 contacts are leads TSR and TSS, which make up two more of the six leads leading to the service circuit. An SP lead, the fifth, is connected to an SP relay which is also connected to a source of potential B, for instance –48 volts, and the sixth lead SS is connected to the sleeve lead via break contacts A–5 of the A relay and B–5 of the B relay. A make contact A–6 of the A relay connects the SS lead between break contacts A–5 and B–5 to ground, and make contact B–6 connects the sleeve lead to ground.

All six leads, TSL, RSL, TSR, TSS, SP, and SS may be connected via six-wire contacts in the crossbar switches in each of the three arrays of the service network 2—2 to a service circuit 2–3.

The marker 3–1 has access to the originating junctor, but this will be described later below. However, it will be noted that a lead to the marker is connected from a source of potential B via break contacts SP–5 of the SP relay, B–7 of the B relay and A–7 of the A relay and a resistor, in series. When either one or both of relays A and B are operated, battery is removed from lead C to the marker, thus giving a busy indication to that unit.

The originating junctor is not required for supervision, relay A is operated by the signal distributor to make it busy, and the circuit is then in the bypass state. In this condition, make contacts B–1 and B–2 are open circuited, and break contacts B–5 and B–6 are closed. Therefore a continuous path exists between the tip and ring leads between the line circuit switching network 1—1 via the bypass leads, to the route network 1–3. It may be seen that a metallic transmission path now exists between the line circuit switching network and route network, while battery is removed on the C lead giving an indication to the marker that the originating junctor is busy. A holding ground for the hold magnets in the crossbar switches which may be operated is provided via make contact A–6, on the sleeve lead.

Thus it may be seen that when neither A or B relays are operated, the circuit is idle and battery is provided to the marker on the C lead as an indication of this fact. When either or both A or B relays are operated, the originating junctor is indicated as being busy; when relay A is operated alone the circuit is not required for supervision and it is in a bypass state. When only relay B is operated, the circuit is ready for use on an intraoffice call, and when both relays are operated the circuit is set up for use on an outgoing call.

When dialed digits indicate to the central processing unit that the call is an intraoffice call, then relay B is operated in the originating junctor 2–1 by the signal distributor 3–7. The operation of the B relay also connects ground to the sleeve lead via make contact B–6, and this connection is used as a holding ground for the hold magnets in the crossbar switches of the route network and the line circuit switching network. With relay B operated, the originating junctor also provides supervision for both the originating and terminating sides of the connection via ferrod sensors 14–4. In this case, transmission paths from the tip and ring leads exist via make contacts B–1 and B–2, break contacts A–1 and A–2 to the inductor 14–15 which leads to ferrod sensor 14–14. Make contacts B–5 and B–6 are open circuited, thus cutting the metallic bypass path around transformer 14–11.

The originating junctor is used for the supervision of both interoffice and intraoffice calls. Because of the long transmission lines encountered in interoffice calls, ferrod sensor 14–17 is made more sensitive than ferrod sensor 14—14. However, ferrod sensor 14–17 can also be used for intraoffice calls in which case the extra sensitivity is not required. Thus, with relay B only operated, resistors 14–18 are connected in parallel with the write windings of ferrod sensor 14–17, since the break contacts A–8 and A–9 provide a through circuit, while make contacts A–10 and A–11 are open circuited.

For outgoing calls, relays A and B are operated, and with make contacts A–10 and A–11 closed, and make contacts A–8 and A–9 open, resistors 14–18 are effectively out of the circuit.

For outgoing calls, the originating junctor supervises the outgoing side of the call but does not supply talking battery to the outgoing trunk. Thus the control windings of ferrod 14–17 are connected together via contacts A–11 and A–10. Diodes D–1 and D–2 polarize the ferrod sensor 14–17 so that battery reversals initiated from a distant office can be detected by the scanner.

Contacts A–1 and A–2 in the tip and ring leads are also open circuited so that network 14–13 effectively equalizes the now larger line impedance of the originating subscriber's loop. As described above, a busy indication is provided on the C lead, and holding ground is extended to the sleeve lead.

Tests can also be made by the marker via the originating junctor towards the terminating end of the transmission path from calling to called party, that is, toward the called party subscriber's loop. The marker can supply battery on a TA lead which is connected to a TA relay in the route network network control, shown here in the originating junctor block, this relay also being connected to ground. The TA relay operates break contacts TA–1, TA–2, and TA–3 in the tip, ring and sleeve leads respectively which isolates the originating junctor from the tip, ring and sleeve leads leading to the route network 1–3, and operates make contacts TA–4, TA–5, and TA–6 which extends the tip, ring, and sleeve leads to the marker. The make contact TA–7 also extends ground on the TA–7 lead to indicate back to the marker that the TA relay has in fact operated.

Connected via 6 wire links through the service network 2—2 to the originating junctors leads TSL, RSL, SP, TSR, TSS and SS are the service circuits 2–3. As mentioned earlier, typical service circuits are an originating digit receiver 14–19 for receiving dial pulse or multifrequency digits from calls originating on this switching system, an incoming digit receiver 14–20 which is arranged to receive multifrequency digit information from incoming trunks to this switching office, a dial pulse transmitter 14–21, for transmitting dial pulses via outgoing trunks to other switching offices, such as a step-by-step office, a multifrequency transmitter 14–22 for transmitting multifrequency dialing signals, a common ringing circuit 14–23 for ringing current generation, and special ringing circuits 14–24, for instance for multiparty calls.

FIG. 21 shows the essence of the contents of an originating digit receiver 14–19 in detail. Both the TSL and TSS tip leads and RSL and TSR ring leads are continuous via contacts which will be discussed below to a pair of windings on an LL relay, the windings also being connected to a source of potential B, for instance –48 volts, and ground respectively. These leads are continuous to the LL relay via the primary of a transformer 21–1, the secondary of the transformer is connected via contacts to be explained below, to a tone source, for instance of common dial tone which may be obtained from a well-known tone distribution circuit, not shown.

Also shown in FIG. 21 are latching relays AA, BB, CC, DD, and EE which are shown as being generally operated from the signal distributor. Since the means of operating the relays from the signal distributor will be described with respect to that circuit, the details of operating them are not shown in this figure.

Ferrod 21–2, part of the scanner (as all ferrods described herein are part of) is connected between a source of potential and ground via contact LL–1 of the LL relay. Make contacts AA–1, BB–1, CC–1, DD–1, and EE–1 are connected in parallel between the extended tip and ring leads leading to the primary of transformer 21–1. A break contact HG–1 of an HG relay is also connected in series with the common lead from the aforementioned AA–1 to EE–1 contacts. Therefore, it may be seen that with the HG relay unoperated and any of AA–1 to EE–1 contacts closed, current will flow around a circuit through the aforementioned contacts, the primary of transformer 21–1 and the LL relay to a source of potential and ground. Thus the LL relay will operate.

The HG relay operates from extended sleeve lead SS via make contacts AA–2 of the AA relay and BB–2 of the BB relay in parallel. Therefore, when ground is extended to the sleeve lead, the HG relay is caused to operate as long as either of the AA or BB relays is operated. A make contact HG–2 is connected between the sleeve lead SS and ground, and make contact HG–3 is connected between the SP lead and ground. Therefore, when the HG relay is operated ground is extended to the SP relay in the originating junctor 2–1, causing the SP break contacts SP–1 to SP–4 to operate therein. This extends the tip and ring leads from both the line circuit switching network and route network through the service network to the originating digit receiver 14–19 and cuts off transmission between the line circuit switching network 1—1 and route network 1–3 through the originating junctor 2–1.

In operation, when a request for a dial pulse receiver circuit 14–19 is received by central control 3–2, an idle digit receiver 14–19 would be selected and by means of the signal distributor 3–7 common relay AA and the dial pulse receiver circuit would be operated. With relay AA operated, contact AA–1 is closed allowing current to flow through relay LL as described above, causing it to operate. With the LL relay operated, the LL–1 contact is closed, allowing ferrod 21–2 to become saturated. As this ferrod is in the scanner, an indication is returned to central control that relay LL has operated by virtue of the fact that ferrod 21–2 is sensed as being saturated.

Also, with relay AA operated, contact AA–2 is closed, extending an operation path for the HG relay to the sleeve lead in the originating junctor 2–1. Since at this time the hold magnets of at least the line circuit switching network are operated via their control circuit, a ground is present on the sleeve lead, and this is extended to the HG relay via the SS lead, causing the relay to operate. This operation causes the HG–2 contact to close, locking up the HG relay to ground via closed make contact AA–2. Holding ground is thus extended to the sleeve lead in the originating junctor which only can be removed by operation of the A–5 or B–5 break contacts in the originating junctor, or opening of the AA relay without the BB relay having operated. Therefore, the service network having been operated by its control circuitry from the marker, the HG relay will provide a holding ground on the sleeve lead to maintain the network crossbar switch hold magnets operated.

Since the HG–1 break contact has also operated with the HG relay, the operation path for the LL relay through the AA–1 make contact is broken, causing it to open, the LL–1 contact to open, and ferrod 21–2 becomes unsaturated. Information as to this desaturation is transmitted to central control via the scanner which records the state of the circuit.

The marker 3–1 then tests the service network transmission path, which circuitry is not shown since it is well known. Relay BB is then operated via the signal distributor on instructions from central control. Make contacts BB–3 and BB–4 in series with the TSL and RSL leads to the tip and ring leads leading to the line circuit switching network 1—1 are closed. An alternating current path is thus extended from the source of dial tone via transformer 14–25, and the TSL and RSL leads through the tip and ring leads to the line circuit switching network 1—1 and the calling subscriber. Since a dial tone and direct current path is complete from relay LL to the calling subscriber, relay LL is caused to operate and therefore ferrod 21–2 is driven into saturation. This ferrod thus provides central control with the supervisory information relating to the completion of a direct current path to the calling subscriber.

The subscriber then begins dialing, and as he dials the first digit, relay LL responds to the pulsing, i.e., the opening and closing of the subscriber's line, by opening and closing in sequence with the pulses, causing ferrod 21–2 to become intermittently unsaturated in response. By counting the pulses, central control determines what number or signal that the dialed digit is intended to designate. After the first digit has been received, and recognized as such, by timing the interdigital interval, the central control will initiate the release of relay AA via a signal distributor. Make contacts AA–3 and AA–4 which are in series with the source of dial tone and its corresponding winding of transformer 21–1 will therefore open and cut off dial tone which was being sent to the calling subscriber. Break contact AA–5 inserts a terminating network for impedance matching purposes across the winding of transformer 21–1.

After all the digits have been received, central control will initiate the release of relay BB via the signal distributor. Releasing relay BB will cause make contacts BB–3 and BB–4 to open, opening the operation path from the calling subscriber's line to the LL relay, causing the ferrod 21–2 to become unsaturated in response. Relay HG, having had its last operation path, after the release of contact AA–2, opened by the release of contact BB–2, will also release. Relay HG released causes the opening of the extension of ground, via make contact HG–2, to the service network via the SS lead, releasing the associated service network crossbar switch hold magnets. Central control is now prepared to proceed further with the call.

For subscribers who have multifrequency dialed telephone sets, multifrequency detection circuitry 21–3 is connected in parallel with the extended tip and ring leads as shown. Shown in FIG. 21 are eight ferrod sensors 21–4 (2) to 21–4 (9) used to indicate to central control which tone or combination, and therefore which digit has been dialed by the subscriber. From each of the leads to the 21–4 ferrods is a lead to OR-gate 21–5, the output of which leads to "signal present" ferrod 21–6. When the first digit is detected, ferrod 21–6 becomes unsaturated, giving an indication to central control via the scanner that it should examine the saturation states, the digital outputs, from ferrods 21–4(2) to 21–4(9). The remainder of the circuit operates in a similar manner to that described above with respect to dial pulse, with the exception of the pulsing of relay LL and ferrod 21–2. Relay AA is similarly released after the first multifrequency digit has been received. After all the digits have been received, central control will initiate the release of relay BB. Releasing relay BB will cause the ferrod 21–2 to become unsaturated and will also release relay HG. Relay HG released will release the associated service network connection as described earlier.

Means are also provided in this circuit to determine the correct type of party in a "two-party" class of service-type subscribers line. In this situation, to distinguish between parties the subscribers have either a tip or ring lead connected to ground. In order to determine which of the two parties is requesting service, a TP relay is connected to the tip lead TSL as shown.

Assuming that the circuit has progressed in operation in a similar manner to that described above with respect to a single party, let us assume that the AA relay and HG relay are operated, and the service network connection has been established by the marker, the hold magnets of the crossbar switches thereof being held by the HG–2 contact to ground from the SS sleeve lead. Since the central control had located the calling subscribers line in order to establish the transmission path from the digit receiver thereto, it also has an indication of the class of service with the class of service mark in its memory indicating a "two-party" subscribers line, central control initiates the operation of relay CC via the signal distributor. Relay TP is connected between a source of potential and make contact CC–1 to the tip lead, and therefore operation of the CC relay will connect relay TP thereto. Operation of relay CC will also cause break contacts CC–2 in the TSL lead to open, isolating the tip lead TSL from the remainder of the digit receiver circuitry.

A ferrod 21–7 is connected between a source of potential such as —48 volts, via a make contact TP–1, to ground. Therefore, operation of the TP relay will also cause ferrod 21–7 to be driven into saturation. Relay TP of course, will only operate if a ground is actually present on the tip lead TSL from the subscriber's line. If ground appears on the ring lead, RSL, the TP relay will not operate. Therefore, operation of the TP relay can indicate that the "tip" party has initiated the call rather than the "ring" party. If the TP relay operates, ferrod 21–7 saturates from current flowing through the now complete conductive path through make contact TP–1 to ground, and therefore an indication is given to the central control via the scanner that it is the tip party which has requested service.

After recognizing that a tip party has requested service, central control initiates the release of relay CC via the signal distributor after an appropriate time period of, say, 190 milliseconds to 350 milliseconds. This releases the operation path of the TP relay from the TSL tip lead, and restores a complete circuit from the TSL lead into the remainder of the originating digit receiver due to the closing of break contact CC–2.

Central control, from its resident program, next initiates the operation of relay BB via the signal distributor. Operating relay BB will cause dial tone to be extended to the calling subscriber via the complete transmission paths provided via make contacts BB–3 and BB–4. Operation of the BB relay will also cause another operation of the TP relay via make contacts BB–5 and AA–6 which are connected between the TP relay and the ground. Ferrod 21–2 will also saturate due to the operation of the LL relay via the extended tip and ring leads TSL and RSL. Relay TP operating will cause ferrod 21–7 also to become saturated, for the second time.

As described earlier, when the subscriber dials, relay LL responds to the pulses and ferrod 21–2 intermittently becomes unsaturated in a manner representing the pulses which make up the digit. After the first digit has been received, central control will initiate the release of relay AA via the signal distributor, causing the removal of previously applied dial tone, and also will cut off relay TP by opening contacts AA–7. With relay TP released, ferrod 21–7 becomes unsaturated.

If the calling subscriber should use a multifrequency dialed telephone, the signal representing the first digit is detected as described earlier, and ferrod 21–6 becomes unsaturated. The signal is an indication that the central control should examine ferrods 21–4 (2) to 21–4 (9) for the dialed number.

If the call is to be free of charge, a second operation of the TP relay is dispensed with. In this case, the central control will initiate release of relay BB, which in turn will release the associated service network connection by the release of relay HG and contact HG–2. If, however, the call is to be charged, central control will initiate the operation of relay CC as described above. Operating relay CC will connect relay TP to the line for a second "tip party" test and will also cause ferrod 21–2 to become unsaturated due to the opening of contacts CC–2. The second test should confirm the first test. After the second test, central control will initiate the release of relay CC, which will cause operation of the LL relay due to its connection to the calling subscribers line via closed contact CC–2. Ferrod 21–2 will then become saturated. Then relay BB will initiate the release of these associated service network connections as described above.

If the class of service associated with the calling subscriber allows telephone system response to a hookswitch flash, the sequence of operation will be similar to that followed with respect to the response to a single-party initiation of dialing. If the call is outgoing from the switching office, the setting up of the service network connection, including the operation of relay AA is also similar. However, after the marker completes its function, central control will initiate the operation of relay EE via the signal distributor. The outgoing portion of the call is terminated in leads TSR and RSR. Connected effectively across leads TSR and RSR is make contact EE–1 of the EE relay in series with a pair of resistors RR1 and RR2. Therefore, when relay EE operates a termination is placed on the trunk loop connected to leads TSR and RSR leading to the route network. The central control next initiates the operation of relay BB via the signal distributor which will cause completion of the dial tone path to the calling subscriber as described earlier. An operation path for the TP relay is also completed, which causes ferrod 21–7 to become saturated from current flowing via make contact TP–1.

Since the dial tone path is now completed, relay LL operates and consequently ferrod 21–2 becomes saturated. Thus ferrod 21–2 provides central control with supervisory information pertaining to the calling subscriber. As the subscriber dials the first digit, relay LL responds to the pulsing and thus ferrod 21–2 becomes intermittently unsaturated. The unsaturated periods represent the pulses which make up the digit. By counting these pulses via the scanner, central control is able to determine the dialed digit, as described earlier.

After the first digit has been completely received, the central control initiates the release of relay AA via the signal distributor. This stops dial tone from being sent out to the calling subscriber as described earlier, and also releases relay TP which in turn causes ferrod 21–7 to become unsaturated.

If a calling subscriber should be using a multifrequency dialed telephone set, the signal representing the first digit is detected and ferrod 21–6 becomes unsaturated. This indicates to central control that it should examine the digital outputs from ferrods 21–4 (2) to 21–4 (9). Relay AA is released as earlier described, after the first digit. When all the digits have been received, the central control will initiate the release of relay EE and then relay BB. Releasing relay BB will in turn release relay HG since its operation path via contact BB–2 is open circuited. Relay HG released will in turn release the service network connection.

If the terminating or the called subscriber initiates a flash during an intraoffice or incoming call, the service network connection is established as described earlier up to the operation of relays AA and HG. Then, after the marker completes its function, the central control will initiate the operation of relay DD. Operation of relay DD causes transfer of the detection circuitry to leads TSR and RSR, the terminating end of the transmission path leading to the route network, via make contacts DD1 and DD2 and break contacts DD3 and DD4. A source of potential, for instance −48 volts, is connected via break contacts EE-2 and EE-3 of the EE relay and make contacts DD5 and DD6, to the originating end of the transmission path, to leads TSL and RSL. The source of potential and ground are isolated from the terminating leads TSR and RSR via break contacts DD7 and DD8.

The central control next initiates the operation of relay BB via the signal distributor, which causes completion of the dial tone path to the "flashing" subscriber via make contacts BB-3, BB-4, BB-6 and BB-7. Relay TP therefore closes via contacts BB-5 and AA-6, and results in ferrod 21-7 becoming saturated via a current path flowing through make contact TP1.

Since the dial tone path to the "flashing" subscriber now is extended, relay LL operates and consequently ferrod 21-2 becomes saturated. Thus ferrod 21-2 provides central control with supervisory information pertaining to the subscriber that initiated the flash. As the subscriber dials the first digit, relay LL responds to the pulsing and thus ferrod 21-2 becomes intermittently unsaturated. The unsaturated periods are related to the pulses which make up the dialed digit and thus by counting the pulses, central control determines the dialed digit. After the first digit has been received, the central control initiates the release of relay AA which removes dial tone, as described above, and also causes the release of relay TP since contact AA-6 opens. Therefore ferrod 21-7 becomes unsaturated.

If the "flashing" subscriber uses a multifrequency dialed telephone, the signal representing the first digit is detected and ferrod 21-6 becomes unsaturated. This indicates to central control that it should examine the digital outputs from ferrods 21-4 (2) to 21-4 (9). Relay AA is released as described earlier, after the first digit has been received. After all the digits have been received, central control initiates the release of relay DD and then relay BB. Relay BB released causes the release of relay HG in the manner described earlier, which in turn causes release of the associated service network connection.

Returning to FIGS. 13 to 20 again, the incoming digit receiver 14-20 is designed to receive and transmit to central control via ferrods in the scanner multifrequency signals which originate from an operator key set or from multifrequency transmitting equipment, for instance those arriving from an incoming trunk. This type of receiver is well known, and is generally similar to that shown in the U.S. Pat. No. 3,570,008 issued Mar. 9, 1971 to R. W. Downing, et al. Central control responds by issuing orders to the switching system in accordance with prestored programs and the current supervisory states of the elements in the system, in a generally similar manner to that described with reference to the originating digit receiver 14-19.

FIG. 22 shows another service circuit, a dial pulse transmitter 14-21 which provides a means of transmitting digital information on a dial pulse basis to distant step-by-step, or crossbar offices, operating on step-by-step and sender class calls in conjunction with one-way and two-way trunk circuits.

On a step-by-step or a sender class call, a dial pulse transmitter 14-21 is connected to an originating junctor 2-1 via the service network 2—2. The originating junctor circuit is then connected to the outgoing route network 1-3. When the route network connection is established, the dial pulse transmitter provides a loop termination or holding bridge which is connected to the transmission path leading to the distant office via the route network. The connection of this bridge is recognized by a distant office as a seizure signal. During seizure, the dial pulse transmitter determines the polarity of the loop and whether the loop is continuous, by means of ferrod sensors, and recognizes a "start pulsing" signal also be means of the ferrod sensors. On a step-by-step class of call, on-hook polarity is translated as a start pulsing signal; off-hook polarity is translated as a reversed trunk. On a sender class call, the system awaits a wink start pulsing signal, which is recognized as a transition from off-hook to on-hook.

When the central control has determined that connection must be made to a dial pulse transmitter, it selects and seizes one which is idle initiating its operation by causing relay A-3 to operate via the signal distributor 3-7. Relay A3, being an electrically latched relay, operates between the signal distributor and a source of potential. In response, ferrods 22-1, 22-2, 22-3, and 22-4 are caused to operate as will be described below. Tip and ring leads TSR and RSR leading via the service network 2—2 to the route network 1-3 are connected to a bridge circuit consisting of resistor 22-5, inductor 22-6, varistors 22-7 and 22-8 and diode 22-9 to ferrods 22-1 and 22-2. The tip and ring leads are also respectively connected to a source of potential −B and ground by make contacts A3-1 and A3-2 of the A3 relay. Thus, it may be seen that with relay A3 operated, a continuous conduction path exists from the source of potential −B through contact A3-1, the tip lead TSR, resistor 22-5 and inductor 22-6, diode 22-9, ferrod 22-2, ferrod 22-1, the tip lead, make contact A3-2 of the A3 relay to ground. Therefore, ferrods 22-1 and 22-2 are caused to saturate.

Ferrod 22-3 is connected continuously from a source of potential −B through make contacts A3-3 of the A3 relay to ground. Therefore, ferrod 22-3 is also caused to saturate.

Tip and ring leads TSL and RSL leading via the service network to the line circuit switching network 1—1 are connected via inductors 22-10 to ferrod 22-4. Connected across the tip and ring leads also is make contact A3-4. Therefore when the A3 relay is operated, there is a continuous path from the source of potential, through ferrod 22-4, inductor 22-10, the ring leads RSL, contact A3-4, the tip lead TSL, inductor 22-10, and ferrod 22-4 to ground. Ferrod 22-4 is thus caused to saturate when relay A3 operates.

With ferrods 22-1 to 22-4 saturated, central control is thus provided a continuity check via scanner 3-6. With the continuity checked, central control causes the marker to establish a service network connection between the dial pulse transmitter 14-21 and the originating junctor 2-1, which is connected through the route network 1-3 to an outgoing trunk 1-7. The sleeve lead SS is therefore connected to ground by the marker as described earlier with respect to the dial pulse receiver circuit, in order to close the hold magnets of the crossbar switches in the service network 2—2. The sleeve lead is connected via make contacts A3-5 of the A3 relay to an HG3 relay, also connected to a source of potential −B. Since the sleeve lead has been connected to ground by the marker, and the A3 relay has operated, the HG3 relay is caused to operate, causing the HG3-1 contact to close between the sleeve lead and ground. This causes the HG3 relay to lock up via contact A3-5, and also places a continuous ground on the sleeve lead in order to keep the hold magnets operated while the marker releases.

Break contacts HG-2 and HG-3 of the HG3 relay are connected between contacts A3-1 and A3-2 and the tip and ring leads TSR and RSR. Therefore, when the HG3 relay operates, the operation path for ferrods 22-1 and 22-2 is broken and they unsaturate. Break contact HG3-4 in the present operation path of ferrod 22-3 also breaks the complete circuit through that ferrod, causing it also to unsaturate, as does break contact HG3-5 with respect to ferrod 22-4. Therefore, the operation of relay HG3 removes the saturation current in ferrod sensors 22-1 to 22-4, and provides a holding ground for the service link network after the marker has released.

An IC relay is connected via make contact A3-6 to ground, and to an interface circuit 21-11. The interface circuit 21-11 provides means of operating and releasing relay IC directly from the peripheral bus 4-1 and it contains a bus receiver it will be described later. Relay IC can thus be accessed directly from central control and the slower signal distributor intermediary is not used. Relay IC is used to start a pulse generator and thus control the output of the dial pulse transmitter.

A dial pulse is usually in the form of an interruption of loop current. When the pulse generator is operated, the loop closes and when the pulse generator is released, the loop opens. The critical timing of the pulse length is provided by the pulse generator, and the number of pulses and the interdigital interval is determined by central control and by the relay IC operating in response thereto. A description of the operation of the pulse generator follows.

When relay IC operates, make contact IC–1 closes and provides a conduction path to the secondary winding of relay PG from ground to a source of potential –B. Relay PG, having a complete operation path from a source of potential, then operates. With relay PG operated, make contact PG–1 is closed causing a complete conduction path from ground, through contacts IC–1 and PG–1 through the P relay to a source of potential –B. The P relay therefore operates. When the P relay operates, break contact P–1 and make contact P–2 close and open respectively, transferring ground to capacitor C3–1. The current in the secondary winding of relay PG now flows in a direction such as to release relay PG, but current in the primary winding charging capacitor C3–1 is flowing in a direction such as to hold relay PG operated. Initially, the primary winding ampere-turns are more powerful and the relay becomes operated, but, as the capacitor becomes charged, the primary winding ampere turns decrease and finally the secondary ampere turns become controlling such as to cause relay PG to release. This causes relay P to release due to the release of make PG–1. Relay P disconnects the ground from capacitor C3–1 due to the closing and opening respectively of contacts P–1 and P–2, causing the source of potential leading to relay PG shown connected to resistor R3–1 to become more effective than the other source of potential –B connected to relay PG, and ground to be effectively connected to the other side of the secondary winding of relay PG. Capacitors C3–1 discharges in the reverse direction through the primary winding. Initially, the primary ampere turns are the more powerful and the relay is held released, but as the capacitor becomes discharged, the primary winding ampere turns decrease and the secondary winding ampere turns become controlling, causing relay PG to reoperate. This sequence of operation and release will be repeated continuously. As the P relay opens and closes, battery and ground are applied and removed from the tip and ring leads TSR and RSR respectively, via make contacts P–1 and P–2, causing effective dial pulses to be generated.

Also, when relay IC operates and relay P is also operated, relay IC1 also operates via make contacts IC–2 and P–3. Relay IC1 will remain locked to contact IC–2 via make contact IC1–1 when relay P releases. With relay IC1 operated, the holding bridge connected to ferrods 22–1 and 22–2 is effectively removed from the tip and ring leads TSR and RSR due to the operation of break contact IC1–2, and contacts P–1 and P–2 will be connected to the tip and ring leads TSR and RSR from ground and a source of potential –B via make contacts IC1–3 and IC1–4. Therefore, with relay IC1 operated a pulse train can be gated towards the distant office via tip and ring leads TSR and RSR.

Make contact P–5 connected between one leg of ferrod 22–3 and ground causes ferrod 22–3 to become saturated and unsaturated as the P relay operates and releases with pulsing. Central control therefore counts the number of pulses via the scanner, from ferrod 22–3. After counting the number of pulses which constitute the desired digit, central control initiates the release of relay IC via the peripheral bus and interface circuit 22–11.

During the interdigital interval, ferrod 22–1 becomes saturated. To time the interdigital interval, central control will produce a delay before causing transmission of the next digit. This process continues until all the digits have been transmitted. It is ensured that the first and last digits of the train are fully transmitted by having the IC1 relay connected so that it can only operate when relay P is operated, and can only release when relay P is operated and relay IC is released.

After all the digits have been transmitted or if the call is abandoned, central control releases the transmitter circuit by initiating release of relay A3 via the signal distributor. Releasing relay A3 also releases relay HG due to the opening of make contact 43–5, which will release the service network connection. All the ferrods 22–1 to 22–4 return to an unsaturated condition. Inductors 22–6 and 22–10 provide direct current limiting, and also provide ferrod protection against surge currents. Varistors 22–7 and 22–8 also limit surge currents and thus protect ferrods 22–1 and 22–2. Diode 22–9 allows the current to only flow in one direction through ferrod 22–2 which enables this ferrod to operate only with battery on the tip lead and ground on the ring lead.

The multifrequency transmitter 14–22 service circuit of FIG. 14 operates in a generally similar manner to that of dial pulse transmitter 14–21, and therefore will not be described in detail. However, continuity of the path of the distant office, and reverse battery conditions which will indicate a "start pulsing" signal can be detected via a pair of ferrod sensors, and another ferrod sensor may be used to supervise the calling subscriber similar to the manner of the dial pulse transmitter.

The basic difference between this circuit and that of the dial pulse transmitter 14–21 is in the manner of signalling. In the multifrequency transmitter tone source oscillators are connected to the tip and ring leads in order to signal in a well-known multifrequency manner. Timing thereof is controlled by the central control. The selection of the proper tone source is determined by central control via the peripheral bus 4–1 and a bus receiver in an interface circuit to the multifrequency transmitter.

FIG. 23 shows a schematic diagram of a common ringing circuit another of the service circuits connected to the service network 2—2. This circuit is arranged to apply ringing current to the called subscriber's tip or ring lead, and to supply audible ring-back to the calling subscriber. Ringing is stopped automatically when the called subscriber lifts his handset and goes on-hook, and then the talking transmission path through the originating junctor or incoming trunk is reestablished. When the call is completed or abandoned, the common ringing circuit and associated service network connections are released under program control.

After the subscriber has dialed his digits into a digit receiver, a ringing signal is sent to the called party. Therefore, at this time the digit receiver is released as described earlier, and the central control selects an idle common ringing circuit 14–23. Relay A4 is operated by the signal distributor, from central control. Relay A4 locks up via its own make contact A4–1.

A ferrod sensor 23–1 of the scanner circuit 3–6 is connected from ground through an inductor L4–1 to another make contact A4–2 of the A4 relay, back through another winding of inductor L4–1 to ferrod sensor 23–1 which is also connected to a source of potential. Therefore, when relay A4 operates, make contact A4–2 will complete a current path from the source of potential to ground through the ferrod 23–1 which will saturate giving an indication back to central control via the scanner that relay A4 has operated. Make contact A4–3 of the A4 relay is also connected between ground and relay RT1, which is also connected to a source of potential. Therefore relay RT1 will operate, causing its contact RT1–1 to operate in the operation path of a relay RT2. Another make contact A4–4 of the A4 relay prepares an operation path for an HG4 relay between a source of potential and the sleeve lead SS.

When relay RT2 operates, it provides a complete current path from ground via make contact RT2–1 and ferrod sensor 23–2 to a source of potential. With both the A4 and RT relays operated, make contact A4–5 and RT2–2 in the SP lead are operated, providing a current path between a source of potential and the SP lead which, as will be recalled, extends to the SP relay in the originating junctor circuit 2–1. When the SP relay operates, the transmission path through the originating junctor is broken due to the opening of contacts SP–1 and SP–2 therein. However, this will not occur until a transmission path exists through the service network 2–2.

When central control has verified from the scanner circuit that ferrod 23–1 is saturated, the marker is accessed by central control from the peripheral bus 4–1 and it selects a transmission path through the service network 2—2, operating the select and hold magnets therein. Since the hold magnets operate from the sleeve lead, a ground is extended by the marker thereto, also causing relay HG4 in the common ringing circuit to operate. Make contact HG4–1 extends ground to the sleeve lead, locking relay HG4 up via its own contact and the A4–4 contact. The hold magnets of the crossbar switches in the service network, being connected to the sleeve lead, are held operated to ground via the HG4–1 contact. The marker is then released.

As the six-wire transmission path through the service network is completed, the potential extended on the SP lead is conducted to the SP relay in the originating junctor circuit 2–1, causing it to operate and break the transmission path from the calling to the called subscriber via the tip and ring leads of the originating junctor circuit. After the service network transmission path is established, the marker proceeds to establish the route network transmission path to the called subscriber.

When the network transmission paths have been established, relay D4 is operated from central control via the signal distributor, if ringing is required to a tip party. Make contacts D4–1 and D4–2 and break contacts D4–3 and D4–4, which are connected to the tip and ring leads TSR and RSR extending through the service network toward the terminating subscriber, operate. Relay D4 locks itself up via contact D4–5 and A4–6. Tip and ring leads TSR and RSR, which extend to a source of ringing current are thus effectively reversed.

Also connected in the leads TSR and RSR which extend to the ringing source are make contacts RT2–3 and RT2–4, which effectively extend the source of ringing current to the terminating party, in addition to the HG4–2 make contact in lead RSR.

The operation of relay RT1 will set up relay RT in the ring lead for operation by removing a current bypass lead via break contact RT1–2 since relay HG4 has already operated, the operation path of the RT1 relay via make contact A4–3 is broken by the opening of break contact HG4–3, but is continuous through make contacts HG4–4 of the HG4 relay and RT1–3 of the RT1 relay, as well as unopened break contact RT–1 of the RT relay.

Also, with the HG4 relay operated, break contact HG4–5 of the HG relay opens the current path for ferrod 23–1, giving an indication of operation of the HG4 relay, and thus the extension of holding ground for the hold magnets, to central control via the scanner, since ferrod sensor 23–1 unsaturates.

The operation of relay RT2 also prepares a transmission path from the tip and ring leads TSL and RSL which lead to the calling subscribers lines. Since make contacts RT2–5 and RT2–6 have closed in those leads. With verification of the operation of the HG4 relay, and thus that holding ground is provided for the hold magnets connected to the sleeve lead SS in the service network central control initiates the operation of relay B4 via the signal distributor. Relay B4 operates, locking itself to ground via its own make contact B4–1 and contact A4–6. Make contacts B4–2, B4–3, B4–4, and B4–5 which are connected in the tip and ring leads TSR, RSR, TSL and RSL leading to both the calling and called subscribers from the ringing and tone sources, also operate. Therefore, ringing will be extended to the called party via tip and ring leads TSR and RSR, and a source of ring back tone will be provided to the calling party via leads TSL and RSL. With break contact B4–6 opening the current path of ferrod 23–2, that ferrod will unsaturate, providing a check to central control of the operation of relay B4 and thus the extension of the ringing and tone sources to the called and calling parties respectively.

When the called subscriber answers the ringing by lifting his handset, direct current is caused to flow in the subscriber's loop in a well-known manner, and relay RT operates. This will cause release of relay RT1 due to the opening of break contact RT–1 in the relay current path. Relay RT1 released causes the opening of make contact RT1–1 and therefore relay RT2 will release. Therefore, contacts RT2–3 and RT2–4 and RT2–5 and RT–6 will open, opening the ringing and tone source transmission paths to the originating and terminating parties connected to leads TSR, RSR, TSL and RSL. Contact RT2–2 also opens, opening the operation path for relay SP in the originating junctor circuit 2–1 from a source of potential via the SP lead. The originating junctor in response completes the talking transmission path between the calling and called subscriber therethrough, and the originating junctor is then enabled to supervise both subscribers. Potential is applied by ferrod 14—14 in the originating junctor to the tip and ring leads T, R, and TSL and RSL, via closed break contacts SP–1 and SP–2 to the tone source. This potential was previously extended to the tip and ring leads through contacts RT2–5 and RT2–6, and break contacts C4–1 and C4–2 of the C4 relay to the leads connected via inductor L4–1 from ferrod 24–1, ground and a source of potential. Therefore, when relay RT2 has released, contacts RT2–5 and RT2–6 open, causing opening of the complete current path from ferrod sensor 23–1, cutting off the ring-back tone to the calling subscriber. The unsaturation of ferrod sensor 23–1 due to the breaking of a complete direct current path gives an indication to the central control via the scanner that ringing has ceased.

Central control then initiates the complete release of the ringing circuit and associated service network transmission path by releasing relay B4 by the signal distributor, then relay D4 if ringing to a tip party was required. Relay A4 is next released from the signal distributor, which releases relay HG4 by the opening of contact A4–4 in its operation path. With relay HG4 released, the service network holding ground is released on the SS lead, idling the circuit through the service network 2—2.

If the called subscriber does not answer the ringing and the calling subscriber abandons the call by replacing his handset, ferrod 23–1 becomes unsaturated due to the opening of the calling subscribers loop, stopping the flow of current through ferrod 23–1. This condition is noted by central control and is a signal that the ringing circuit should be released. To initiate the release of the ringing circuit and the associated service network connection, the central control releases relay B4 and then relay D4 if tip party ringing was required, by the signal distributor. Relay B4 released causes ferrod 23–2 to become saturated due to the closing of break contact B4–6. Relay A4 is next released, which releases relay HG4. With relay HG4 released the service network connection is released as well as relay RT1. Relay RT1 releases relay RT2, which opens the current path for ferrod 23–2 via make contact RT2–1, and ferrod 23–2 becomes unsaturated.

In an incoming call from an incoming trunk, after the digit receiver has been released after having received the transmitted digits from another switching office, central control selects an idle common ringing circuit such as that shown in FIG. 23. Relay C4 operates from the signal distributor, as well as relay A4. Relay C4 then locks up via its own make contact C4–3 and contact A4–6. With make contact C4–4 in parallel with make contact A4–2 in the current path of ferrod sensor 23–1, that ferrod saturates. Also, relay RT1 operates via contact A4–3 as described earlier. Operating relay RT1 will cause operation of relay RT2 which will cause ferrod 23–2 to become saturated. When central control verifies that ferrod 23–2 is saturated, the marker is activated to operate relay HG4 via the sleeve lead, which will provide a holding ground on sleeve lead SS through make contact HG4–1, in order to maintain the service network connection after the marker has completed its function. At this point, ferrod 23–1 is unsaturated and the calling subscriber is being supervised by the incoming trunk in a similar manner to that already described with reference to the originating junctor. After the service network transmission path is established, the marker proceeds to establish the route network transmission path. When the network transmission paths are established, central control initiates the operation of relay D4 if ringing to a tip party is required. Central control then initiates the operation of relay B4. Operating relay B4 causes ringing to be supplied to the called subscriber and audible ring-back towards the calling subscriber on tip and ring leads TSR, RSR, and TSL and RSL respectively. Operating relay B4 will also cause ferrod 23–2 to become unsaturated, thus providing an operation check to central control. It may therefore be seen that this sequence of operation is generally similar to that described earlier with respect to intraoffice call.

When the called subscriber answers the ringing by lifting his handset, direct current is caused to flow in the transmission path connected to leads TSR and RSR, and relay RT is operated. Relay RT operated releases relay RT1 which will release relay RT2, disconnecting the ringing circuit leading to the originating and terminating subscriber's loops. Ferrod 23–2 becomes unsaturated at this time. Relay RT2 released also releases an SP relay in the incoming trunk circuit to also supervise the called subscriber, similar to the function of the release of the SP relay in the originating junctor.

When a ferrod sensor in the incoming trunk circuit, which is supervising the called subscriber, becomes saturated, central control determines that the call has been answered and that the ringing circuit should be released. This release is initiated by central control releasing relay B4 and then relay D4 if trip party ringing was required. Relay C4 and A4 are next released, which will release relay HG4. Releasing relay HG4 will release the associated service network connection.

If the called subscriber does not answer the ringing and the calling subscriber abandons the call by replacing his handset, the supervisory ferrod sensor in the incoming trunk circuit becomes unsaturated. This condition is an indication to central control that the ringing circuit should be released. Central control then releases relay B4 and then relay D4 if ringing to a tip party was required. Relay B4 released causes ferrod 23–2 to become saturated. Relay C4 is released next, and relay A4 to release relay HG4. Relay HG4 released initiates the release of relay RT1 and the associated service network connection. Relay RT1 released releases relay RT2.

It may also be desirable to include a lightning protection means 23–3 across tip and ring leads TSR and RSR in order to protect the ringing source from destructive transient currents. The lightening protection means can take the form of a network of conventional design, switched into the circuit at an appropriate time in a well known manner when the ringing source is connected to the terminating tip and ring leads.

Another type of service circuit is special ringing circuit 14–24. The principle purpose of the special ringing circuit is to provide several types of ringing signals for special customers services, which the common ringing circuit cannot supply. These signals, may, for instance, consist of five different ringing codes. The ringing codes are selected by the special ringing circuit or in response to a central control order and transmitted to the called subscriber, while audible ringing is transmitted to the calling subscriber. The circuit can also connect a verification tone to an operator, and detect customer answering whereby ringing is tripped automatically as described with reference to the common ringing circuit.

The special ringing circuit may be designed using well-known techniques, and along the general lines described with reference to the common ringing circuit. However, a brief description will follow.

When the circuit is required to provide service on incoming and intraoffice calls where the calling and called subscribers are on separate lines, the circuit is arranged to provide coded ringing towards the called subscriber and audible ring back toward the calling subscriber. The coded ringing may be applied to the special ringing circuit and thus out to the subscribers via a well known ringing selection switch, whose cross-points may be established by marker operation. Autonomous release of the special ringing circuit and associated ringing selection switchpoints are initiated if the call is answered or abandoned.

If the calling or called subscribers are located on the same line, the circuit is used in a revertive ringing mode. The revertive ringing mode is as follows:

After the calling subscriber has dialed the called subscriber's telephone number, the central control determines that revertive ringing is required. The digit receiver is released and the special ringing circuit is connected in its place similar to the way the common ringing circuit may be connected. Initially, busy tone is applied to the TSL and RSL leads toward the originating subscriber, indicating that the calling subscriber should replace his handset. When the calling subscriber does so, busy tone is removed and coded ringing is applied to a particular side of the line. Since central control has no means of determining on what side of the line the calling subscriber is located, revertive ringing is always applied to the opposite side to that which the coded ringing is being applied. If the calling subscriber is located on the same side as the called subscriber, they will both hear the coded ringing. When the coded ringing ceases, the calling subscriber knows that the called subscriber has answered. The revertive ringing which was applied to the other side is disregarded by its hearers. If the calling subscriber is located on the opposite side to that of the called subscriber, the calling subscriber will hear the revertive ringing. When the called subscriber answers, the revertive ringing will cease.

Release of the special ringing circuit, service network, and ringing selection switch is initiated when the called subscriber answers or when the calling subscriber terminates the ringing by picking up his handset. If the calling subscriber abandons the revertive call, central control will time a period, then initiate the release of the special ringing circuit and associated circuitry.

It will be obvious that other forms of service circuits could also be connected to the service network to provide different types of functions, under control of central control, and may be called into use when required. Since one of the purposes of this telephone switching system is to provide certain types of services normally uneconomical with prior types of switching systems, a typical example a "call waiting" special service circuit, will be described which will allow a call waiting class waiting class of service to be provided to subscribers. This will be fully described at the end of this disclosure.

c. Bus System and Interface Circuits

As may be seen in FIGS. 13 to 20, interconnecting the central control 3–2 with the peripheral units such as the scanning means 3–6, marker 3–1, signal distributor 3–7, etc., is peripheral bus 4–1. This peripheral bus is comprised of five buses, a maintenance bus (not shown), an address bus 15–1, an enable bus 15–2, a scan return bus 15–3, and an all-seems-well bus 15–4. Each bus is duplicated, shown figuratively by dashed lines parallel to each of the bus solid lines. As preferably two central controls are included for redundancy and therefore reliability purposes, each central processing unit has access to both buses, and can cause information to be transmitted over either.

Figure 15A:
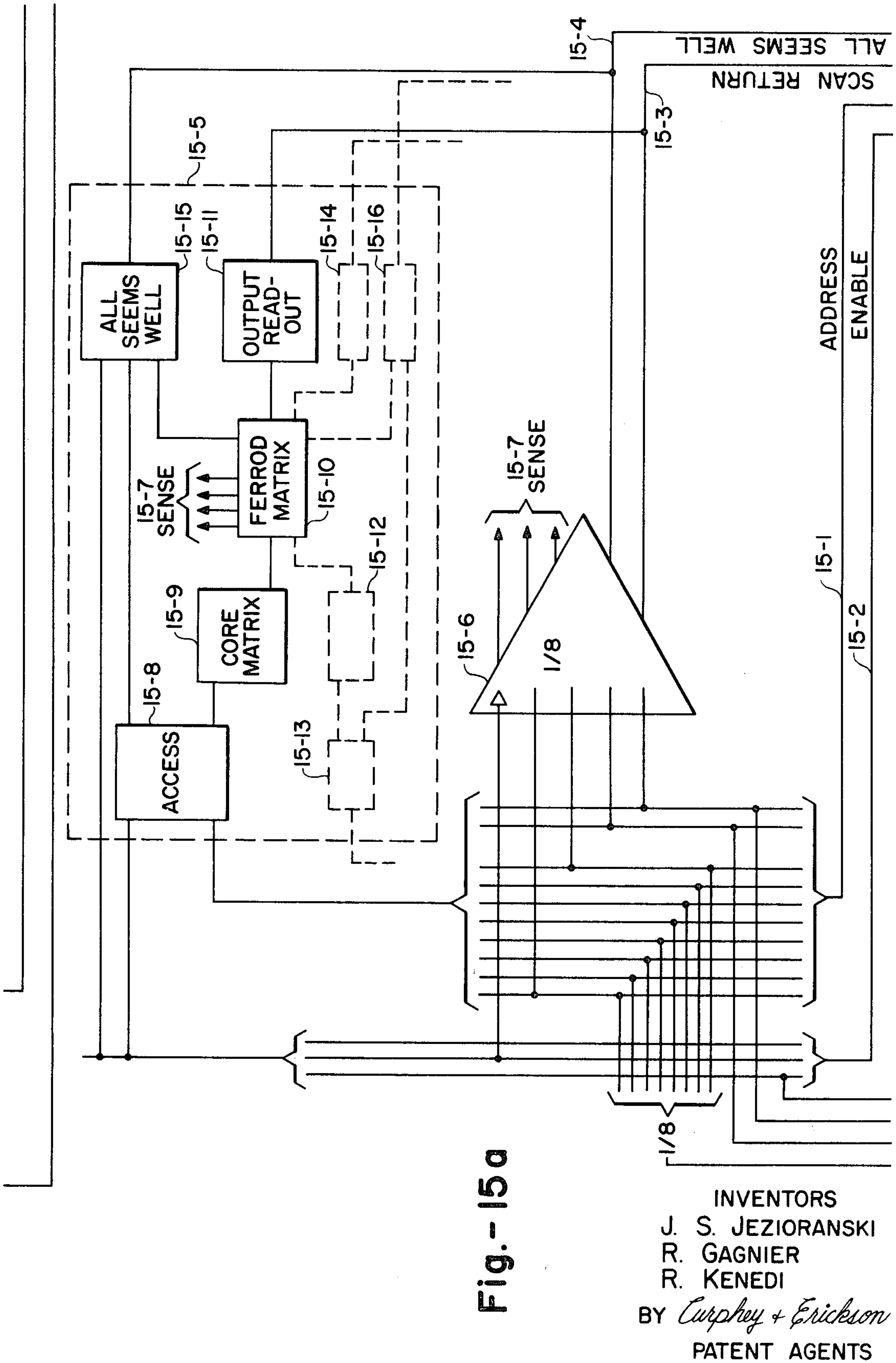
Figure 15B:
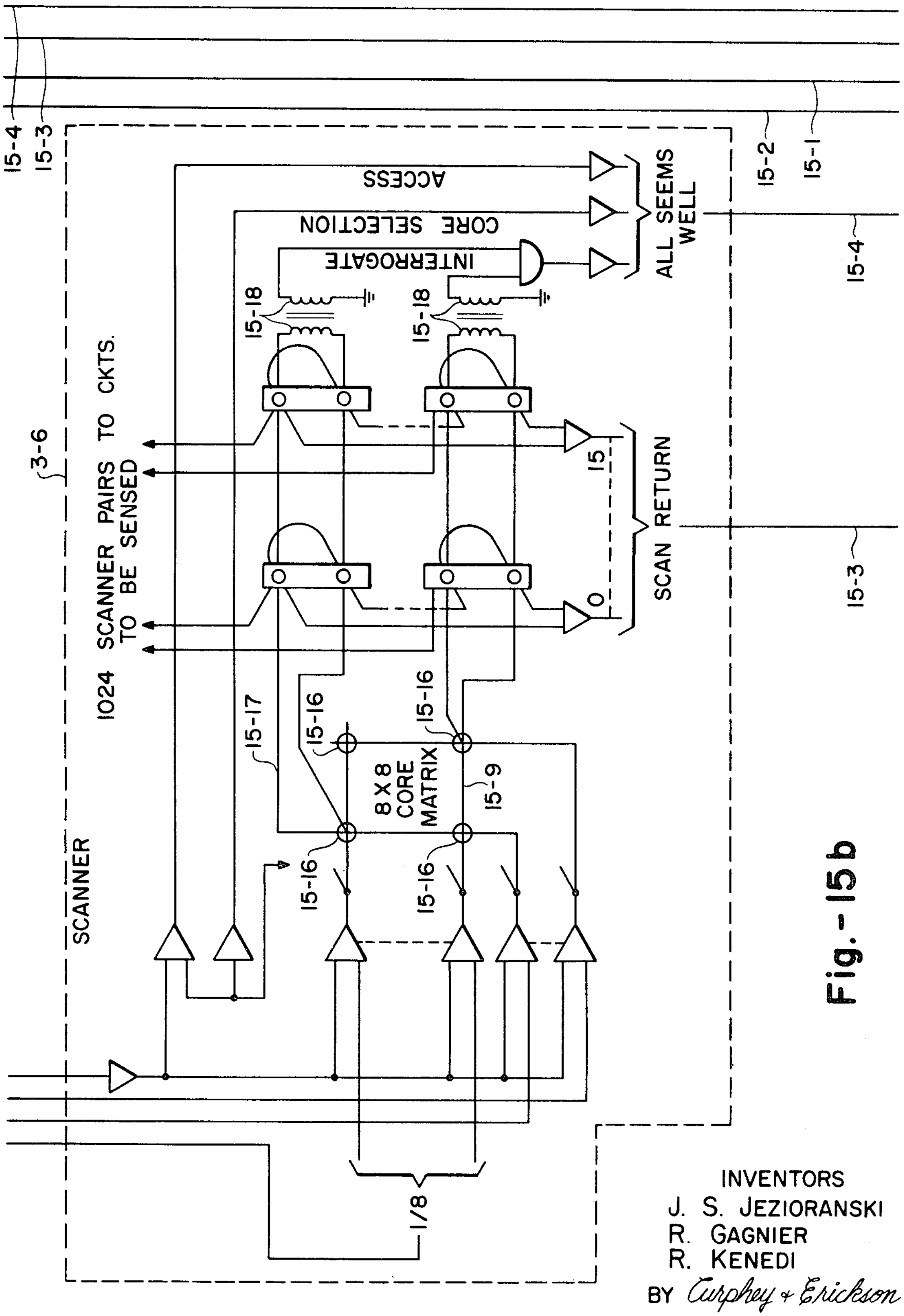
Figure 15C:
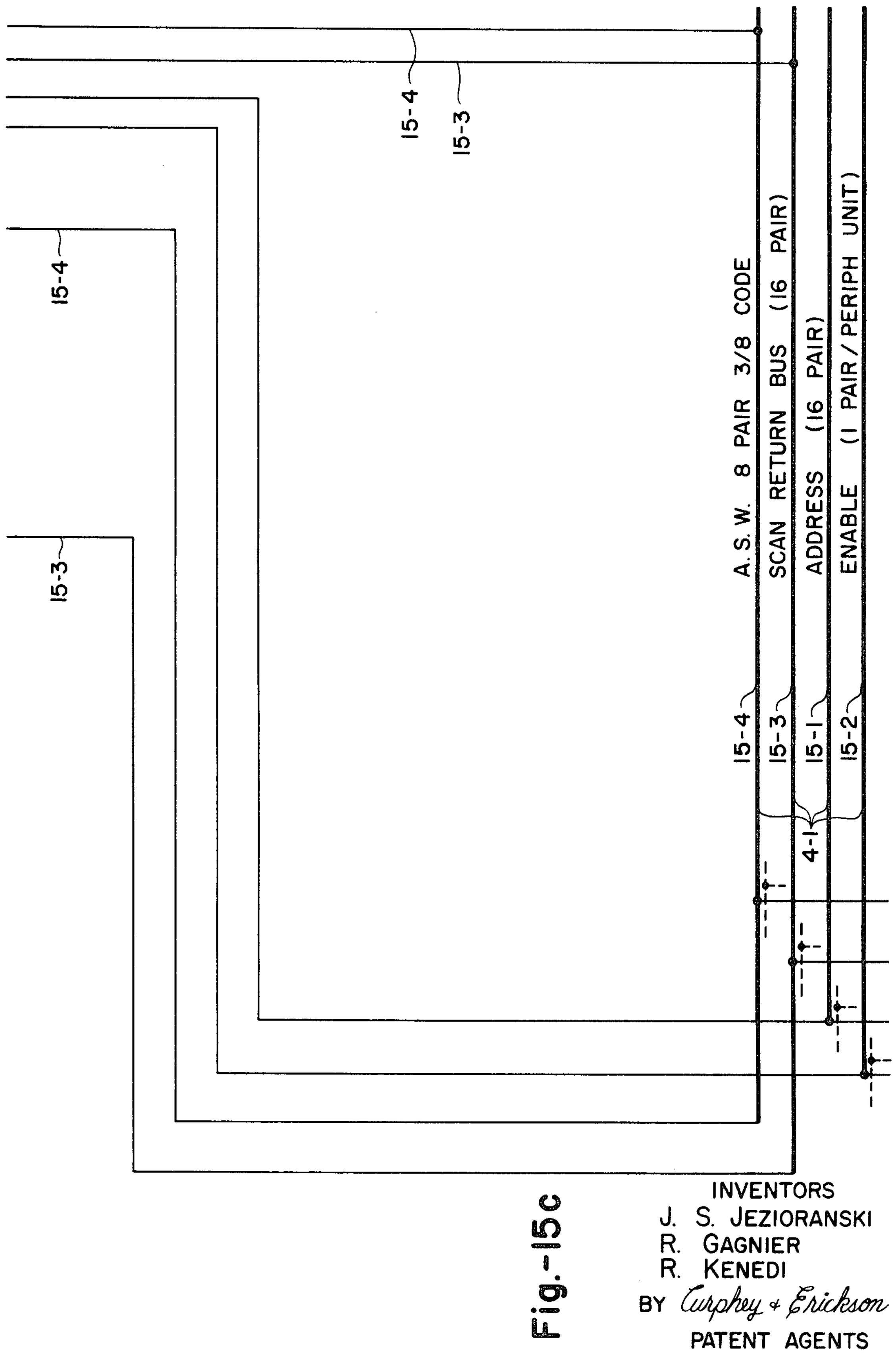

The address bus 15–1 is comprised of 16 twisted pairs of conductors, commonly connected to all peripheral units. The quantity of pairs corresponds to the information work length for addressing a peripheral unit in this case, 16 bits. In FIG. 15, the 16 pair if shown split into two sets of eight, and addressing is performed on a one out of eight pair basis, twice, in the case of the scanner, and which will be described later with respect to the scanner. In the case of other peripheral units, partial or full binary addressing may be used. Each pair of the 16 twisted pair is shown as a single lead, for clarity.

The enable bus 15–2 is comprised of one pair per peripheral unit, each pair being shown as a lead. Therefore, in order to actuate a particular peripheral unit, the signal is transmitted from central control to a lead of the enable bus 15–2, and a word is transmitted on the address bus. While the address work is carried to all peripheral units, only one becomes sensitized and can receive the work since only one lead of the enable bus, leading to a particular peripheral unit, has been actuated.

The scan return bus 15–3 is comprised of 16 pair (leads) connected between the scanners and central control. The scan return bus contains the output from an enabled scanner corresponding to the states of the ferrods which have been addressed by the address bus. Therefore, it may be seen that information as to the state of the switching system is returned to central control 3–2 via the scan return bus.

Figure 16A:
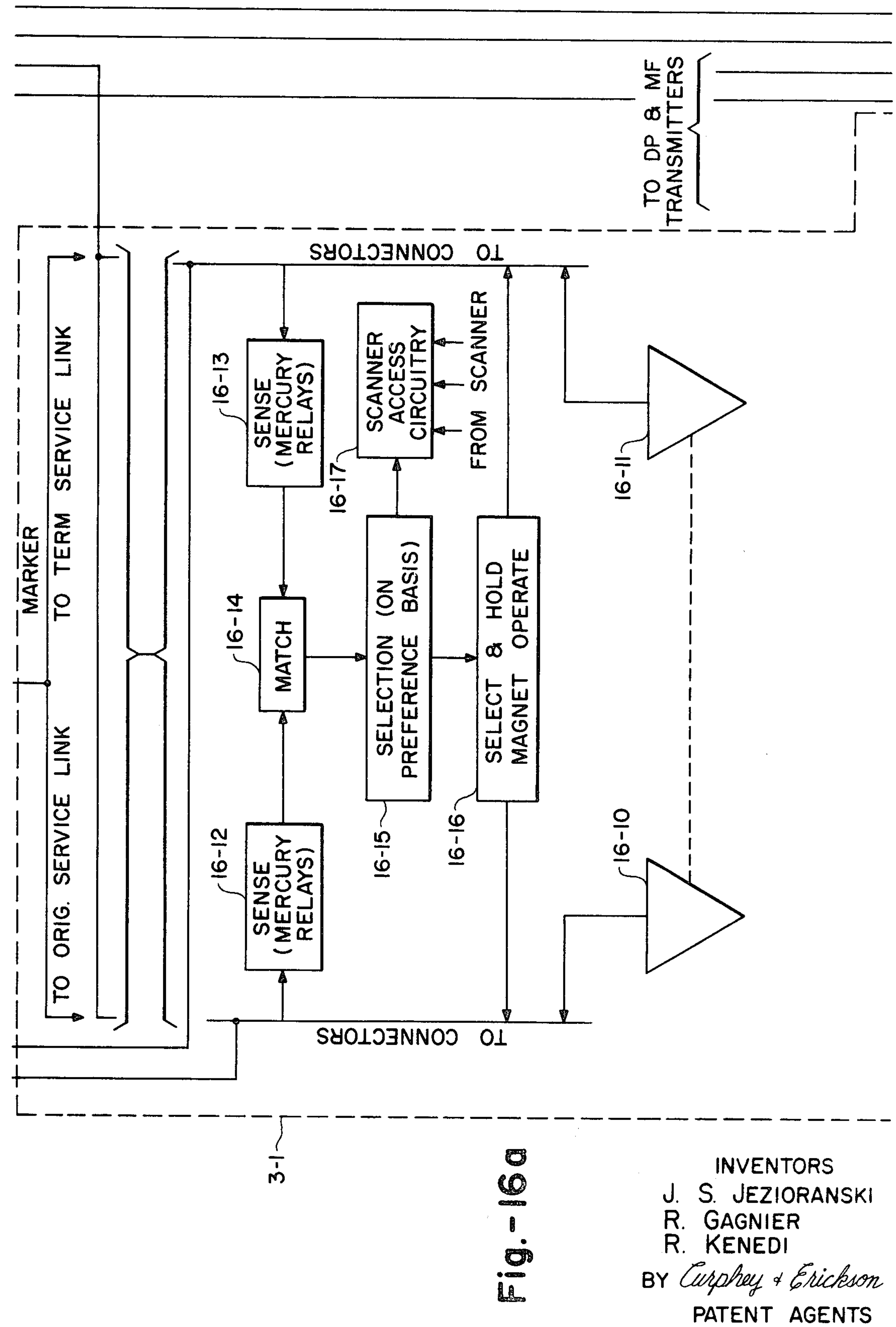
Figure 16B:
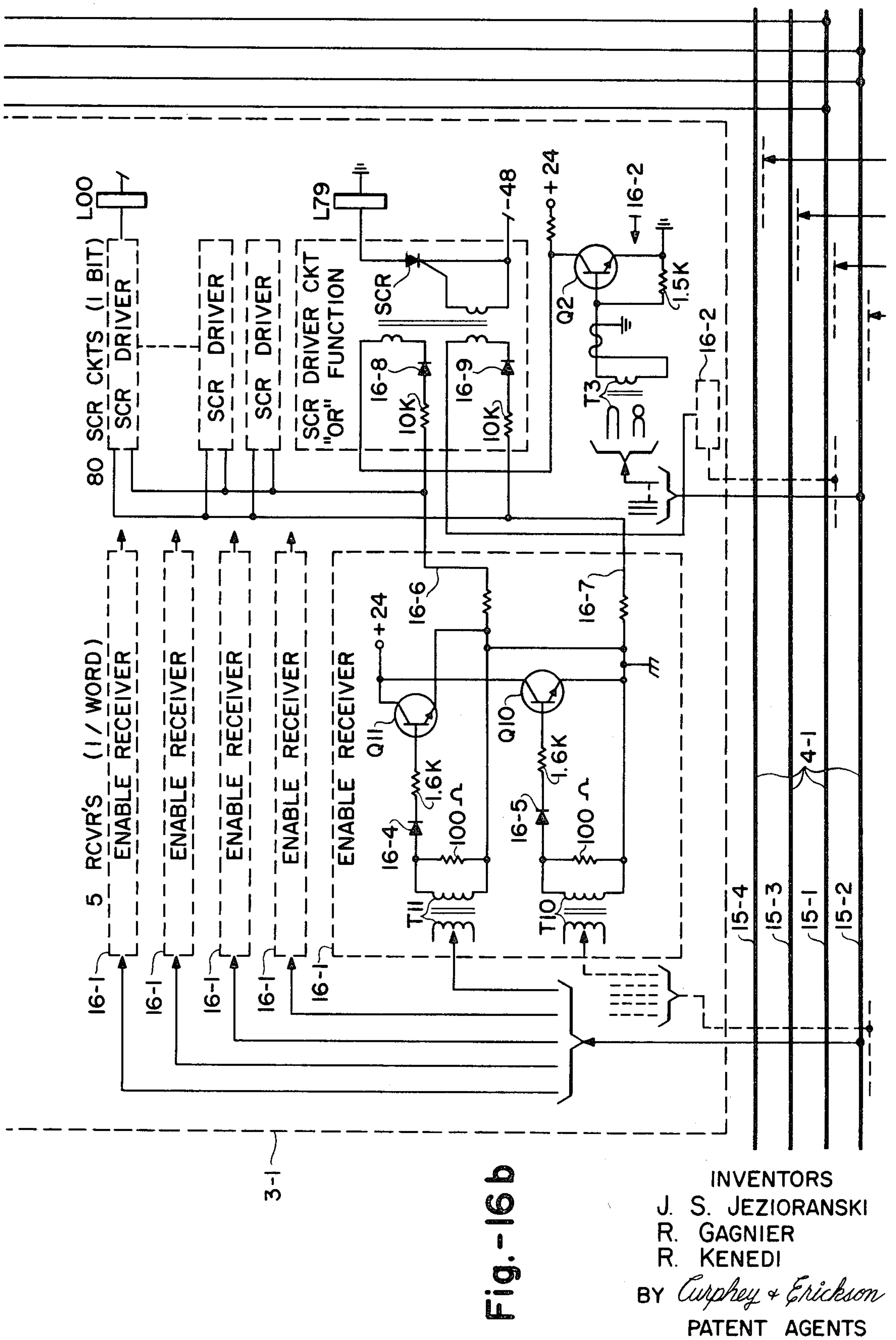

The all-seems-well bus 15–4 is comprised of eight pairs and operates in 3/8 code. The information returned on the all-seems-well bus identifies the particular scanner replying (which should match the scanner enabled), and whether the scanner has functioned properly.

Where the bus system connects to peripheral units which operate at electronic speeds, they can be accessed directly. However, where the operation of the central control results in an electromagnetic relay function, an interface buffer is provided to convert the electronic speeds of the orders to slower speeds of response. As shown in FIG. 16, the enable bus 15–2 interfaces with enable receivers 16–1, and the address bus 15–1 is connected to bus receivers 16–2. There are 16 bus receivers, one bus receiver per lead (pair) of the address bus.

The information transmitted on the peripheral bus from the central control contains five words, each word, containing 16 bits for the marker, and one word in the case of other peripheral units. Connected to the enable bus, therefore, are five enable receivers, one enable receiver per word. Since there are 16 bus receivers connected to the address bus, a matrix arrangement of bus receivers and enable receivers can operate 80 silicon control rectifier buffer circuits, which for instance can be arranged in five groups of 16. Each group of silicon control rectifier circuits can be enabled by one enable receiver, and one silicon control rectifier circuit in the group is operated by one of the 16 bus receiver circuits. Therefore, for a total five-word output signal of 80 bits from the central control, one silicon control rectifier can be operated. As is well known, since a silicon control rectifier once pulsed remains on, a relay can be operated therefrom. FIG. 16 shows the details of the enable receivers, bus receivers, and silicon control rectifier circuits. In particular, as by example those receivers relating to the marker will be described, but is will be realized that the receivers and silicon control rectifiers circuits relating to other peripheral units such as the signal distributors are generally similar.

Five enable receivers 16–1 are shown connected to the enable bus 15–2. Each enable receiver is connected to a separate lead of the enable bus, and therefore for five enable receivers, one of the five will be enabled by central control. Each enable receiver is comprised of two emitter follower transistor circuits. Each circuit is comprised of a transistor Q10 or Q11 coupled by noise immunity diodes 16–4 or 16–5 to transformer T11 or T10. Transformer T11 is connected to the enable bus shown in solid line, and transformer T10 is connected to the enable bus shown in dashed lines. Each of two transistor circuits are pulse transmitters with transformers T11 and T10 coupled to different leads of the respective enable bus. Therefore, a pulse transmitted from central control via the enable bus 15–2 is passed through one or the other of the emitter follower transistor circuits in the enable receiver providing a pulse output circuit on either lead 16–6 or 16–7.

Each silicon control rectifier circuit is comprised of a silicon control rectifier SCR which has its current leads connected between a source of potential, for instance −48 volts, and a relay, here shown as L79. The enable electrode of the silicon control rectifier is connected to the secondary winding of a transformer T2, which comprises a pair of primary windings. One lead of each of the primary windings is connected via a polarizing diode 16–8 and 16–9 to leads 16–6 and 16–7. Therefore, it may be seen that if a pulse appears on either lead 16–6 of 16–7 from the enable receiver with positive polarity, and the second lead of each of the primary windings of transformer T2 is connected to a source of negative potential or ground, a pulse is transmitted through transformer T2 and enables the silicon control rectifier causing relay L79 to operate. However, if the other lead of the primary winding is connected to a source of positive potential, diode 16–8 or 16–9 is biased in the backward direction and no pulse can be transmitted therethrough.

The bus receiver 16–2 is simply a transistor $Q_2$ connected so as to operate as a switch. Its base is connected via transformer T3 to one lead of the address bus. Its emitter is connected to ground, and its collector to a source of positive potential through a resistor. Its collector is also connected to the other lead of one of the primary windings of transformer T2 in the silicon control rectifier circuit. Therefore, when a pulse appears on the lead of the address bus connected to transformer T3, the pulse is transmitted to the base of transistor $Q_2$, causing it to conduct current heavily, effectively connecting the primary winding of transformer T2 connected to its collector to ground. A coincidence of pulses transmitted via the enable receiver connected to the diode 16–8, and one transmitted to the bus receiver involving Q2 will cause a complete circuit path to exist between ground, transistor Q2, the primary winding of transformer T2, diode 16–8, lead 16–6, transistor $Q_{11}$, to a source of positive potential, for instance 24 volts. A pulse will therefore be transmitted via transformer T2, enabling the silicon control rectifier SCR to conduct current, causing relay L79 to operate.

The other primary winding of transformer T2 is connected to another bus receiver (shown as a dashed l box), which is connected to the address bus (shown in dashed line). Therefore, either the bus system shown in solid, or the bus system in dashed line can cause the actuation of silicon control rectifier SCR.

Once triggered, the silicon control rectifiers remain in the conducting state until the potential source is interrupted for instance, a minimum of 100 microseconds. This interruption is effected by relays of the signal distributor, not shown in the drawings.

In the marker, it may therefore be seen that 80 relays may be caused to operate from central control, one being actuated at a time, and such relays can be connected in a contact tree form.

Enable receivers, bus receivers, bus receivers, and silicon control rectifier circuits are also found in the signal distributor 3–7 service circuits 14–21 and 14–22, etc., and operate in a similar manner to that just described with respect to the marker circuit.

d. Scanner

FIG. 15 shows three similar scanning means, 3–6 in schematic detail, 15–5, in block form, and 15–6 as a single block unit.

Scanning means 15–6 is connected via a twisted pair (herein called a lead) to a enable bus, and by two sets of eight leads to the 16-pair address bus. A large number of twisted pairs 15–7 are sense leads which are connected in the circuits to be sensed, for instance in the service circuits, in the subscribers line circuits, etc. Also extending from scanner 15–6 are leads connected to the scan return bus 15–3 and the all-seems-well bus 15–4.

Turning now to scanning means 15–5, which is effectively similar to scanning means 15–6, but broken into its basic block elements, it will be seen that the leads from the enable bus and the address bus are connected to access circuitry 15–8. A core matrix 15–9 made up of arrays of magnetic cores arranged to select particular ones of the ferrod sensors is connected between the access circuitry 15–8 and a ferrod sensor matrix 15–10. In this ferrod matrix reside the ferrods described earlier with respect to the service circuits. Their readout circuitry 15–11 transfers the result of the interrogation of the ferrods to the scan return but 15–3, which leads to central control 3–2.

Preferably, within the scanning means 15–5, is a duplicate core matrix 15–12 connected between the ferrod matrix 15–10 and duplicate access circuitry 15–13. Access circuitry 15–13 is connected to the enable and address buses shown as dashed lines.

Similarly, duplicate readout circuitry 15–14 is connected to the output of ferrod matrix 15–10, and is also connected to the scan return bus 15–3 shown as a dashed line.

All-seems-well circuitry 15—5 is connected between the access circuitry 15—8 and ferrod matrix 15-10, and all-seems-well bus 15-4. A duplicate all-seems-well circuitry 15-16 is connected similarly between access circuitry 15-13 and ferrod matrix 15-10, and all the all-seems-well bus 15-4 shown as a dashed line.

Turning now for a moment to FIG. 24, a ferrod sensor is shown in detail. It consists of a ferrite rod 24-1 with a control winding 24-2 wound about it such that when direct current flows therethrough, the ferrite rod becomes saturated magnetized. An interrogate winding 24-3 passes through the ferrite rod, as well as a readout winding 24-4. When a pulse is transmitted through the interrogate winding, and when the ferrite rod is saturated, no coupling of the pulse occurs to the readout winding, and the interrogate pulse is blocked. Therefore, no output pulse on the readout winding will occur. On the other hand, if the control winding 24-2 carries little or no current, the ferrite rod will not be saturated, and the interrogate pulse will be magnetically coupled to the readout winging, resulting in an output pulse thereat. The control winding from each ferrod sensor is connected in the circuit to be sensed, which will carry direct current. The direct current from the circuit to be sensed is carried by the control winding 24-2, and when such current flows in the sensed circuit, an interrogate pulse will result in no readout pulse. When the circuit to be sensed has essentially no direct current flowing through the control winding 24-2, an interrogate pulse will result in a readout pulse.

A description of a subscriber line circuit containing this type of ferrod shown may be referred to in the Bell System Technical Journal, Vol. XLIV, July-August, 1965, No. 6, P. 959,960.

Turning again to FIG. 15, in this embodiment core matrix 15-9 is comprised of an 8×8 core matrix, with eight leads coupling the rows, and eight leads coupling the columns. Therefore, when a coincidence of a pulse on a vertical and a horizontal lead occurs, a particular magnetic core 15-16 provides a pulse on it s output winding 15-17. Therefore, it may be seen that by accessing one of the eight rows, and one out of the eight columns, one out of the 64 cores provides an output pulse. Each row and column is coupled via well-known amplifiers and gates to one pair of the address bus. Since the address bus 15-1 consists of 16 pair, these may be grouped into two sets of eight pair, one of the sets connected via access circuitry, comprised of amplifiers and gates to the rows of magnetic cores 15-16, and the other set being connected via the access circuitry to the columns.

Access circuitry comprising amplifiers and gates is also connected to the enable bus 15-2 as shown. An output lead of the access circuitry is connected to a second coincidence input to the circuitry connected to the core matrix. Therefore, a coincidence of an enable pulse on the enable bus and a pair of pulses on the address bus, one in each of the sets of eight leads leading to the core matrix, causes a pulse to be transmitted to a row, and another pulse to be transmitted to a column of the core matrix 15-9. Therefore, a pulse is provided to one of the 64 magnetic cores 15-16 readout windings.

The ferrods are also arranged in a matrix 16 ferrods in a row and 64 ferrods in a column, for a total of 1,024 ferrod sensors. Of course, other sizes of matrices can be used as needed. A readout winding 15-17 of a particular magnetic core is connected to all 16 ferrods in a row, in series. Therefore, all 16 ferrods in a row are interrogated at a time. Since there are 64 magnetic cores, 64 ferrod rows can be interrogated with one 8×8 core matrix.

The readout windings of the ferrod matrix in each column are connected in series, and connected to well-known output circuitry comprising output detector amplifiers which, when energized, send pulses via the scan return bus to central control for interpretation. Since there are 16 columns of ferrods, 16 pair in the scan return bus can be energized.

When each row of ferrods is interrogated, the interrogate pulse is also passed via transformer 15-18 to all-seems-well circuitry. In particular, the pulse coming from each of the transformers 15-18 is transmitted via an OR gate and well-known amplifiers to the all-seems-well bus. If more than one row of ferrods has been interrogated, the interrogate check in the all-seems-well circuitry shows a fault condition in a well-known manner. This check therefore ensures that not more than one core has been switched.

In addition, amplifiers identify which row and column has in fact been accessed in a well-known manner. This therefore provides a check on which core has been selected. The enable pulse is sampled and this provides an access check, that the particular scanner has been accessed by an enable pulse coincidence with at least one address pulse.

Successful completion of these checks is indicated in central control by the "all-seems-well" output sent simultaneously with the reply from the ferrod matrix via the scan return bus. To retain the identity of the particular scanner replying on the all-seems-well bus, a unique three-out-of-eight all-seems-well code is preferably used in this embodiment for the scanner. The absence of any of the all-seems-well bits at the time of the scan return indicates a trouble condition. In such a case, central control enters a scanner maintenance program to determine and locate the faults. Some of the ferrods in the matrix, however, can be used for maintenance and trouble identification purposes, and therefore probably not the entire 1,024 ferrods are used for supervision purposes.

As described earlier with respect to scanner 15-5, the whole scanner, except the ferrod matrix, can be duplicated for reliability and easy program diagnosis.

A description of a scanner useful in this invention is provided in the Bell System Technical Journal, Volume XLIII, Sept., 1964, No. 5.

Both address and return buses extend to all peripheral units, and are common to all scanners. When addressing a scanner, central control sends an enable pulse to the particular scanner before it sends out the scanner address on the common bus. Whereas the address goes to the scanners on one set of buses only, the reply from any particular scanner will appear on both sets of return buses allowing a reliability check in central control by matching the information on the two return buses.

e. Signal Distributor

The signal distributor has the function of causing individual relays to operate in various parts of the switching system upon direction of the central control. Since the central control is very high-speed data processor operating at electronic speeds, and the relays operate at slower speeds, the signal distributor acts as a buffer therebetween. The central control applies an order word to the peripheral bus for operation or release of a predetermined relay, and the signal distributor causes operation of the relay and holds it on. Because of its high speed, central control does not wait for the relay operation to be completed before continuing with other functions.

Figure 17:
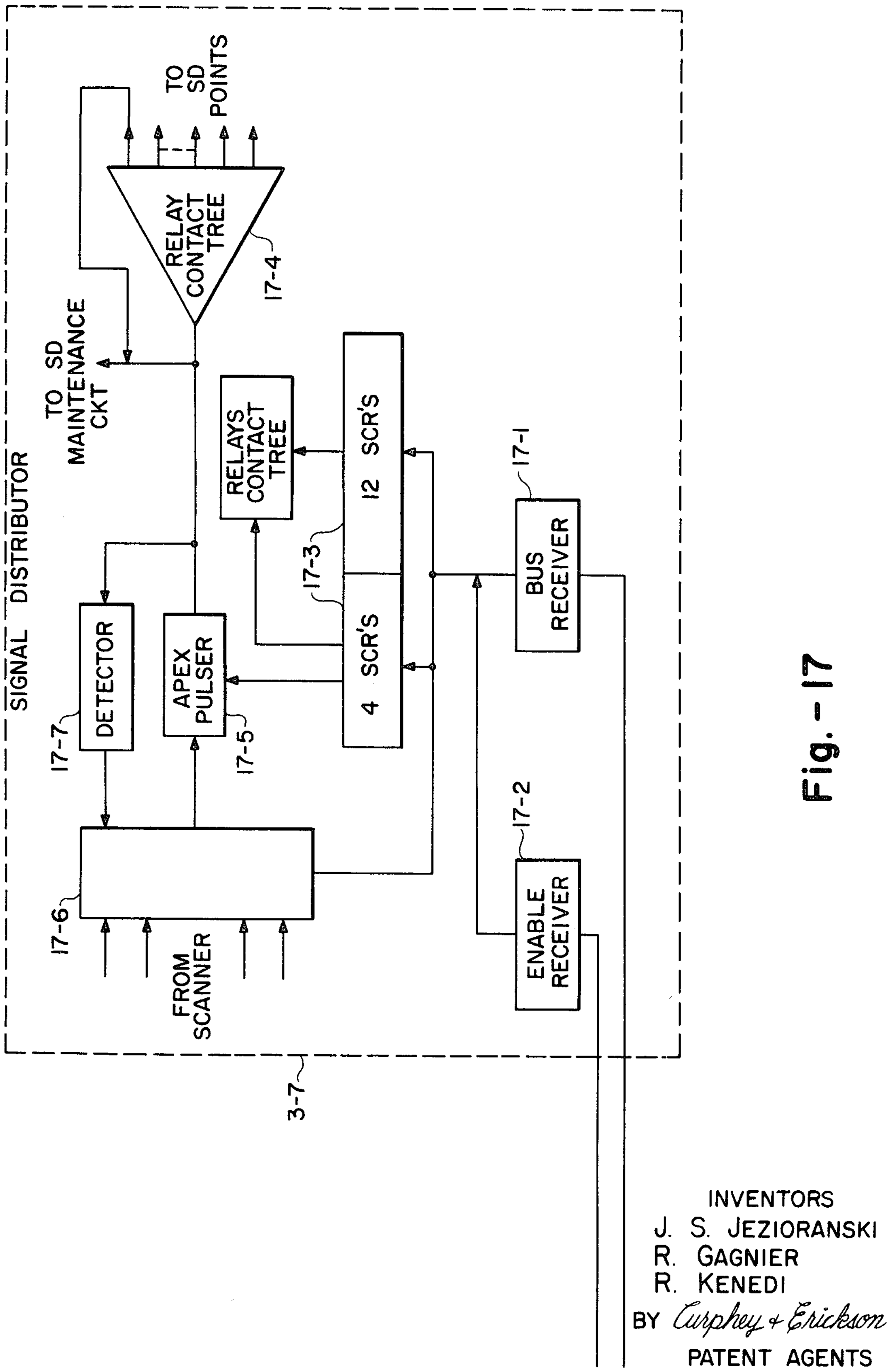

FIG. 17 shows a block diagram of signal distributor 3-7 connected to address bus 15-1 and enable bus 15-2 of the peripheral bus 4-1. Bus receiver 17-1 is connected to address bus 15-1, and enable receiver 17-2 is connected to enable bus 15-2. Bus receiver 17-1 is similar to the bus receivers 16-2 previously described, and enable receiver 17-2 is similar to enable receiver 16-1 previously described. Also, as described earlier, the bus receivers and enable receivers cause operation of 16 silicon control rectifiers 17-3.

Since orders to the signal distributor are sent out from central control in binary form over one of the two 16-lead address buses, each order is 12-bits long for signal distributor point selection, and 4-bits long for functional instructions to indicate to the signal distributor whether to operate or release the selected end point, whether to go into a testing mode, or whether to reset itself to an idle state.

Therefore, as the silicon control rectifiers each receive one bit from the central processing unit, the group of 16 are divided into two sections, one section of 12 silicon control rectifiers for storing the signal distributor point relay selection from the word, and another section of four silicon control rectifiers for the functional bits relating to whether to operate or release the selected signal distributor point, whether to go into a testing mode, or whether to reset itself to an idle state.

Each of the silicon control rectifier operates a relay, similar to the L79 relay described earlier relating to enable and bus receivers 16–1 and 16–2. The latter relays are assembled in a well-known relay contact tree. Therefore, with 16 relays, each connected to a silicon control rectifier, a distinction can be made, and the relay contact tree is set up, such that 256 signal distributor point relays can be operated.

A connection is made from each of the 256 signal distributor points, which are the output contacts of the relay contact tree 17–4, to the signal distributor relays in each of the circuits which are to be operated by central control in this mode, for instance the marker, service circuits, etc. The signal distributor relays are latching relays, either magnetic latching or electric latching. In the case of magnetic latching relays, for instance, an operation release pulse is provided in a well-known manner from apex pulser 17–5, upon actuation by one of the four silicon control rectifiers in the section of the group 17–3 containing them. The pulse travels through the relay contact tree 17–4 and causes a magnetic latching relay to operate. A potential of, for instance, –48 volts can be used to operate the magnetic latching relays, and a +24-volt potential can be used to release them. Since a unique path is selected by the operation of the silicon control rectifiers from the word provided on peripheral bus 4–1 from central control, a unique path through relay contact tree 17–4 is provided, and when apex pulser 17–5 operates, a single signal distributor relay in one of the aforementioned circuits is caused to operate or release.

Connected to the apex pulser as well as the silicon control rectifiers are ferrod sensors of a ferrod array 17–6. These ferrods are connected to the scanning means 3–6 and provide indication of the state of the signal distributor. Also, since an impedance in the pulsing path leading between the apex pulser and relay contact tree can change as the pulse is transmitted (for instance in a transistor) a detector 17–7 provides indication of the actual sending of a pulse as well as its polarity. The detector is connected to ferrod array 17–6.

Since there are only approximately 256 signal distributor relays operable from one relay contact tree, and therefore from one signal distributor, it is expected that there will be needed approximately six signal distributors for a 2,000 subscriber line telephone switching office in order to fulfill general requirements.

Signal distributors are described in the Bell System Technical Journal, Volume XLIII, Sept., 1964, No. 5.

Although the above description has been directed to magnetic latching relays, electric latching relays can also be used. A signal distributor which can desirably be used for this embodiment is described in Canadian patent by D. J. Cohen and J. G. Mlacak, 833,782, issued Feb. 3, 1970, entitled "Control Circuit and Method of Control for Latching Relay."

f. Marker

The function of the marker 3–1 is to establish talking and signalling transmission paths through the switching network. The marker receives its orders from the central processing unit 3–2 via peripheral bus 4–1. The complete marker order defines the end points to be connected, and a group of paths among all the possible paths between the two end points. The order also defines all tests to be performed, such as continuity, battery, ground and double-connection tests.

The function of normal markers is generally well known. A marker is described in U.S. Pat. No. 2,585,904 to A. J. Busch, entitled "Crossbar Telephone System." It will be understood, therefore, that since the techniques of selection of paths through a network is well known, the specific description of this function will not be includes herein. However, the marker used in this invention is contrast to those of the prior art performs simply the path selection functions and testing thereof, and therefore is considerably less complex.

The four types of connections of marker are required to process include:

a. connection through the service network when an incoming trunk or originating junctor is to be connected to a service circuit;

b. connection through the line circuit switching network and service network when a calling line is to be connected to a service circuit;

c. connection through the route network when an incoming trunk or originating junctor is to be connected to an outgoing trunk;

d. connection through the route network and line circuit switching network when a called subscriber is to be connected to the originating junctor or the incoming trunk.

To establish any one of these connections, a five-word (five times 16 bit) order from central control 3–2 is received on the peripheral bus. The order includes network link numbers which identify connectors 13–4 and 14–25 and 14–26, switch numbers within the networks, switch levels of the switches, a group of junctors, plus additional well-known information required to set up each particular connection. A group of 10 or 20 paths among all the possible ones is also specified to the marker in the order. Included also is information concerning the type of call, i.e., local completing or outgoing, whether there is heavy traffic, whether a double connection can be expected, etc. Each 16-bit work contains an odd parity bit for checking purposes in a well-known manner.

In normal call process, central control 3–2 keeps the five words that it has sent to the marker in its memory until the marker reports back via the scanner that the order has been completed successfully. If a trouble condition is encountered, the five word order can be used to reprocess the call or to produce a trouble diagnostic.

As shown in FIG. 16, the marker has associated with it an interface containing 80 silicon control rectifiers SCR, divided into five groups of 16 for receiving marker orders. Sixteen bus receivers, as described earlier, are connected to the address bus 15–1, and five enable receivers, each connected to a group of the 16 silicon control rectifier driver circuits are connected to the enable bus 15–2. Therefore, each word of the order is accompanied by an enable pulse sent on a separate lead to direct that word in the proper group of 16 silicon control rectifiers. The triggered silicon control rectifiers operate associated groups of relays L00 to L79 whose contacts in turn, are used to operate word relays which are arranged in contact trees 16–10 and 16–11. The received order is decoded by the contacts of the word relays and these contacts permit the marker to reach the given end points and also to modify the sequence for different types of orders.

The relay contact trees set up paths to network connectors 13–4, 14–25, and 14–26 in order that the connectors establish operation paths to line link switching network control 13–5, service network control 14–27, and route network control 14–28. With connections to the network frame control circuits established through the aforementioned connectors, the relay contact trees 16–10 and 16–11 provide paths to operate relays in the network control circuits and access the crossbar switch select and hold magnets. Therefore, by applying the required ground or battery potential through the contact trees, the marker operates 1/N network connectors, one 1/N network relays in the network control circuit (through contacts of the network connector) or 1/N select or hold magnets, through contacts of the network connector and contacts of relays in network control circuit.

The 16th bit of each of the five words making up a marker order is used to produce an odd parity in its associated word. An odd number of relays must be operated for each of the five words of the 16 word relays to produce a received marker order of acceptable parity. Ground or battery is supplied to operate the network connectors only when all the word relays have an acceptable parity.

After battery or ground is extended from the marker to the specified network frames to operate the network connectors, some contacts of the connector relays are used to send back the binary code of the selected network frame to the associated marker (not shown). The marker compares the binary code that the connector sends back to the binary code that the network frame specified in the marker order. If both binary codes are compatible, the connectors are considered as being checked and the marker sequence continues. If at any time, an operated connector sends back to its associated marker a code that is not compatible with the states of the word relays, the ground or battery is removed from the operate and hold paths of all the connectors dedicated to that marker.

When the result of the connector check is positive, the marker operates and holds some relays in the network control circuit. The contacts of these relays permit the marker to reach the select and hold magnets of the crossbar switches, and also the sleeve lead of the networks. After verifying that the network control circuit is functioning properly (no cross-connections, no premature operations, etc.,) in a well-known manner, the marker senses the possible transmission links through the network circuit as will be described below, and selects an idle path if one exists.

Since all sequences followed by the marker are specified by the five-word order provided by central control, the marker only has to decide which path to choose from all the possible given paths. If, for example, we take the type of call requiring a connection through the line circuit switching network and service network when a calling line is to be connected to a digit receiver, the two end points are specified, which define the line switch and the terminating service switch.

Mercury relay groups 16–12 and 16–13 sense the line links associated with the specified line switch 13–1 and originating junctor 2–1, in the specified junctor group, for busy or idle status. The sensing function is performed by mercury relay group 16–12 being connected to the sleeve leads of the line switches 13–1, and mercury relay group 16–13 being connected to the "*c*" lead of originating junctor 2–1. A line link is busy when the sleeve lead is grounded; a junctor is busy when the "*c*" lead is grounded or has no potential applied to it.

Well-known matching circuitry 16–14 pairs the idle links and idle originating junctors with each other to form idle paths from the calling line 1–2 to the input terminals of the service network 2—2. One of the idle paths is selected on a preference basis using a well-known preference chain in selection circuitry 16–15 which then defines an originating service switch 14–2 in the service network 2–2.

Originating and terminating service links between the two end points on the service network are now set for busy or idle condition. The matching circuit pairs idle links in the service network in order to select paths therethrough in a similar manner to that described above. Again, on a preference basis, one path is chosen. A complete path, called a channel, from the calling line 1–2 to the digit receiver service circuit 2–3 is now available, and the marker operates the select and hold magnets in the crossbar switches now required to form that path. Ground potential is also connected to the sleeve lead in a well-known manner in order to cause the HG relay to operate in the selected service circuit, so that it can keep the hold magnets in the line circuit switching network and service network operated after the marker releases.

During and after selection and connection of the channel, the specified tests are performed. If no abnormal situation is found, the marker releases the network frames and returns to an idle state. The sleeve lead which keeps the hold magnets of the channel operated is held by a ground connection in the service circuit as previously described.

Scanner access circuitry 16–17 is composed, for instance, of 32 ferrod sensors connected to the selection circuitry 16–15 and therefore reports to central control 3–2 as to the situation, the normality and abnormality of the various connections which can be immediately determined. If an abnormal situation is encountered during the processing of an order, the marker stops its sequence. The marker is now normally reached by a central control order consisting of one 16-bit word. If the marker cannot be released in this normal mode, it is force-released by the operation of a relay via the signal distributor. Central control then reissues the order to another marker. Less than 250 milliseconds therefore normally elapses from the time central control places an order on the peripheral bus 4–1 until the marker returns to its idle state after performing the order.

The status of operations, the selected path, the busy or idle condition of a selected path, and the trouble and traffic blocking conditions are reported to central control via the 32 ferrod sensors in the scanner access circuitry 16–17. It is suggested that for reliability purposes at least two markers be used, even in the smallest office size economical with this invention.

We have now seen how the switching network can interconnect subscriber's lines with service circuits and trunks. A central control containing a central processing unit, memories and program instructions records the status of all aspects of a call in progress and issues orders for further processing of the call in an electronic data mode on the peripheral bus. Sensory information as to the status of various portions of the system are reported to the central control via the scanner which uses ferrod sensors, and a marker and signal distributor carries out the orders of central control, while acting as a buffer between the fast electronic speeds of the central control and the slower relay speeds of the remainder of the system. The central control complex will now be described.

g. Central Control

Figure 18:
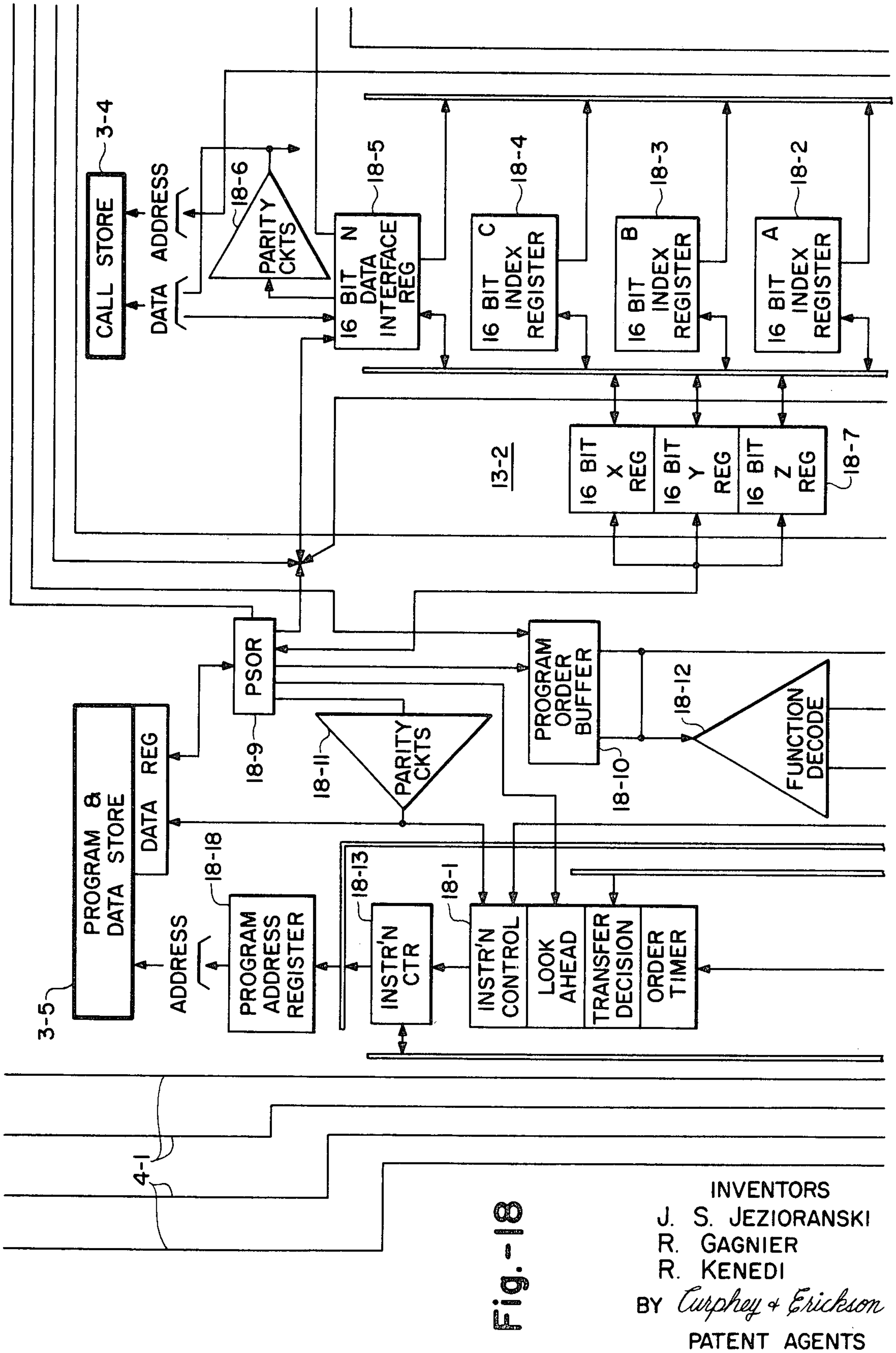
Figure 19:
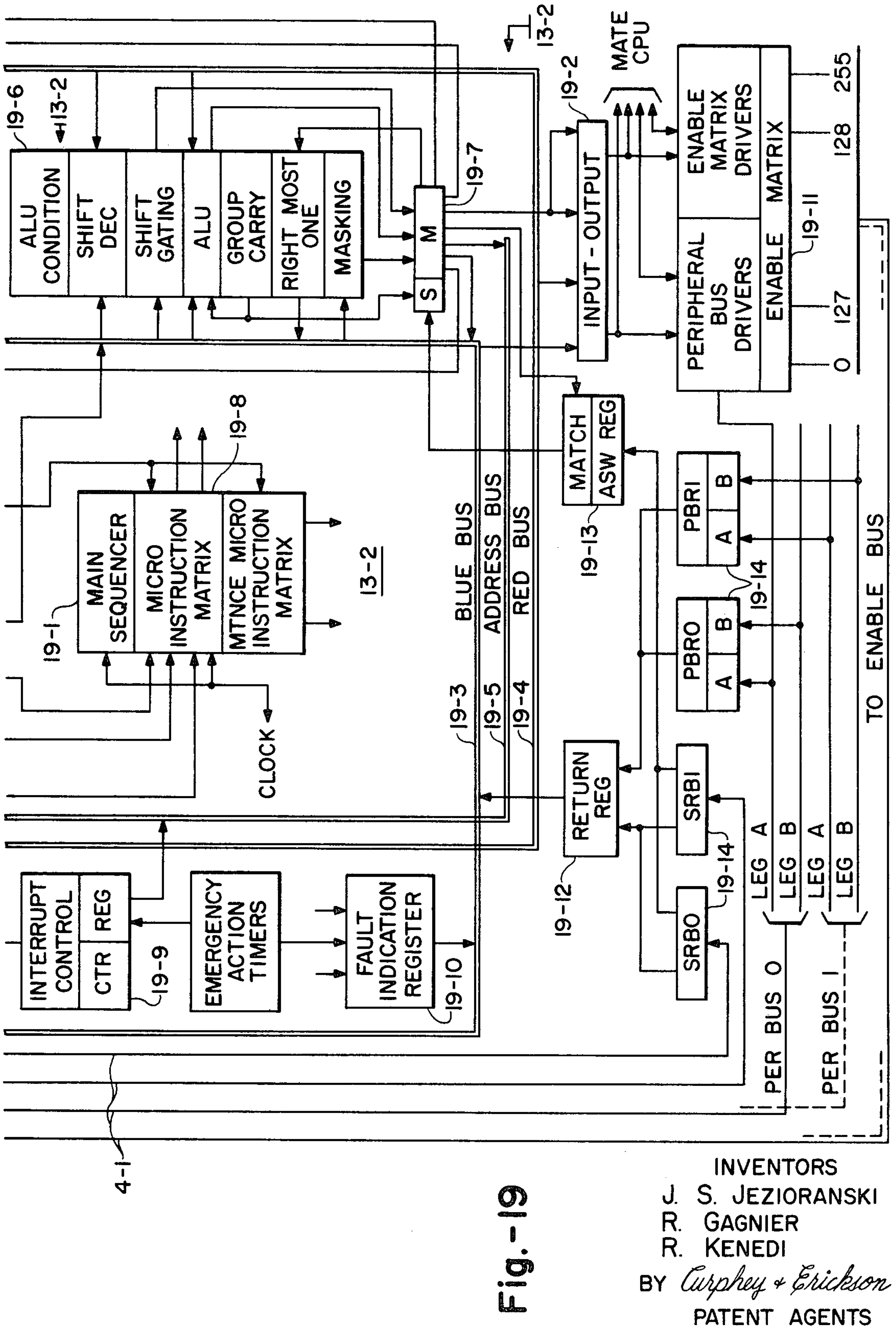
Figure 20:
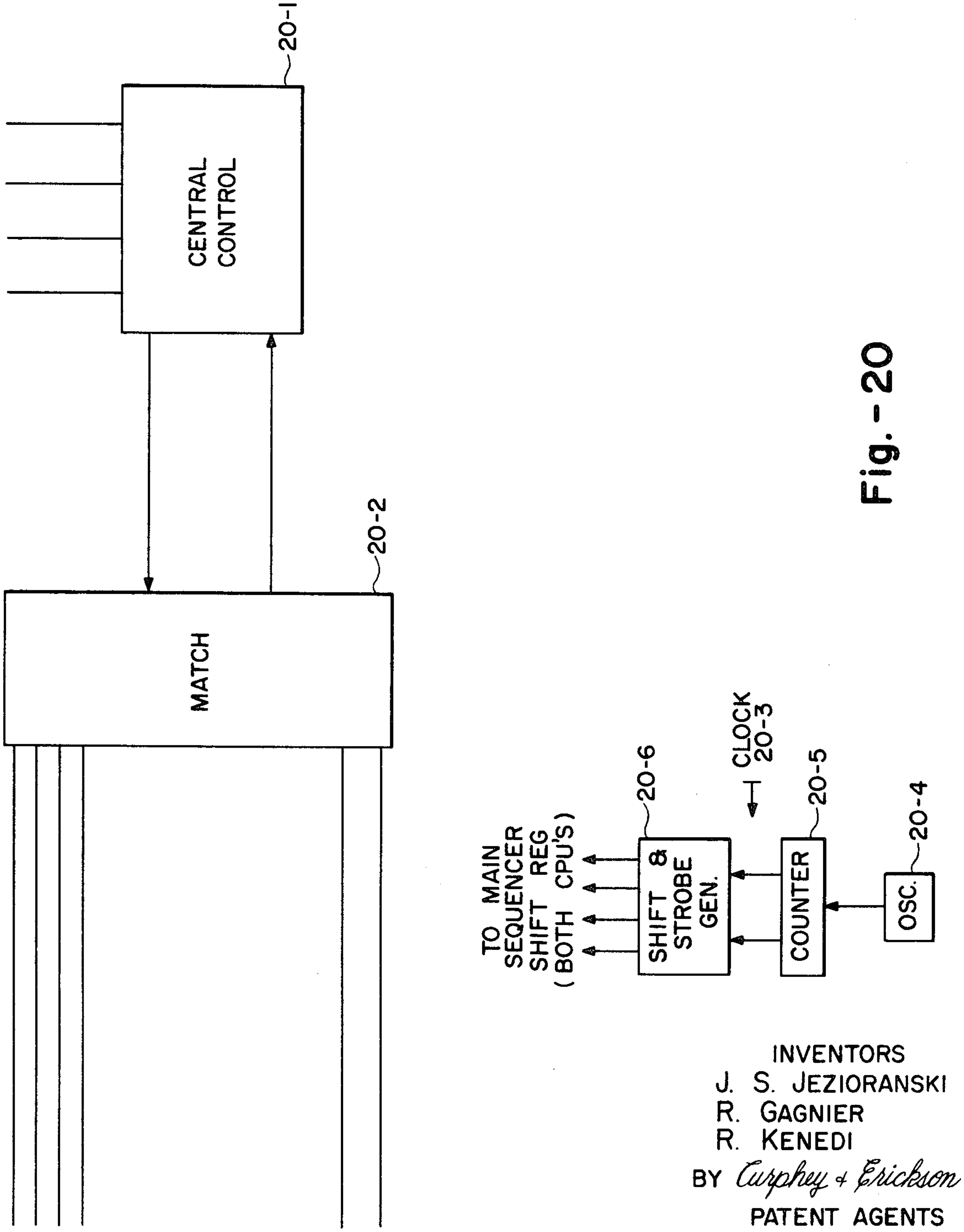

Central control 3–2, because of its importance to the system, is completely duplicated for reliability purposes. FIGS. 18 and 19 show a single central control in block diagram and FIG. 20 shows duplicate central control 20–1 which is similar to central control 3–2, with match circuits 20–2 for matching the manipulations of both central controls and for detecting errors. A clock source 20–3 times the operation of both central controls.

During normal operation, both central controls are in the work state, one being in the active and the other in the standby mode. Each central control has access to the peripheral bus 4–1; however, only the active one of the two is permitted to output signals to the bus. The match circuitry checks that the information handled by the two central controls is identical. In case of a mismatch, the central control at fault is temporarily removed from service while the other central control continues to perform all required operations.

The central control is basically a digital computer. Therefore, many general purpose commercial computers could be used in this application, provided they are programmed and are set up so as to perform these functions described below. Another central control which could be used in this application is described in the Bell System Technical Journal, Vol. XLIII, Sept., 1964, No. 5. However, a central control is described herein which is preferred for this system. It will be described with reference to the system blocks, the constitution of each of the blocks being well known to those skilled in the art.

Central control 3–2 is made up essentially of two parts: a central processing unit which processes data and a program control, and a memory system which stores the programs which control the central processing unit and data used during central processing unit operation. There are several input and output channels for information transmission between the two processing units and the peripheral units. The physical input and output channels comprise the peripheral bus 4–1.

A central processing unit performs essentially the following functions:

a. it controls the flow of input data, for example, from the scanners, b. it processes input data and decides what action should be taken, c. it issues orders in the form of output data, for example, to the marker, to cause required actions to be performed.

Almost all of the central processing unit actions are performed under control of a program. Those that are not are performed under hardware control by "wired logic," but these actions are relatively few.

A general discussion will now be provided to insure background for the explanation of the interrelationship between the various blocks, which is to follow.

The execution of an instruction or order results in a series of hardware actions within the central control. These hardware actions are relatively few in number and are basically simple. A complex function is performed by the execution of a program which is made up of a block of instructions executed in sequence by the hardware of the central processing unit. Many such programs are required to be performed in the processing of a single telephone call.

Means are provided to transfer control from one program to another. Transfer can be made unconditionally or conditionally depending upon certain system conditions from one instruction to another, or from one program to one of many programs. That is, a transfer is made only if a certain condition has been met; otherwise another instruction of the same program is executed.

An interrupt facility is provided to permit interruption of the execution of the present program so that a special interrupt program can be executed, after which control is returned to the interrupted program. The prime reason for such a facility is to permit immediate access to maintenance programs when troubles develop within the system. Another reason is to permit synchronization of the operations of any of the peripheral units with those of the central processing unit and to permit time dependent functions to be performed on schedule. Several levels of interrupt are possible, depending on priorities which are established by the relative importance of the causes of the interrupt. For example, a failure in the central processing unit is far more serious than a fault in a marker. Therefore, a central processing unit fault should result in an interrupt at a level considerably higher in priority than a marker fault interrupt. An interrupt of an interrupt program is permitted to occur only if the second is one at a higher level.

The preferred central processing unit operates as an asynchronous machine. Whereas in synchronous computers, the instruction execution time is fixed, usually to the memory cycle time or a multiple thereof, in an asynchronous machine instruction execution time is variable. The execution time is limited only by the capability of the hardware. Thus, as soon as one instruction is executed completely, execution of the following instruction is initiated. The end result is a gain in operating speed over that of the synchronous computer.

A further gain in speed is obtained by use of a "busy-free system" in dealing with the instructions that refer to the memories. The cycle time of the memories is long in comparison to the execution time of those orders that do not deal with the memories, such as arithmetic orders. A gain in overall operating speed could be made if a memory instruction could be considered as being completely executed as soon as the order to write or read is given to the memory system. Thus, if the next sequential instruction is one which makes no reference to the same memory, it can be executed immediately without waiting for the memory system to complete its job of reading or writing. This means, of course, that a record must be kept at all times of the busy or free condition of each memory and its associated register and that any instruction making use of a memory unit must inquire to see whether or not the memory or its register is available.

For example, if a "read call store into the call store register" order is followed by an order to "shift contents of index register," the execution of the second order can be initiated immediately after a read pulse is provided to the call store 3–4, thereby making good use of the read time of the call store. However, if the "read call store into the call store register" order is followed by a "move contents of call store register to index register" order, use cannot be made of the readout time since the call store register would not be accessible until the data has been written into the call-store register. It is apparent then, that successful use of the busy-free concept is dependent upon how the program is written but it is expected that a considerable gain in real time capability will be realized.

Two types of memory system are used in central control. The program and data store 3–5 stores program instructions and translation data, and is a semipermanent twister memory similar to that described in the 1964 Intermag Proceedings, "The Piggy-Back Twistor-An Electrically Alterable Nondestructive Twistor Memory," by W. A. Baker. This memory is termed semipermanent because readout is nondestructive and special techniques are required for writing information in. It is expected that information stored in this type of memory will be altered only rarely. Volatile information, on the other hand, is stored in the call store 3–4, which consists of a temporary ferrite sheet memory, similar to that described in U.S. Pat. No. 2,912,677, issued Nov. 10, 1959, by R. L. Ashenhurst et al., or an article by R. M. Genke et al., Bell System Technical Journal, Vol. XLIII, Sept., 1964 Number 5. Readout from this type of memory is destructive and information to be retained must be rewritten back immediately after readout. Both types of memory are word organized so that a single address presented to the memory results in an entire word being read or written.

Indexing is used on nearly all orders that make reference to the memories. Indexing is a technique for memory address modification wherein a base address from the address filed of an instruction word is added to the contents of an index register to produce an effective address which is then used to address a memory. Use of this technique results in fast generation of different effective addresses with a single instruction. This index registers, of which there are several, are also used as temporary storage registers for data that is required for immediate use.

A masking facility allows only the desired portion of a data word to be read out of or written into a memory or a register. Such a facility is useful in checking for the state of a particular bit in a word and for packing and unpacking data words in a memory.

The central processing unit action during the execution of each instruction is controlled by a sequencer. Each group of instructions, because of a similarity of actions within each group, is controlled by a common sequencer. As its name implies, the sequencer controls the sequential actions of the central processing unit as required by a particular instruction. Its input signals are pulses from the clock, the bit configuration of an instruction word, and for some instructions, certain system conditions. Its output signals control the action of gates and other circuits throughout the central control.

Each program store instruction is made up of two 24-bit orders. Each order is made up of a six-bit instruction field, a two-bit index field and a 16-bit address-data field. The instruction field is further subdivided into a two-bit instruction "group" subfield and a four-bit instruction "function" subfield. The group subfield identifies the particular class of order to be executed and hence which sequencers are to be used to control the instruction execution. The function subfield defines the particular order in the class. The index field is used to specify which register is to be used for indexing as required, which register is to be used for storage, which register is to be used for certain arithmetic or logic orders, or which register is to be tested in the case of conditional transfer orders.

The address-data field is used in two ways. The full 16-bit field is used, in orders that refer to a memory, as a base address when indexing is to be done, an effective address when no indexing is to be done, or in nonmemory orders, as a 16-bit data field in immediate type instructions. In certain arithmetic, logic, and input-output orders, the address-data field is subdivided into four subfields, three of which are used. Two subfields of three bits each are used to define five registers which are to be used for storage and to specify source registers for certain arithmetic and logic operations. A third subfield of five bits is used in shift operations to specify the direction and the number of positions to be shifted.

In summary, central processing unit instructions are subdivided into instruction groups according to the type of central processing unit actions required. Instruction groups subfield specifies which group and hence which sequencer is to be used to control the instruction execution. The instruction function subfield is used to specify which particular function within a group is to be executed.

i. Program Store

A program store memory module, the basic building block of the program and data store 3–5, is formed by stacking 64 planes of 64 words each, to store a total of 4,096 words. Each plane consists of 54 pairs of twistor wire placed beside each other and enclosed by 64one-turn copper solenoids wrapped around the twistor wires at equal intervals. The net result is a 64-word plane with 54 bits per word. Four memory modules are combined to form a program storage unit of 16,384 randomly accessible 54-bit words. The number of storage units making up the program store in a particular office varies with office size and total traffic encounter.

To perform a required function in central control, a program is executed by following a number of instructions. Each program store group of words is made up of two instructions (orders). Each order includes an operation code, an index field, and a data-address-register field, as described above. The operation code is divided between a group field and instruction field. The group field identifies the particular class of order to be executed, and hence which sequencers to be used to control the instruction execution. The instruction field defines a particular order in the class. The index field specifies a register to be used for indexing, or for storage, or for certain arithmetic or logic orders, or for the register to be tested in the case of conditional transfer orders. The data-address-register field either refers orders to the memory or to immediate type instructions for nonmemory orders or specifies register combinations and options on arithmetic instructions. Any stored word is desirably read out of memory in about 4 microseconds upon receipt of an address from the processor, the total cycle time then being approximately 5.5 microseconds.

Typical call processing and maintenance functions performed by the central control, which require reference to the program store are:

Call Processing Function a. Scan Control b. Trunk Control c. Digit Counting d. Interpretation of Dialled Numbers (translation)

e. Equipment Selection f. Marker Orders g. Ringing and Outpulsing Control h. Charging decisions i. Timing Maintenance Functions a. Fault recognition and diagnostics b. Preventive Maintenance c. Teletypewriter Control d. Office administration The total available capacity of the program and data store is 196,608 words, which is divided into three blocks of 65,536 words each. They are addressed as "program store," "data store 0," and "data store 1." As the names imply, the program store block stores the programs, while the two data store blocks store the semipermanent data required by the office. Data may also be stored in the program store block, although programs cannot be stored in the data store blocks.

ii. Call Store

The call store 3–4, with its associated access circuitry, uses a ferrite sheet memory to store the temporary information required to process a call. The sheet is composed of a mixed magnesium manganese ferrite, yielding good hysteresis loops. Each sheet contains 256 holes in a 16 by 16 array. A bit of information can be stored in the material immediately surrounding each hole by magnetizing the material in either clockwise or counterclockwise direction, i.e., each hole acts like a miniature magnetic core.

The call store is built up from the basic storage device in the following manner. Individual ferrite sheets are assembled with their holes in alignment, in three stacks to make a memory submodule. Each of the three stacks consists of 16 ferrite sheets, plus a spare which is not connected to the external circuits. Four submodules are combined to make one module with a total storage capacity of 2,048 24-bit words ($16\times16\times3\times4/24$). A call store unit, being made up of four modules can therefore store 8,192 words.

A reading or writing operation can desirably be performed every 5.5 microseconds. To perform a reading or writing operation, the call store must receive an address from the central processing unit to be able to select the desired word out of the 8,192 word locations in the particular call store unit. Typical information stored in the call store includes:

a. Bush/idle status of lines, trunks, junctors, service circuits and network links, b. Digits received and digits to be outpulsed, c. Recent change information.

For a large size office, of for instance, approximately 24,000 lines, the words requirement for basic service is 12,000 and hence two call store units are needed in each central control. A common control section governs the selection of the correct store, the starting of the read or write cycle, and control of maintenance circuits.

Sixteen bits, plus a single odd parity bit, may be used, for a total of 17 out of 24 available bits from the called store.

iii. Master Clock

The main timing pulses used to run the central control to its variable operations are generated from clock source 20–3. The clock rate applied to the central processing unit in this embodiment is 2 megahertz, which is produced by a 4-MHz. crystal controlled oscillator 20–4 connected to a binary counter 20–5. The binary counter is connected to shift and strobe generators 20–6 which are connected so as to pulse the main sequencer (to be described below) with a 2-MHz. frequency.

The clock pulses are provided in two complementary phases. The two phases are necessary for the busy-free system, wherein one phase is used to enable the setting and resetting of busy-free registering multivibrators, (not shown) while the other is used to enable the interrogation of these same multivibrators. This measure ensures that interrogation is never done while the multivibrators are being set or reset.

Further circuits in the clock source are used to generate two pulse trains of 215 nanosecond pulses of 1-megahertz frequency, but out of phase with each other by 180°. These two pulse trains are used as shift signals for the sequencers. The sequence control associated with each sequencer then can gate the appropriate pulses from each train to advance the sequencer shift registers. This will be described in more detail below.

iv. Sequencers

The main sequencer 19–1 is made up of shift register stages which are driven by pulses from the clock source 20–3. It provides the timing for the execution of instructions in the central control.

Instructions performed by the central processing unit are of variable time duration. The longest instruction in this embodiment requires 16 stages of the sequencer, the shortest requiring four. This variable length sequencer is implemented by jumping out of the sequencer at some selected point into the last stage. The variable length instruction concept is advantageous because of the central processing unit's interaction with slow-speed peripheral units, medium-speed memories, and high-speed internal operations.

Since the central processing unit operates asynchronously each instruction execution time is made as short as the hardware will allow. In other words, the sequencer is comprised of as few states as possible. When the instruction execution is complete, the two "1's" are gated out of the sequencer to the instruction control circuit which initiates the execution of the next instruction.

v. Buses

There are three main bus systems in this central processing unit. They may be called the blue bus 19–3, the red bus 19–4, and the address bus 19–5. Each bus is made up of 16 pair to carry 16 bits of information in parallel mainly from register to register. The red bus 19–4 acts mainly as the output bus for index registers A,B,C, and W, to be described below. The address bus 19–5 serves as the distribution bus for addressing information to the program and call stores.

vi. Index Registers

The three index registers A, B, and C (19–6, 19–7, and 19–8 respectively) are identical 16-bit registers which can be loaded from the blue bus 19–3 only, and can be read out into the red bus 19–4 or the blue bus 19–3. They can be used not only for indexing, but also service temporary storage registers. Index registers permit the application of indexing, a technique for memory address modification described earlier. The contents of an index register are added to a base address from the register field and instruction word to produce an effective address for a memory location. This results in fast generation of different effective addresses with a single instruction.

vii. W-Register

The W-register 18–5 is a 16-bit data interface register with the call store 3–4. It may also be used as an index register similar to registers A, B, and C. Loading of this register may be done from the blue bus 19–3, a peripheral unit, call store 3–4, or the W-register of the other central processing unit. It can be gated to the blue bus 19–3, red bus 19–4, call store 3–4, or the W-register of the other central processing unit.

The shift registers shift pairs of "ones" preceded and followed by "zeros" from one end of the shift register to the other. Various stages of the shift register are gated with the bit configuration of the instruction word to produce a sequential enabling of various gates through the central processing unit as the "1's" are shifted through the shift register.

For the execution of program instructions, there are four sequencers, one for each instruction group. Since the bit configuration of the instruction word is such that the instruction group is identified by two bits, it is sufficient from the decoding circuits (to be described in more detail below) to decode only these two bits in order to select a sequencer. The selected sequencer is enabled by applying a signal to the sequencer control. The sequencer control then inserts a "1" to the first stage of the sequencer, ensures that only "0's" follow, and controls the shift signals which are produced by alternately diverting the master clock pulses first to one shift line and then to the other.

Sequencers are also used for controlling functions other than the execution of program instruction. These functions include operating the instruction control 18–1, which controls the flow of instructions from the program store, and their execution, the input-output control 19–2, which controls certain hardware sequences for communicating with peripheral units via the peripheral bus 4–1, and some maintenance sequences. These sequences are different from those controlling instruction execution in that the shift register forms a closed loop much like a ring counter.

The function of the sequence control is to initiate sequencer action when called upon by instruction or by system conditions, to steer the shift pulses to the proper shift line at the proper time and also to inhibit the shift pulses when necessary. The last function is in connection with the busy-free system wherein the sequencer is not allowed to advance to the next state unless memory conditions are faborable. Of course, this feature is necessary only for those stages of the sequencer that are concerned with a memory system.

When the central processing unit performs a "read call store" operation, 17 bits are read out of the call store, 16 bits being data which is gated into the W register, the 17th being gated to parity circuits 18–6. The main value of the parity check comes in when only one central control is in service and thus "matching" cannot be performed. Store faults will then be detected by a parity failure, and a maintenance interrupt program can be introduced in case of such error.

viii. Register X, Y, and Z

The X, Y, and Z registers 18–7 each have 16-bit capacity, making a total register 48-bits long. The three portions may be used individually for internal central processing unit operations, or as a group for storage operations.

The 48-effective bits may be set either by the output of the program store on a "program store data fetch" instruction in 48-bit words or by program orders that move data from the blue bus into the X, Y, and Z registers in separate words, each of 16 bits. The X, Y, and Z registers may also be used as temporary storage registers, set from either the blue bus or gated to the blue bus in 16-bit words. No gating may be done unless the register is free. When gating the contents of one of these registers to the blue bus 19–3, the register must also be set to its free state.

ix. Program and Address Register

The program address register (PAR) is a 16-bit register which is loaded from the address bus 19–5 when a word from the program store 3–5 is required by the central processing unit. It provides the capability to address $2^{16}$ or 65,536 locations so that any one word in any one of the three blocks of program and data store 3–5 can be identified. To distinguish between the three blocks, three program store read instructions are provided.

x. Program Store Output Register

The program store output register (PSOR) 18–9 can contain 48 bits, and is fed directly from a data register in the program store 3–5. If the central processing unit fetches instructions from the program store, the instruction read from the store is gated into the program store output register 18–9, and then to a program order buffer 19–10 by the instruction control 18–1. If data is read from the program and data store 3–5, it is gated into the program store output register 18–9 and then into the X, Y, and Z registers 18–7. Forty-nine bits of information plus a pair of flag bits are obtained when reading data or instructions from the program store, the 49th bit being gated to parity circuits 18–11. When writing into the program store, the contents of registers X, Y and Z are gated simultaneously into the program store output register and then into the program store. The program store output register can output information to the maintenance center (not shown) and the mate central processing unit.

xi. Program Order Buffer

The program order buffer 18–10 stores the instruction words fed from the program store output register 18–9 while each order is being decoded and executed. It may also be loaded with instructions from either the maintenance circuit or the mate central processing unit. Each word loaded into the program order buffer contains two instructions or functions. The program order buffer contain a 48-bit register to which order decode circuits are attached.

The order decode circuits include logic circuits to decode the instruction group bits, the instruction function bits, the bits that specify the index register to be used, if any, and to sort registers or destination registers for each of the pair of instructions in an instruction word. The coding of an instruction group of bits result in a seizing of a particular sequencer required for execution of the instruction. The output signals of a particular sequencer coupled with decoding of the instruction bits results in a sequence of gating and enabling signals that fan out to all parts of the central processing unit. The index register designation to be used in the instruction execution is also decoded by these circuits.

xii. Instruction Counter

The instruction counter 18–13 is a 16-bit counting register which contains the address of the instructions to be fetched. Its purpose is to provide sequential indications of addresses of stored instructions.

xiii. Arithmetic Logic Unit

The arithmetic logic unit 19–6 performs the arithmetic and logic operations plus other functions to satisfy the instructions set out by the central processing unit. These operations include:

a. addition, b. subtraction, c. logical AND d. logical EXCLUSIVE OR
e. logical INCLUSIVE OR
f. determination of right-most-"one,"
g. shift left or right A well-known right-most-"one" function is required to aid in the search of an idle unit of equipment, which is represented by a "one" in a call store word containing a busy or idle condition of many units which are represented by "-zeros" and "ones." This is done in the arithmetic and logic unit using the carry logic and the "AND" function. A binary number representing the bit position of the right-most-"one" is gated on to the blue bus and set into a destination register.

The shift operation allows for the contents of any 16-bit register to be shifted either left or right from zero to 15 places. Shifting is accomplished in four stages of gating and is done only on data on the blue bus. In the first gating stage, data from the blue bus is shifted either left or right eight places, or not at all. In the second stage data is shifted either left or right four places, or not at all; in the third stage, left or right two places or not at all; and in the fourth stage, left or right one place or not at all. The option to be taken at each stage is controlled by the five-bit shift field (four bits specify the number of places, and one bit the direction) in the address-data field of the instruction word. By this method, shifting takes a constant time regardless of the number of positions that a data word might be shifted. A full description of a preferred method which may be used for this application of constant time shift is disclosed in U.S. Pat. No. 3,596,251 entitled "Logical Shifting Devices and Methods of Shifting" and issued to J. S. Buchan et al., on July 27, 1971.

The circuitry for all the above operations is merged into a high-speed adder, using "carry-look-ahead" logic. The circuitry makes use of the group carry concept where all the carries within a group prescribed bits are generated simultaneously and propagation is restricted to occur only between adjacent groups. The output circuitry for the arithmetic and logic unit is 16-bit M register 19–7. There is one-bit S register associated with the arithmetic and logic unit to indicate overflows and negative numbers on arithmetic operations. This register may be though of as the 17th bit of the M register, having access to the transfer decision logic in instruction control.

xiv. Function Decode

The function decode circuits 18–12 contain logic circuits to decode orders from the program store 3–5. The two instruction formats which are used in this central processing unit are:

Format A
a. six-bit function field
b. two-bit index field
c. 16-bit data field

Format B
a. six-bit function field
b. two-bit index field
c. four-bit mask field
d. one-bit not used
e. five-bit shift field
f. six-bit register field The fields are listed in descending order from the most significant to the least-significant bit.

The six bits comprising the function field are decoded by the function decode circuitry into one out of 64 possible instructions or functions. The two-bit index field is decoded into one out of four states to define the index register to be used in performing the instructions. The 16 least significant bits differ in the two formats as seen above. The 16-bit data field of format A is normally gated from a program order buffer 18–10 on to the blue bus 19–3. The least significant bits of format B are three-bit register fields which are decoded as to destination and source registers in the execution of some instruction. Each field can specify registers A, B, C, W, X, Y, or Z. The four least significant bits of the shift field are decoded to specify whether a shift operation should shift anywhere from zero to 15 places. The most significant bit of the shift field specifies whether the shift should be left or right. The four-bit mask field is used in arithmetic instructions and is decoded so that the specified most significant bits of the M-register are reset.

xv. Microinstruction Matrix

The microinstruction matrix 19–8 logic generates the microinstructions for the different central processing unit instructions. The functions are performed by logical "ANDing" the required timing waveforms from the main sequencer, and with the proper instructions decoded by the function decode logic and with other functions. There is also a maintenance microinstruction matrix which combines the coded machine maintenance instructions with proper time and function leads.

xvi. Instruction Control

The function of instruction control 18–1 is to ensure the smooth flow of program instructions from the program store 3–5 to the order decode circuits 18–12. This is realized by the use of two sequencers, both of which are controlled by hardware and system conditions.

Instruction control logic 18–1 controls the flow of information from the program store 3–5 to the central processing unit and performs housekeeping functions between instructions. It fetches the upcoming order from the program store, gated from the program store order register 18–9 into the program order buffer 18–10, selects instruction of the program order buffer to be decoded, allows interrupter quests to be served and control the main sequencer.

A "look-ahead" unit is included as part of the instruction control. It monitors some of the contents of the program store output register 18–9 to be able to tell the instruction control that a program or data store read or write order or a transfer order is coming up.

Transfer-decision logic in the instruction control allows transfer of control from one program to another. Transfers may be conditional or unconditional. Unconditional transfer orders are used to transfer control of instruction executions from the end of one program to any instruction in any program in the program store. Conditional transfer orders are dependent on some system condition or state.

There are two distinct operations within the instruction control:

a. the order decode sequence

This operation is concerned with initiating the decoding of each order and with the housekeeping operations during and after each order is executed. To illustrate, as soon as the instruction word is gated into the program order buffer 18–10 order order decode sequencer control, decoding of the first order is initiated. If the look ahead facility in the instruction control 18–1 has not indicated that there is a "transfer" order or a "program store data" order in this word, the order fetch sequencer, which controls the other operation in construction control 18–1 is triggered. The order decode sequencer then awaits the completion of the present instruction. When the "instruction complete" signal from one of the program sequencers arrives, the order decode sequencer then initiates the coding of the second instruction of the pair and again awaits an "instruction complete" signal from one of the program sequencers. After the second instruction is completely executed, the order decode sequencer, before gating the next pair of instructions from the program store order register 18–9 into the program order buffer 18–10, checks to see if there are any interrupts. If there are, instruction control 18–1 passes control to interrupt control 19–9. If there are not any interrupts the order decode sequencer gates the next instruction from the program store order register 18–9 into the program order buffer 18–10, and the cycle repeats.

b. The Order Fetch Sequencer

When the instruction pair has been gated from the program store order register 18–9 into the program order buffer 18–10, and provided the look-ahead logic in the instruction control 18–1 has not indicated that there is a "transfer" or a "program store date" order, the order fetch sequencer is initiated. This sequencer first checks the busy-free multivibrators of the program store to see if the store is free. If it is free, the store is set busy and the contents of the instruction counter 18–13 are gated into the program address register 18–8. This store is then given a "read" signal and the instruction counter 18–13 is incremented by one. If the store is not free, the order fetch logic waits until it becomes free, then seizes it by setting the store busy. The order fetch sequencer logic then awaits the readout of the next instruction into the program store order register 18–9. When the readout is complete, a busy-free multivibrator indicates a change of state. This change of state indicates a parity check on the word in the program store order register 18–9. If the parity check is satisfied, the order fetch sequencer returns to an idle state to wait the next order fetch sequence.

If the look-ahead logic in instruction control 18–1 has indicated that the instruction that is gated into the program order buffer 18–10 contains a "transfer" order, the order fetch sequencer is not activated unless the transfer condition is subsequently not met. If the transfer condition is met, or if the transfer order is unconditional, the transfer order sequencer retains control until the transfer address is placed into the instruction counter 18–13. At this point, the transfer order is complete and control is returned to order decode sequencer. If the look-ahead logic in the instruction control 18–1 has indicated that a program store data order is present, the activation of the order fetch sequencer is delayed until the memory order program sequencer has a chance to seize control of the program store. The order fetch sequencer then waits until the store becomes free again before it can fetch the next instruction.

The instruction counter 18–13 which is also virtually part of the instruction control, is incremented by one after its contents are gated to the program address register 18–8. It can also be jam-set in parallel from the blue bus, during the execution of the transfer order.

An order time is included as part of the instruction control 18–1. Its function is to keep track of the elapsed time for the execution of each instruction. Under normal conditions, this time does not time out and is reset after every order is executed completely, and is restarted when an order decode is initiated. An order timer timeout indicates that the worst case instruction execution time has elapsed and that control should be transferred to the duplicate central processing unit.

xvii. Interrupt Control

The interrupt control facility 19–9 is provided to permit interruption of the execution of a program so that special interrupt programs can be executed. A prime reason for the existence of this facility is to permit access to a maintenance routine when troubles develop within the system. It permits time dependent functions to be performed on schedule.

A check for interrupt signals is made after the execution of every instruction, and after a successful transfer, and before the next instruction word is gated into the order decoding circuits 18–12. If an interrupt signal is present, and provided the machine is not processing an interrupt of the same or higher priority, an interrupt control circuit 19–9 is activated. Further order decoding is inhibited and an automatic program storage of the central processing unit image into the call store memory 3–4 is carried out.

This causes the contents of all pertinent registers to be stored in an area of the call store set aside for that purpose. An automatic transfer of control is then made to an interrupt routine in the program store 3–5. At the completion of the interrupt program, provided there are no further interrupts, the central processing unit image is restored and an automatic transfer of control is made back to the original program.

In more detail, when the interrupt control receives an interrupt signal, an interrupt multivibrator in instruction control 18–1 is set. When the instruction control detects the presence of an interrupt signal it transfers control to interrupt control 19–1 which causes a hardware transfer to a program that stores the contents of the call store output register W 18–5, the instruction counter 18–13, and all pertinent registers in the central processing units into an area in call store set aside for the interrupt level on which processing was being done. Control is then transferred to an interrupt level sort program which deciphers the cause of the interrupt and causes branching to the interrupt program at the appropriate hierarchical level.

When the working program at the appropriate level is completed, control is returned to the sort routine, from which control is transferred to the interrupt level program next in priority, and not necessarily to the program which was previously interrupted. If at this time control is to be returned to the previously interrupted program, the central control image is restored at that level before processing can be resumed. If, on the other hand, control is to be transferred to an interrupt level program next in priority, and not the previously interrupted program, the central control image is not restored.

The interrupt control hardware includes an interrupt source register which indicates the presence of interrupts on five levels. Also included is a mask source register into the interrupt logic and a register to indicate the interrupt level presently being worked on. These registers are accessible by program. Associated with these registers is the priority logic required to establish the correct interrupter level.

xviii. Fault Indication Register

The purpose of the fault indication register 19–10 with the emergency action timers is to store indications of faults. The register is composed of multivibrators, and associated gates. Each multivibrator is assigned to a particular fault such that the reading of a multivibrator will yield what has gone wrong and where the fault occurred. The fault indication register is read by maintenance instructions from either central processing unit and can be reset by the program contained in either.

xix. Busy-Free Logic

Associated with the program store and the call store there are busy-free multivibrators (not shown in FIG. 18) which indicate the state of the memory system. Any memory order must use the state of these multivibrators during its execution.

These multivibrators are set into the initial memory system busy state only by the action of a memory order sequencer. They are set into subsequent states by the memory system itself with no further intervention by the sequencer. When the information in the register is required, sequencer action gates the contents out. Interrogation, on the other hand, is done by any sequencer that requires the use of the memory of its output register. For example, a "read call store" order sequencer would interrogate the call store busy-free multivibrators and if the store is free, would set the multivibrators to the busy state. On the other hand, if the sequencer action is to gate the contents of the blue bus 90–3 to the call store output register for temporary storage, the sequencer interrogates the busy-free multivibrators to check if the register is free. If it is, the sequencer enables the gating but does not set the register busy-free multivibrator.

xx. Look-Ahead Logic

The look-ahead logic is contained as part of the instruction control 18–1. It is desirable that the instruction control contain information whether or not the next instruction to be decoded contains a "transfer" order or a "program store data" order, that is, a "program store data fetch" or a "program store data write" order. The function of the look-ahead logic is to supply this information. Should a "transfer" order be present, the instruction control 18–1 does not perform a "new order fetch" sequence unless the transfer condition is not met. This allows the instruction control to perform its functions more efficiently, on the average, since performing a "new order fetch" operation for the next sequential instruction is a waste of time when the transfer is to occur. If a "program store date" order is present, the new order fetch sequence of the instruction control is delayed until the "program store data" order is decoded and the program store is seized. This is done so that the execution of the order is not delayed by the "new order fetch" sequence.

The look-ahead logic is enabled while the instruction word is stored in the program store order register 18–9, before it is gated into the program order buffer 18–10. The information that there is a "transfer" order or a "program store data" order present is decoded and stored in multivibrators until it is required by the instruction control a short time later.

xxi. Enable Matrix, Input-Output, Return Register, All-Seems-Well Register and Match Circuitry The enable matrix 19–11 with its associated drivers, input-output circuitry 19–2, return register 19–12, all-seems-well register 19–13 and associated match circuitry, and scan return peripheral bus receivers 19–14, provide the communications and selecting facilities to enable the central processing unit to communicate with the peripheral units.

An enable address of the bits is used to specify the peripheral unit to which the central processing unit wishes to output to. Eight bits, via the enable matrix 19–11 can identify $2^8$ or 256 destination points. The address is contained in the M-register 19–7 in the case of a scanner output instruction, or in registers, A, B, C, W, X, Y or Z as specified by the register field, in the case of a "peripheral output" instruction. All the above registers have access to the blue bus 19–3, hence the enable matrix 19–11 has the option of being driven from the blue bus 19–3 or the M-register 19–7. The output data to the peripheral units, with the exception of the scanners, is contained in the index registers A, B, C, or W. Except for maintenance testing the W register is normally used. This yields the advantage of incorporating the parity bit into the output word. The output data to scanners comes from the six least significant bits in the M-register. The input-output logic 19–2 translates these six bits into two "one-out-of-eight" codes for the scanner.

Information from the peripheral units is received by scan return bus receiver 19–14 and stored in the return register 19–12 and all-seems-well-register 19–13. The main sequencer gates the contents of the return register 19–12 onto the blue bus 19–3 and then gates the contents of the blue bus into a destination register, as specified by the register field of the instruction word. When addressing a scanner section, the information for the all-seems-well register is matched with the enable code provided by the M-register, in the match circuitry of the all-seems-well register 19–13. If a mismatch occurs, the match circuitry will set the S-portion of the M-register 19–7 to a "1" to indicate that the scanner section just addressed is not working correctly. If desired, the all-seems-well register 19–13 can then be read by a maintenance instruction and gated to the destination register, where, by program means, it can be determined what has caused the mismatch.

A short description of three typical orders will now be given to illustrate the operation of the central processing unit. The first is a memory order "read call store into register W," the second is an arithmetic order "subtract register W from register A," and the third, a transfer order "transfer to address X to the first instruction of a pair if register A is 0." In each case, the order is assumed to be in the program order buffer as a first instruction of a pair and is ready to be decoded. The order ends when a signal is given to the instruction control circuit to initiate housekeeping functions before the next order is decoded.

a. A memory order, "read call store into register W"

The coding of the order results in the seizing of the sequencer 19–1. The first operation is indexing. The order decode circuit decodes the instruction and applies the address of this instruction to the blue bus 19–3. The index register specification is decoded and the contents of the index register are applied to the red bus 19–4. At the same time the arithmetic and logic unit 19–6 is enabled and activated to perform an add operation. The result is gated into the M-register 19–7 and to the call store 3–4. A "read order" is then given to the call store. The call store reads the given address location and gates its output data to the W register 18–5.

b. An Arithmetic Order, "Subtract W from A and put the Result into A"

Decoding again results in the seizure of the sequencer 19–1. The sequencer first gates the contents of the W register 18–5 to the blue bus 19–3 and the contents of the A register 18–2 to the red bus 19–4. The arithmetic and logic unit 19–6 is then activated. It adds the 2's complement of the contents of the blue bus to the contents on the red bus. The result is placed in the M-register 19–7. A short time later, the contents of the M-register is gated onto the blue bus 19–3 and finally into register 18–2.

c. A Conditional Transfer Order, "Transfer to Address X and to the First Instruction of a Pair if Register A is 0"

Again, a function group decode results in the seizing of a sequencer 19–1 for transfer orders. First, a test is made to determine whether or not the contents are register A are all 0's or not. This is done by applying the contents of register A onto the blue bus by enabling the transfer control logic to test for all 0's on the blue bus. Assuming the condition is met, the transfer sequencer then gates the contents of the address data field to the blue bus 19–3, and into the instruction counter 18–3. The transfer order has completed at this point. The instruction control 18–1 then fetches the next order.

h. The Software System

To meet the requirements of call processing and maintenance, programming in this embodiment has six program priority levels; these are called A, B, C, D, E, and F with A having the higher priority. Levels E and F are concerned with the execution of all programs concerned with the control of the telephone office, and diagnosis of faults. Levels B, C, and D are concerned with fault recognition within the computer complex; these programs are responsible for the isolation of fault modules and then with returning the system to levels E and F functions as quickly as possible. A level is reserved as one means of human interface.

In order that faults be recognized, various points within the central processing unit are matched for information content with the same points in the duplicate central processing unit. In this embodiment, the following points are matched:

1. Program store order register 18–9, each time information is fetched from program store 3–5.

2. W-register 18–5, each time information is fetched from the call store 3–5.

3. At the M-register 19–7, each time data is gated into it from the arithmetic and logic unit 19–6.

With this information, the address of the store location which produced mismatching and an indication of the instruction being executed when a mismatch is being detected on the M-registers, can be indicated. When a mismatch occurs, a C and a D level interrupt request is generated in each central processing unit. The C level program checks to see that the processor and a limited area of program store is functioning correctly. The D level program detects whether or not a fault has been discovered. It also is responsible for returning the system to its call processing functions. A B level interrupt request is generated whenever control of the system switch from one central processing unit to another; this permits an up-to-date record of the system's history to be maintained.

A faulty computer is diagnosed by its mate; a teletypewriter (not shown) can be used to provide indication of what portion of the machine requires repair. The diagnostic program is run as an F-level task, interleaved with the execution of call processing functions. The central processing unit being diagnosed may be run in modes controlled by its mate; these modes permit various control signals and the blue and red buses to be monitored and their states to be interpreted by the diagnostic program.

The sequences in which programs related to specific tasks are run, and their relative priorities are determined by a CALL PROCESSING EXECUTIVE PROGRAM. This program is made up of two distinct program segments, one running on base level and the other on the clock generated E-level interrupt. The E-level segment of the call processing executive controls the periodic running of all the high priority input and output tasks which are known as the "peripheral drivers." It also provides timing information to cause the periodic execution of certain tasks on base level. Not all tasks on interrupt level need be performed on each interrupt, so the tasks should be appropriately segmented and scheduled to equalize the expected time spent during each interrupt. The executive system also reads the clock to aid in its schedule in function.

The base level segment of the CALL PROCESSING EXECUTIVE controls two categories of programs running on base level. One category includes those tasks which must be run periodically but do not demand the timing accuracy of those which run on interrupt level. Tasks of the second category are run as frequently as possible. All tasks on this level are interrupted by the E-level clock interrupt.

A UNIVERSAL CALL SEQUENCE program initiates processing of hardware actions in proper sequences for the various types of calls. Since hardware actions are each basically the same for all types of calls, the UNIVERSAL CALL SEQUENCE simply sets up various sequences of action of the hardware elements for different call types. Therefore, only one program routine is necessary to perform each of the basic function of call sequencing. Associated with each type of call is a table, resident in the program store 3–5, known as a UNIVERSAL CALL SEQUENCE TABLE which specifies, among other things, the order in which these basic functions are to be executed for particular types of calls. Also resident in the program store 3–5 is a program known as a UNIVERSAL CALL SEQUENCE EXECUTIVE which interrogates the UNIVERSAL CALL SEQUENCE TABLES. Associated with each call which is in the transient state is an area of call store called a UNIVERSAL CALL REGISTER (not distinguished). This area contains the variable information pertaining to the call, and a pointer which indicates the UNIVERSAL CALL SEQUENCE TABLE entry presently being executed for this call.

When an input scan program, such as a line scan program discovers that the call sequencing must enter a transient state, it seizes a free UNIVERSAL CALL REGISTER. The pointer is set to indicate an appropriate initial UNIVERSAL CALL SEQUENCE TABLE entry and the UNIVERSAL CALL REGISTER is linked to the bottom of the linked list containing active UNIVERSAL CALL REGISTERS. The next time that the CALL PROCESSING EXECUTIVE calls the UNIVERSAL CALL SEQUENCE EXECUTIVE, the UNIVERSAL CALL SEQUENCE EXECUTIVE reads the pointer and transfers control to the basic function routine as directed by the table entry. Execution continues for the same call until an input action which requires a real-time break (e.g., operation of a marker) occurs. In this case the output action is requested and this call remains dormant until the necessary mechanical action has been completed. The UNIVERSAL CALL SEQUENCE EXECUTIVE leaves the pointer set such that the call is properly handled at that later time and immediately examines the next UNIVERSAL CALL REGISTER in the linked list. This next UNIVERSAL CALL REGISTER may cause executions to start at any entry in any table including the one used by the last UNIVERSAL CALL REGISTER.

In order to take advantage of the fact that three, 16-bit fields can be read simultaneously from a single-program store word into registers Z, Y, and X, the UNIVERSAL CALL SEQUENCE table entry is 48 bits wide and is split into three distinct fields. After reading a table entry, the Z register 18–7 always contains the entry point of the required basic function or routine. Register Y usually holds the value which the UNIVERSAL CALL REGISTER pointer should assume if an unexpected condition is encountered and register X contains assorted parameters for the functional routines which are fixed for this call type. As the UNIVERSAL CALL SEQUENCE EXECUTIVE identifies to the functional routine the specified UNIVERSAL CALL REGISTER being used by a call, the functional routine has access to all the variable parameters which are stored in the UNIVERSAL CALL REGISTER for this call.

After receiving control from the UNIVERSAL CALL SEQUENCE EXECUTIVE a functional routine accomplishes its assigned tasks and then returns control to the UNIVERSAL CALL SEQUENCE EXECUTIVE in one of three ways. First, it may increment the pointer while retaining the same UNIVERSAL CALL REGISTER. This is the case when no real-time is needed and processing is to continue on the same call by using the next table entry on the same table. Secondly, the pointer may be left unaltered at the next UNIVERSAL CALL REGISTER selected. Thus, the same functional routine would be called on the next run of the UNIVERSAL CALL SEQUENCE EXECUTIVE, i.e., a real-time break has been taken. This is done when waiting for some relay operated peripheral actions or when waiting for space in certain queues. Finally, a return to the UNIVERSAL CALL SEQUENCE EXECUTIVE is provided which alters neither the pointer nor the UNIVERSAL CALL REGISTER identification. This allows the functional routines to effect a sequence transfer within a table or to move control from one UNIVERSAL CALL SEQUENCE table to another.

Example (see FIGS. 25 and 26)

It will be assumed that prior to the start of the sequence to be described below, a line scan program has detected a new origination (an idle telephone line changing from on-hook to off-hook), marked it busy in memory, and has loaded into a UNIVERSAL CALL REGISTER:

a. the line equipment number, b. the type of digit receiver, multifrequency, or dial pulse, c. the value of the pointer indicating the first table entry for the dial tone call sequence table. It will also be assumed that the line scan program has linked the chosen UNIVERSAL CALL REGISTER into the list of active UNIVERSAL CALL REGISTERS.

When the UNIVERSAL CALL SEQUENCE EXECUTIVE is next executed the pointer is read and used to access the table at an address START (see FIG. 25). This results in the execution of the routine EQDT which by using the line equipment number found in the UNIVERSAL CALL REGISTER locates an available originating junctor. It then selects an idle digit receiver of the type required which is accessible to the previously selected originating junctor group. If, due to traffic conditions no receiver is available, the contents of the Y register (FIG. 26) (start +20) is used to replace the pointer in the UNIVERSAL CALL REGISTER, otherwise the pointer is incremented by 1.

If the pointer is set to (start +20) the next routine to be called immediately following EQDT will be CGIDLE which makes the calling line idle in memory. This is followed by CLUCR which restores the UNIVERSAL CALL REGISTER to the idle state. The subscriber request for dial tone will then be ignored in this case until the next running of the line scan program.

If the receiver was available, table address (start +1) is read by the UNIVERSAL CALL SEQUENCE EXECUTIVE and the routine SCAN is executed. The purpose of this routine is to perform a direct scan on the digital receiver to see if it is indeed idle as it is possible that a hardware fault may have prevented its release from a previous connection.

Generally a direct scan is performed on peripheral circuits whenever they are selected or when their states are changed by the program. This procedure allows detection of faulty circuits before they can effect service, and it also insures that the memory is kept in step with the hardware. If the scan results do not agree with the expected state of the circuit, routine LINKSC will link the circuit into a trouble list. If SCAN finds the circuit in the expected state, the next step is to operate the "A" relay in the receiver by running the program SDIST, to operate the signal distributor. The operation of this relay results in a holding ground being provided to hold the network switches operated after the marker establishes the network connections, via operation of the HG relay. Routine SDIST will make an entry in the signal distributor queue. If the queue is full the pointer will not change and the routine will return to the UNIVERSAL CALL SEQUENCE EXECUTIVE which will serve the next UNIVERSAL CALL REGISTER. A real-time break holds this call until a queue entry is available. When the queue is loaded the pointer incremented by one and routine NEXT is executed. This functional routine never changes the pointer and will therefore be repeated on every run of the control program until the signal distributor program running on interrupt level has ascertained that the order has been executed. If the order is successful, when executed the pointer will be incremented. Otherwise the contents of register Y (start +19) will replace the pointer thus directing the call sequence into the trouble branch.

Assuming that the order has been properly executed, a directed scan will follow to ensure that the circuit has responded to the order and that the supervisory scan point is indicating properly.

The peripheral units can be considered as being split into two groups, the input peripherals (e.g., lines, digit receivers, trunks, etc.), and output peripherals (e.g., signal distributors, markers, and transmitters, etc.). The input peripherals are scanned periodically by peripheral scan programs to pick up new information as it is presented while output peripherals are scanned periodically by peripheral driver programs in order to recognize busy-free status and trouble conditions.

The lines are scanned as low priority jobs on base level, for instance at the nominal rate of once every 200 milliseconds. New requests for service are recognized by comparing the current scan report with the line status bits held in call store. Upon detecting an origination, within a given frame, a UNIVERSAL CALL REGISTER is seized and initialized as described above. Then the row to be scanned in this frame is stored and scanning resumes on the next frame. During the next scan of the frame on which the origination occurred, about 200 milliseconds later, the scan will be resumed on the scan row in which the origination occurred. This time break in the scan of a frame creates no additional dial tone delays as the marker will not finish the processing of the first call before the next scan of that frame. This scheme avoids unnecessary scanning and queuing. The number of frames scanned and the maximum number of originations accepted per scan are parameters alterable by processor load regulation routines.

Each digit receiver has assigned to it a single word in the call store. Scan programs which run on interrupt level, deposit raw scan data for multifrequency receivers into the associated call store slot. The scan programs for the dial pulse receivers count into their associated slots in both cases. Digit loading programs periodically empty these slots, store the digits in BCD format on a per receiver basis, and perform a flag translation routine as they are needed.

Trunks from step by step offices are scanned every 25 milliseconds to recognize, count, and store individual digits as they arrive. Bylink trunks and originating junctors are scanned on base level at a nominal rate of once every 200 milliseconds. This is sufficiently fast to properly discriminate between flashes and hits, and yet reduce to a minimum the real-time load which this task necessarily places on the central processing unit.

The mechanical holding time of the marker is in the neighborhood of 250 milliseconds, and a UNIVERSAL CALL REGISTER is held throughout this period. To minimize the overhead time within the UNIVERSAL CALL SEQUENCE EXECUTIVE, UNIVERSAL CALL REGISTERS which require marker operation are unlinked from the list of active UNIVERSAL CALL REGISTERS and linked into a list of UNIVERSAL CALL REGISTERS waiting for marker operations in this period. Every 12.5 milliseconds, orders which are waiting and which access free switching frames (i.e., frames on which no other marker is working) are sent to free markers. Upon completion of an order, the associated UNIVERSAL CALL REGISTER is relinked to the list of active UNIVERSAL CALL REGISTERS and processing of the call continues under UNIVERSAL CALL SEQUENCE control.

The markers need not be scanned for their busy-free status every 12.5 milliseconds, but rather time can be saved by examining the marker only when it is busy and a reply is expected.

The UNIVERSAL CALL SEQUENCE is the only program which requests signal distributor operation or release. It makes the request by calling a subroutine which in turn makes an appropriate queue entry. Requests for service are handled on a first-come first-served basis for any one signal distributor ferrod array 17–6. The ferrod array 17–6 associated with the signal distributor becomes scanned within 25 milliseconds after it has been seized. A controller is scanned 37.5 milliseconds approximately after being seized to make sure that it is free and has completed execution of the last request successfully. Output of the next order to the same controller occurs 12.5 milliseconds later, i.e., during the next interrupt period.

A new digit is sent to each active multifrequency transmitter every 75 milliseconds by the multifrequency transmitter driver. All guard timing intervals needed are provided from the same program as are the necessary maintenance and supervisory scans.

The dial pulse transmitters operate significantly differently. The program which drives these transmitters causes scanning of the pulse generator associated with each transmitter and causes the sending of signals via the peripheral bus system to connect or disconnect the pulse generator to the trunk as required, in order to send the desired digits. Interdigital timing is provided by counting 12.5 millisecond interrupts.

DETAILED OPERATION

The following will be a description of the operation of this invention, relating to figures 5 to 10 or 13 to 20. However, FIG. 4 may be used as a master drawing for orientation.

THE DIAL TONE CONNECTION

1. A subscriber at his telephone set 5–1 lifts his handset in order to initiate a request for service.

2. The associated subscriber's line loop is closed and line current flows through a ferrod sensor of the type associated with the appearance of the calling subscribers line on the line circuit switching network 1—1. A description of the ferrod sensor associated with a subscriber's line loop may be found in the Bell System Technical Journal, Vol. 44, July-August, 1965, No. 6, P. 959.

3. The scanner 3–6 via the scan return bus portion 15–3 of the peripheral bus 4–1 passes the state of a ferrod sensor into a central control 3–2 the next scanning interval.

The line scan program in central processing unit 3–2 then comes into operation, and controls the operation of the scanning means 3–6, and compares the scan return indication with a bus-idle map of the sensors interrogated in the call store 3–4.

4. The particular calling subscriber's line circuit is identified by the scanner 3–6 binary address, and the position of the scan point within a 16-bit scan return word placed on the bus. The previous time the scan point was scanned, it was indicated as being in an idle condition, and since the new state indicates a busy condition, it is recognized by the central control 3–2 that the designated subscriber has lifted his handset and the telephone is off-hook.

5. The busy/idle bit in the call store 3–4 for the indicated subscriber's line is changed to indicate a busy state.

6. Central control 3–2 then refers to a translation table contained in the program store 3–5 to determine the class of service which must be provided to the calling subscriber's line.

7. With the line location and the type of originating digit receiver required identified through the class of service information, the UNIVERSAL CALL SEQUENCE control program calls in an equipment selection program in the program store which designates an originating junctor group, irrespective of those junctors which are busy or idle in that group.

8. The originating junctor group defines the service network 2—2 required. A search is therefore made for an idle digit receiver of the type required, on that service network frame 2—2. The service network appearance of the chosen digit receiver and originating junctor group are obtainable in a table in the program and data store 3–5. This information is loaded into the appropriate position in the UNIVERSAL CALL REGISTER, together with the progress mark which is determined from the class of service of the calling line (for instance indicating a single-party line). The UNIVERSAL CALL SEQUENCE then makes an entry to operate an idle signal distributor 3–7.

9. If no idle digit receiver can be found, the program recycles back to step 7 described above, and selects another junctor group.

10. After an idle digit receiver is selected, the central control 3–2, via a signal distributor 3–7 operates a latching-type relay A in the selected digit receiver to prepare the receiver for the upcoming connection. The signal distributor is also removed from the idle circuit list in the program and data store 3–5.

11. Before sending an order to an idle marker 3–1 via the peripheral bus 4–1, central control 3–2 waits until both the specified line circuit switching network 1—1 and service network 2—2 are idle. After the program has checked that the signal distributor operation was successful, a direct scan of the calling line is made by the scan program. This is done to check that the call has not been abandoned.

12. A five-word order is then given by the central control 3–2 to the marker 3–1, specifying the two end-points of the first portion of the call, that is, the subscriber's line appearance on the line circuit switching network 1—1 and the digit receiver which are connected together, plus the group of junctors previously selected.

13. On reception of the order from the peripheral bus 4–1, the marker 3–1 performs a parity check of the contents thereof.

14. If the parity check is not satisfactory, central control 3–2 causes release of the marker and sends the order to another idle marker.

15. The marker selects all idle originating junctors out of the specified group and determines which ones can reach the given line switch.

16. If no idle junctor can be found, the progress of the call returns to step 2.

17. On a preference basis, one of the idle junctors from within the group that can reach the aforementioned line switch is selected by the marker 3–1, without further aid from the Central Processing Unit.

18. This selection now defines the input position on a particular crossbar switch of the service network 2—2.

19. A check is then made whether or not the selected junctor can reach the given digit receiver service circuit 2–3.

20. If a path cannot be found, the next preferred originating junctor 2–1 is selected.

21. If this junctor cannot reach the service circuit 2–3 through the service network 2—2, the normal marker sequence is stopped, and the central control 3–2 is advised of this via scan points sensed by the scanner 3–6.

22. The marker 3–1 is then released by means of a marker order from the central control 3–2, and the process of establishing a connection returns to step 7.

23. The new idle marker in receiving the order may or may not be one that previously failed in its task. In specifying the new order, central control attempts to select another group of originating junctors as well as another portion of the service network 2—2 and digit receiver.

24. If this marker is also unsuccessful, processing again returns to step 7. This process repeats itself continuously unless a marker is successful or the subscriber replaces his handset on his telephone, resulting in an on-hook condition.

25. In the normal or nonblocking case, after a path has been found, the marker 3–1 through the well-known network controls (not shown), operates the associated select and hold magnets for the establishment of a path through the line circuit switching network 1—1 and service network 2—2. Holding ground for all magnets in the line circuit switching network and service network is applied from the digit receiver service circuit 2–3.

26. The marker 3–1 has now completed its function and indicates on scan points which originating junctor 2–1 it has selected, and then makes itself idle. Prior to making itself idle, the numerical designation of the originating junctor used in the connection is reported to the central processing unit via the scanner, together with the numerical designation of the service network transmission path used. This information is sent from the marker to the central processing unit via the scanner, and stored in a digit receiver register (not shown) in call store 3–4. The data in the UNIVERSAL CALL REGISTER, which is required for completing the call is also transferred to the digit receiver register in the call store. The marker then releases itself and is made available for another call.

27. The connection to the digit receiver service circuit 2–3 is now established. The digit receiver is initiated via the signal distributor 3–7 from the central processing unit 3—3 in order to provide dial tone, to indicate that the system is ready to receive dialed digits. The UNIVERSAL CALL REGISTER is then released.

28. A transmission path thus now has been extended through the line circuit switching network 1—1 from the subscriber's line 1–2 leading from the telephone set 5–1, through the appropriate portion of the originating junctor 2–1, the service network 2—2, to the digit receiver service circuit 2–3. The setting up of this circuit from step 1 to step 28 normally occurs within a time period of approximately one-fourth to one-third of a second.

THE DIALING STAGE

29. A subscriber, after hearing dial tone from the digit receiver, dials the called party number on his telephone set 5–1.

30. It is preferred in this embodiment that a timing sequence be initiated to require that dialing be started within a specified time after reception of dial tone, and that the dial tone connection should be disconnected and the transmission line be connected to a source of permanent signal rather than to digit receiver if the time is exceeded. The preferred time interval is between 10 and 24 seconds, depending on the traffic load conditions, as specified by a program stored in the program store 3–5.

31. Similarly, a time limit is applied to the period between dialing one digit and the next–the interdigital time. A subscriber's line which exceeds this time period also preferably should be connected to a source of permanent tone signal.

32. After the first digit is received by the digit receiver, dial tone is removed after release of the A latching relay in the dial tone receiver which was caused to operate by the signal distributor 3–7. An entry is made in the take-down-dial-tone position in the UNIVERSAL CALL SEQUENCE. This program will then call a signal distributor 3–7 which initiates removal of the dial tone by releasing the A relay in the digit receiver service circuit.

33. The digit receiver service circuit 2–3 accepts the dialed information and makes it available to central control 3–2 via the scanner 3–6.

34. Digit analysis programs in the program store 3–5 decide as early as possible during the dialing stage the quantity of digits which are to be expected. As the dial pulses arrive at the digit register, they are scanned every 25 milliseconds, and the count is kept in the call store. A 100-millisecond check is also used to determine when a complete digit has been received. Two identical digit counts on the same counter, 100 ms. apart indicate that a digit has been completed. Therefore, a digit is considered complete when the off-hook condition persists for at least 100 milliseconds.

35. After dialing is complete, and all the digits have been received, the three digit analysis program is entered and the first three digits dialed are examined. If the call is an intraoffice call, a signal distributor order operates the B relay in the originating junctor. This eventually leads to the connection of the calling line through the route network 1–3, and provides holding ground for the hold magnets in the line circuit switching network 1—1. This releases the digit register and the path through the service network. The digit register busy-idle bit in the memory is then made idle. These signal distributor operations are under control of the UNIVERSAL CALL SEQUENCE. Holding ground for the hold magnets in the line circuit switching network 1—1 is extended by the resultant operation of the B relay in the originating junctor, through contact B–6.

36. Also, via a signal distributor 3–7, the relay previously operated to prepare the digit receiver service circuit 2–3 to receive digits, is released. This releases the digit receiver and clears the service network 2—2 connection from the digit receiver service circuit 2–3 to the originating junctor 2–1.

37. The three-digit translation program examines the first three digits in the central processing unit 3—3 after all expected digits have been received, and determines the type of call to be processed.

AN INTRAOFFICE CALL

38. With the information from the first dialed digits that the request for service should be treated as an intraoffice call, central control 3–2 translates the remaining digits into the line location of the called line 6–1 and its ringing code.

39. Central control 3–2 also considers the busy-idle bit in the call memory 3–4 as to whether the specified called line location is busy or idle, thus determining the condition of the called line 6–1.

40. If the called line is idle, an equipment selection program from the program store 3–5 selects an idle common ringing circuit 14–23 from the service circuits on the service network 2—2 which was previously used for the dial tone connection.

41. In a manner similar to preparing a digit receiver for a connection, the common ringing circuit 14–23 is prepared, by central control 3–2 causing the operation of the A latching relay by the signal distributor 3–7, and via the bus system 4–1.

42. Central control 3–2 then assembles a five word order containing all necessary information for connecting the ringing circuit to the originating junctor 2–1, and sends an order to an idle marker 3–1 via the peripheral bus 4–1.

43. After a parity check of the order, the marker selects one idle transmission path through the service network 2—2 and closes all cross-points required to form that transmission path.

44. Holding ground for the crossbar switch hold magnets, is applied by the HG relay in the ringing circuit.

45. Path establishment through the service network 2—2 causes operation of the SP splitting relay in the originating junctor 2–1 to connect individual three-wire paths from both the line circuit switching network 1—1 and route network 1-3 to the service network 2—2, as well as to isolate the line side of the originating junctor 2–1 from the route side.

46. The marker 3–1 then makes itself idle.

47. A second marker order is required to provide for the terminating portion of the call, i.e., a path through the route network 1-3, terminating junctor and line circuit switching network 1—1.

48. Central control 3–2 then determines the busy or idle status of the line circuit switching network frame associated with the called line 6–1, and of the route network 1–3 frame associated with the originating junctor 2–1.

49. If both frames are not idle, central control waits until they become idle, and then selects an idle route network frame which has the terminating junctor group 1–8 on it, which leads to the line circuit switching network 1—1.

50. All the remaining necessary information for completion of the call, including a path group through the route network 1-3 and a terminating junctor group 1–8, is assembled in a five-word order and sent to an idle marker 3-1 from central control 3–2.

51. While ordering the setting up of a transmission path through the networks, central control 3–2 also can request diagnostic tests to be performed. These include continuity, battery, ground, double connection, plus several other tests.

52. The marker then performs a parity check on the received order, before starting the search for idle paths.

53. The marker 3-1 first selects all idle paths through the line circuit switching network 1—1 from the called line 6–1 to the terminating junctors 1–8 in the specified junctor group.

54. If no idle path is found, the marker is released via a marker order from central control 3–2, and the call processing reverts to step 48.

55. One marker retrial is made. If the second marker is also unsuccessful, it is released.

56. In this circumstance, central control 3–2 then orders the connection of an overflow tone source to be connected to the calling party (see steps 82 to 86).

57. If one or more idle paths are found through the line circuit switching network 1—1 in step 51, the marker on a preference basis selects one of these paths, which thus establishes one particular terminating junctor 1–8.

58. The marker search now involves selecting all idle links through the route network 1–3, and joining the links to form complete idle paths through the route network 1-3 from the originating junctor 2–1 to the terminating junctor 1–8.

59. If no idle path can be found, the marker selects a second path through the line circuit switching network 1—1, which specifies another terminating junctor 1–8.

60. Again a search is made for idle paths through the route network 1-3.

61. If the marker is unsuccessful again, it is released and call processing reverts to step 48.

62. The new marker order attempts to define a new transmission path through the route network 1-3.

63. Only one marker retrial is made: if the second marker is also unsuccessful, it is released and a source of overflow tone is applied to the calling party line.

64. When one or more idle paths are found through the route network 1-3, the marker selects one on a preference basis.

65. There is now a complete idle path between the called line 6–1 and the originating junctor 2–1 of those which were specified by this marker order.

66. The marker closes all cross-points required to form the selected path, then makes itself idle.

67. Holding ground for the hold magnets of the cross-points in the route network 1-3 is provided from the originating junctor 2–1. Holding ground for the hold magnets relating to the cross-points in the line circuit switching network 1—1 is provided from the off-normal contact of the last hold magnet in the route network.

68. The ringing connection is now established.

69. The B relay in the common ringing circuit 14–23 is enabled via a signal distributor 3–7 to provide ringing current to the called line 6–1 and audible ring-back to the calling line 1-2.

70. When the called party removes his handset and then goes off-hook a "ring-trip" relay in the common ringing circuit 14–23 is operated.

71. Scan points described earlier in the common ringing circuit informs central control 3–2 of the off-hook condition, via the scanner 3–6.

72. Operation of the "ring-trip" relay releases the splitting relay in the originating junctor 2–1. This reestablishes the transmission path through the originating junctor, and isolates the service network 2—2 connection from the originating junctor 2-1.

73. The talking transmission path is now established. Supervision for both parties is provided by the originating junctor 2–1.

74. Via the signal distributor 3–7, central control 3–2 releases the two latching relays previously operated in the ringing circuit.

75. This causes removal of the holding ground, which releases the ringing circuit and the associated cross-points in the service network 2—2.

76. If the called party has not answered the call, the calling party would be expected to go on-hook within a "time-out" period, for instance of the order of 5 minutes. Failure to do so by the calling party is treated as a request for dial tone.

77. When either the calling or the called party replaces his handset, the disconnection of the talking path is detected by central control 3–2 via scan points of the scanner 3–6 in the originating junctor 2–1.

78. A order is sent via the peripheral bus 4–1 to the signal distributor 3–7 to release the latching relay which was operated in the originating junctor in step 35.

79. This releases the originating junctor. It also removes holding ground from the sleeve lead to drop the connection of cross-point through the line circuit switching network 1—1 and route network 1–3.

80. Thus all items used to service this particular request for service have been returned to an idle state, and are ready to serve any future requests for service.

81. In cases where only one party goes on-hook the off-hook party is locked out until he hangs up.

82. If in step 39 central control determined that the called line was busy, a source of busy tone would be applied to the calling line. The source of busy tone, like overflow and permanent signal tone sources, may be located on the terminating side of the route network 1–3.

83. To connect any one of these sources to the calling line, central control 3–2 issues an order, specifying the two end-points (in this case the originating junctor 2–1 and the particular tone source), and a group of paths through the route network 1–3 to an idle marker.

84. The marker search involves selection of all originating and terminating links connecting the specified transmission path through the route network and the two end-points, and pairing or matching of these links to form complete idle paths through the route network 1–3.

85. On a preference basis, the marker selects one of these idle paths and operates the selected hold magnets in the route network to form that path.

86. The marker makes itself idle and the particular tone is sent to the calling line.

A REVERTIVE CALL

This is a call between two subscribers on the same multiparty or two-party line.

87. After a call has progressed to step 38, central control 3–2 determines that the calling party wishes to talk to someone with the same line appearance on the line circuit switching network 1—1.

88. In step 6, during a dial tone connection, when determining the class of service, central control identifies the call as originating from either a multiparty or two-party line.

89. Central control selects and connects a ringing service circuit 2–3 in the same manner as for the intraoffice call described above. Due to special functions being required, a special ringing circuit is selected, rather than a common ringing circuit, the type used for a standard intraoffice call. No connection through the route network 1–3 is required.

90. If ringing is to be applied to the tip side of the line rather than the ring side, a signal distributor point is operated in the ringing circuit.

91. Central control 3–2 then orders the operation of a third signal distributor point from the signal distributor 3–7 in the ringing service circuit 2–3 to connect a source of busy tones to the calling subscriber. Operation of a latching relay by the signal distributor also aids in the selection of the proper ringing code.

92. The calling subscriber normally would be expected to replace his handset and therefore go on-hook within a time period of about 25 seconds. If he does not, the call is not processed.

93. If the subscriber has followed instructions as outlined in his directory and has replaced his handset, the call will proceed.

94. Central control 3–2, from scan points in the ringing circuit return through the scanner 3–6, recognizes the on-hook condition.

95. A fourth signal distributor point in the ringing circuit is operated to reverse the leads from the ringing circuit, such that the leads carrying the ringing current are connected to the line rather than to the route side of the originating junctor 2–1.

96. A fifth signal distributor point in the ringing circuit operates to apply coded ringing to the line.

97. During the time that the coded ringing is sent to the called subscriber on either the tip or ring side, revertive ringing is sent out on the opposite side. In this manner, the calling subscriber will hear one or the other of the ringing signals, depending on which side of the line he is connected to in relation to the called subscriber.

98. Either calling or called party in removing his handset from his telephone will operate a "ring-trip" relay in the ringing circuit.

99. This relay operating causes the talking transmission path to be established. Supervision for both parties is done at the line circuit switching network side of the originating junctor. Since ringing may be tripped by either party by going either off-hook, the calling subscriber should not delay any action in order not to give the called subscriber the impression that the call has been abandoned. If, of course, the called subscriber does not answer, the calling subscriber may remove his handset to stop the ringing. If neither party goes off-hook within a "time-out" period of about 3 minutes, all connections are released.

AN INTEROFFICE CALL

OUTGOING PORTION

100. After a call has progressed to step 37 in the dialing stage, central control 3–2 determines that the request for service should be treated as an outgoing call. From the translation of the office code dialed in, it also obtains the necessary routing information.

101. The program selects an idle transmitter service circuit such as 2–3 of the correct type connected to the service network 2—2 used for the dial tone connection.

102. Via the signal distributor 3–7, central control 3–2 operates a latching relay in the transmitter, depending on whether loop, E and M, or battery-ground signalling is required.

103. A marker order is assembled by central control 3—3 and sent to an idle marker 3–1 to connect the transmitter 2–3 to the originating junctor 2–1 through the service network 2—2.

104. Holding ground for the hold magnets associated with the service network 2—2 is applied from the transmitter.

105. A second marker order is required for the outgoing portion of the connection.

106. Central control 3–2 selects an outgoing trunk 1–7 of the correct type to the correct destination. 107. The outgoing trunk 1–7 defines the terminating switches of the route network 1–3, while the originating junctor 2–1 defines the originating switches.

108. Central control 3–2 therefore issues a marker order with this information, plus information containing the associated group of transmission paths through the route network 1–3.

109. If the marker cannot find an idle path between the originating junctor 2–1 and the specified trunk 1–7, the normal sequence is stopped, and the situation reported to central control 3–2 via scan points in the marker, via scanner 3–6 and peripheral bus 4–1.

110. The unsuccessful marker is released by means of a marker order and call processing reverts to step 106.

111. When assembling a new marker order, central control attempts to select another outgoing trunk.

112. If the marker receiving the new marker order is unsuccessful in finding an idle path through the route network, it is also released by a marker order.

113. Central control 3–2, via a distributor 3–7 releases the latching relay in the transmitter service circuit 2–3, which causes release of the service network transmission path through the service network 2–3, which causes release of the service network transmission path through the service network 2—2.

114. This in turn releases the talking transmission path splitting relay SP in the originating junctor 2–1.

115. Similar to the method of connecting a source of busy tone to the calling line, central control, via the marker, connects a source of overflow tone to the line (see steps 82 to 86).

116. In the normal case, where the marker finds one or more idle paths through the originating junctor to the specified trunk, it selects one on a preference basis, and caused closure of the cross-points required to form that path.

117. Holding ground for the hold magnets on the switches of the route network 1–3 connection is provided through the originating junctor 2–1.

118. Depending on whether multifrequency or dial pulse signalling is used between the two offices, central control will guide the transmitter in one of two ways:

a. If dial pulse, central control waits, of the order of 800 milliseconds, and then instructs the transmitter, via the peripheral bus 4–1 to send the necessary digits.

b. If multifrequency, central control, via the bus system 4–1, orders the transmitter to send a signal to the distant office. After receiving a "start to pulse" signal from the distant office, central control, via the bus system, orders the transmitter to send the necessary signalling information.

119. In either case, central control checks on the progress of digit transmission via the scanner 3–6, and controls the interdigital intervals via the bus system 4–1.

120. Having sent all the necessary information, central control orders the release of the signal distributor point in the transmitter, which causes release of the service network transmission path.

INCOMING PORTION

121. Central control 3–2, through the scanning of incoming trunks such as 1–6, detects a seizure signal from the calling office. (In cases of calls from step-by-step offices, where the digits are transmitted without any prior notice, special incoming trunks, called by-link trunks, may be used. These trunks are scanned at a fast enough rate that all transmitted pulses can be detected properly by central control. No incoming digit receivers are required.).

122. After detection of the seizure signal, central control 3–2 sends an order to an idle marker 3–1 to connect an incoming digit receiver service circuit 2–3 to the incoming trunk 1–6 through the service network 2—2. This is a similar procedure to connecting an originating digit receiver to an originating junctor.

123. Via a signal distributor 3–7, central control 3–2 operates a latching relay in the incoming trunk to initiate a "-start to pulse" signal to the calling office.

124. The "start to pulse" signal is then removed by release of the signal distributor point.

125. The digit receiver service circuit 2–3 accepts the transmitted information and makes it available to central control 3–2 via the scanner 3–6.

126. After reception of all digits, the digit receiver is released by release of a signal distributor point, which also causes release of the service network transmission path.

127. From the transmitted digits, central control determines that the call is to be completed in this office.

128. The succeeding steps in call completion are identical to steps 22–24 for an intraoffice call, with the incoming trunk taking the place of an originating junctor.

129. With the interoffice call established, the incoming trunk provides the supervision in the terminating office, while the originating junctor provides supervision in the originating office.

A TANDEM CALL (see FIG. 10)

130. In case of a tandem call, central control determines from the transmitted digits that the call is not to terminate in this office.

131. The incoming trunk in the tandem office is of special type because of the possibility of both local and tandem completion.

132. The procedure now followed is identical to an interoffice call, with a special incoming trunk 10–1 in the tandem office replacing the originating junctor in the originating office.

133. It should be noted that no connection is required through the line circuit switching network in the tandem office, and only for digit reception and transmission is a transmission path required through the service network 2—2.

A CALL ENCOUNTERING THE CALL WAITING FEATURE (see FIG. 11)

A subscriber at telephone set 11–1, who has the call "waiting feature," previously originated an interoffice call to the subscriber at telephone 5–1, and is presently talking thereto. At a distant office, a subscriber 11–2 wishes to talk to the subscriber at telephone set 11–1 and originates an interoffice call. This particular situation was chosen to simplify the description, although other configurations can be handled just as readily by the system.

134. The central control receives the called number.

135. In the normal manner, the translation data in the program store 3–5 yields the class of service, and the busy-idle bit in the call store 3–4 the condition of the called line.

136. Having determined that the called line is busy and has the call waiting feature, central control sends a marker order to connect a call waiting service circuit 2–3 to the incoming trunk 1–6. Any further calls to the subscriber at telephone set 11–1 will receive busy tone.

137. A second marker order connects the terminating side of the incoming trunk to the subscriber at telephone set 11–1, thus establishing a double connection.

138. The marker is used once more to connect another call waiting service circuit 11–3 to the originating junctor, also via the service network 2—2.

139. The ringing connection is now established, and call waiting service circuit 11–3 provides audible ringback to the subscriber 11–2, while call waiting service circuit 11–3 periodically splits the talking path between subscriber telephone set 11–1 and 5–1 in the originating junctor 2–1, and sends a "beep" tone (call waiting tone) to the subscriber at telephone set 11–1.

140. The subscriber at telephone set 11–1 flashes his hookswitch to notify central control that he wishes to talk to subscriber 11–2.

141. Call waiting service circuit 11–3 is initiated, via the signal distributor 3–7 to split the existing talking path between the subscribers at telephone sets 11–1 and 5–1, in the originating junctor 2–1, while still maintaining the connections from the originating junctor to both subscribers.

142. Call waiting service circuit 11–3 is initiated, via the signal distributor, to connect a talking path through the route network 1–3 between the incoming trunk 1–6 and the line circuit switching network 1—1.

143. If the subscriber at telephone set 11–1 flashes his hookswitch for a second time, the connection between the subscribers at 11–1 and trunk 1–6 is split in the incoming trunk 1–6, while the connection between the subscribers at 11–1 and 5–1 is reestablished through the originating junctor 2–1.

144. As long as either party remains off-hook, the subscriber at telephone set 11–1 can alternate between transmission paths leading to subscribers 5–1 and 11–2 as often as he desires.

145. If, for example subscriber 5–1 hangs up while subscriber at telephone set 11–1 is talking to subscriber at 11–2, the originating junctor 2–1 is released, thus releasing and freeing all equipment used for the path between subscriber at telephone set 11–1 and subscriber 5–1. Call waiting circuits 2–3 and 11–3 are also released, since the situation has been reduced to a normal interoffice call.

What is claimed is:

1. A telephone switching system comprising
a. a line circuit switching network to which line circuits are connected,
b. a destination switching network,
c. a service circuit switching network to which service circuits are connected, and
d. originating junctor means connected to the service circuit switching network, the line circuit switching network and the destination switching network, comprising:
i. input leads connected to the line circuit switching network,
ii. output leads connected to the destination switching network,
iii. first junctor switch means for connecting the input leads to the output leads via a direct metallic transmission path, under control of the control means,
iv. second junctor switch means for alternatively connecting the input leads to the output leads via a direct current-blocking transmission path, under control of the control means,
v. means for connecting transmission paths between the input leads and the service circuit switching network, and the output leads and the service circuit switching network; and
e. control means for effecting the operation of the junctor switch means in accordance with the requirements of a call.

2. A telephone switching system as defined in claim 1, wherein the originating junctor means further comprises:
a. first and second impedance compensation means connected to the input leads and output leads respectively for maintaining the nominal impedance of the input and output leads at a predetermined approximate value during calls being transmitted via trunks having a higher impedance than said nominal impedance, under control of the control means, and
b. sensory responsive means for determining the busy or idle status of the originating junctor means and for providing an indication of said status to the control means.

3. A telephone switching system as defined in claim 2 wherein the originating junctor means further comprises:
a. first supervisory means connected to the input leads for supervising the input leads,
b. second supervisory means connected to the output leads for supervising the output leads,
c. activation means for selectively activating either or both the first and the second supervisory means under control of the control means.

4. A telephone switching network as defined in claim 3 wherein, the second supervisory means comprises at least two sensitivity states, and further comprising means for detecting the presence or absence and the polarity of potential which may appear on the output leads.

5. A telephone switching system as defined in claim 3 including means for providing talking battery potential to the input leads when the first supervisory means is activated.

6. A telephone switching system comprising:
a. a line circuit switching network to which line circuits are connected,
b. a destination switching network, having input terminals and output terminals,
c. a service circuit switching network, to which service circuits are connected,
d. originating junctor means connected to the service circuit switching network, the line circuit switching network, and the destination switching network, comprising junctor switch means for providing transmission paths between the service circuit switching network and the line circuit switching network or the destination switching network or both said latter networks, and between the line circuit switching network and the destination switching network,
e. terminating junctor means interconnecting a group of the output terminals to the line circuit switching network,
f. incoming trunks connected to a group of the input terminals, and outgoing trunks connected to a second group of the output terminals,
g. control means for effecting the operation of the junctor switch means in accordance with the requirements of a call,
h. marker means for selecting an idle transmission path through each of said networks, out of predetermined groups of transmission paths,
i. scanning means for detecting the supervisory status of lines connected to the line network, junctors, trunks, service circuits, and marker means,
j. central control and memory means for storing the supervisory states of said lines, junctors, trunks, service circuits, and marker means, and for specifying said predetermined groups of transmission paths to the marker means, in response to requests for service originating from said lines.

7. A telephone switching system as defined in claim 6, wherein the marker means comprises:
a. first sensing means for sensing idle transmission paths through each of said networks, and
b. second sensing means for sensing idle originating junctor means,
c. matching means for matching said idle paths and said idle junctor means,
d. selecting means for selecting one of each of the matched said idle paths and said idle junctor means, and
e. operation means for operating said networks in response to the selection of one of said idle paths and one of said idle junctor means, to connect said selected one idle junctor means to said selected one idle path.

8. A telephone switching system as defined in claim 7 further including means connected in the scanning means for detecting and identifying said selected one said idle path and said idle junctor means.

9. A telephone switching system as defined in claim 7, including buffer storage means for temporarily storing signals which may be transmitted thereto by the central control and memory means, and in response to predetermined types of said signals, for initiating the first and second sensing means.

10. A telephone switching system as defined in claim 6, wherein the scanning means comprises:
a. a multiplicity of interrogatable current-sensitive means which may be disposed in intermittently current carrying portions of the line network, junctors, trunks, service circuits and marker means,
b. means for enabling the operation of the scanning means,
c. means for addressing one of said current-sensitive means,
d. the means for enabling and the means for addressing providing an interrogation of said current sensing means,
e. means for reading the state of saturation of said one of the current-sensitive means,
f. means for returning to the central control and memory means a signal corresponding to the state of saturation of said one of the current-sensitive means.

11. A telephone switching system as defined in claim 10, the scanning means further comprising: means for returning an enable and address correlation signal to the central control and memory means.

12. A telephone switching system as defined in claim 11 including an enable bus for transmitting an enabling signal from the central control and memory means to said enabling means, an address bus for transmitting an address signal from the central control and memory means to the scanning means, a scan return bus for transmitting the state of the current-sensitive means to the central control and memory means, and an all-seems-well bus for transmitting said correlation signal to the central control and memory means; each of said buses coupling the scanning means and the central control and memory means.

13. A telephone switching system as defined in claim 6, further comprising a. scanning means for detecting the supervisory states of lines which may be connected to the line network, junctors, trunks, service circuits, and said control means,
b. central control and memory means for storing the supervisory states of said lines, junctors, trunks, service circuits and said control means and
c. data bus means coupling the scanning means, and central control and memory means for carrying the transmission of enable and address data, and for carrying the return of supervisory state data to the central control and memory means.

14. A telephone switching system as defined in claim 13 wherein the data bus means is comprised of: an enable bus for carrying the transmission of enabling signals from the central control and memory means, an address bus for carrying the transmission of address signals from the central control and memory means, a scan return bus for carrying the transmission of supervisory state signals from the scanning means to the central control and memory means.

15. A telephone switching system as defined in claim 6, further comprising ringing means connectable to a calling and a called subscriber's line through the service circuit switching network, including means responsive to the central control and memory means for applying ringing signals to the called subscriber's line and ringback tone to the calling subscriber's line.

16. A telephone switching system as defined in claim 10 wherein the ringing means also includes means for sensing the supervisory states of the calling and called subscriber's lines and for providing an indication of said status to the central control and memory means; and means for applying or cutting off the ringing signals and ringback tone in accordance with sequence instructions stored in said memory of the central control and memory means.

17. A telephone switching system as defined in claim 16, further comprising means in the ringing means for holding operated a transmission path through the service circuit switching network during the application of ringing signals and ringback tone to the calling and called subscriber's lines.

18. A telephone switching system as defined in claim 6, further comprising:

digit receiving means connected to the service circuit switching network for indicating the central control and memory means via the scanning means, a digit transmitted from said subscribers line circuits and trunks.

19. A telephone switching system as defined in claim 18 further comprising means, in response to the connection of the digit receiving means to the service network, to the dialing of a digit, to the completion of dialing and to the reception of a hookswitch "flash," for modifying the responsive operation of the digit receiving means in accordance with sequence instructions stored in said memory of the central control and memory means.

20. A telephone switching system as defined in claim 18 further comprising pulse transmitter means connected through the service circuit switching network to an outgoing trunk for outpulsing over the outgoing trunk a series of digits identifying a trunk or a called subscriber's line.

21. A telephone switching system as defined in claim 20, further comprising, in said transmitter, first means for terminating the subscriber's line and second means for monitoring the supervisory state of the subscriber's line through the service circuit switching network, third means for monitoring the supervisory state of the outgoing trunk, and fourth means, under control of the central control and memory means for applying a series of digits to the outgoing trunk through the service network.

22. A telephone switching system as defined in claim 21, further comprising means in said transmitter for holding operated a transmission path through the service circuit switching network during the application of the series of digits to the outgoing trunk.

23. A telephone switching system as defined in claim 6, including control means connected to the central control and memory means, comprising buffer storage means for temporarily storing signals which may be transmitted thereto by the central control and memory means, and in response to predetermined types of said signals for affecting the operation of the junctor switch means, service circuits and trunks, and for effecting the operation of the marker means.

24. A telephone switching system as defined in claim 23, wherein the central control and memory means comprises a call store memory for storing the supervisory state of active lines, trunks, service circuits, and originating and terminating junctor means, a program store memory for storing call process instructions, and central processing means for receiving, processing, and transmitting signals to the marker means and to the control means in response to the change in supervisory state of a particular line, trunk, service circuit and junctor means, and to the call process instructions.

25. A telephone switching system as defined in claim 24, wherein the marker means comprises a. first sensing means for sensing idle transmission paths through each of said networks,
b. second sending means for sensing idle originating junctor means,
c. matching means for matching said idle paths and said idle junctor means,
d. selecting means for selecting one each of the matched said idle paths and said idle junctor means,
e. operation means for operating said networks in response to the selection of one of said idle paths and one of said idle junctor means, to connect said one idle junctor means to said one idle path,
f. buffer storage means for temporarily storing signals which may be transmitted thereto by the central control and memory means, and in response to predetermined types of said signals, for initiating operation of the first and second sensing means, and
g. a first number of interrogatable current sensitive means of the scanning means connected in predetermined intermittently current carrying portions of the marker means for detecting and identifying the said one idle path and said one idle junctor means for the central and memory means, the scanning means comprising:

h. a multiplicity, including said first number, of interrogatable current-sensitive means disposed in intermittently current carrying portions of the line network, junctors, trunks, service circuits, and marker means,
i. means for enabling the operation of the scanning means,
j. means for addressing one of said current-sensitive means,
k. the enabling and addressing providing an interrogation of said current-sensitive means,
l. means for reading the state of said one of the current-sensitive means, and
m. means for returning to the central control and memory means signals corresponding to the state of said one of the current-sensitive means.

26. A telephone switching system as defined in claim 24 further comprising:

a. digit receiving means connected to the service circuit switching network for indicating to the central control and memory means via the scanning means, digits transmitted from said subscriber's line circuits and trunks,
b. pulse transmitter means connected to the service circuit switching network for outpulsing over an outgoing trunk a series of digits identifying a trunk or a called subscriber's line, and
c. ringing means connected through the service circuit switching network to a calling and a called subscriber's line, including means responsive to the central control and memory means for applying ringing signals to the called subscriber's line, and ringback tone to the calling subscriber's line.

27. A telephone switching system as defined in claim 26, a. wherein the ringing means also includes means for sensing the supervisory states of the calling and called subscriber's lines, and for providing an indication of said states to the central control and memory means; and means for applying or cutting off the ringing signals and ringback tone in accordance with sequence instructions stored in said memory of the central control and memory means, b. said pulse transmitter comprising first means for terminating the subscriber's lines, second means for monitoring the supervisory states of the subscriber's line through the service circuit switching network, third means for monitoring the supervisory state of the outgoing trunk, and fourth means, under control of the central control and memory means, for applying a series of digits to an outgoing trunk through the service circuit switching network.

28. A telephone switching system as defined in claim 26 wherein the originating junctor means comprises:

a. input leads connected to the line circuit switching network, b. output leads connected to the destination switching network, c. first supervisory means connected to the input leads for supervising the states of the input leads, d. second supervisory means connected to the output leads comprising at least two sensitivity states, and including means for detecting the presence, and its polarity, or the absence, of potential which may appear on the output leads, e. activation means for selectively activating either or both the first and second supervisory means under control of the control means, and means for providing talking battery potential to the input leads when the first supervisory means is activated.

29. A telephone switching system as defined in claim 26 including:

a. an enable bus for transmitting an enabling signal from the central control and memory means to the scanning means, marker means, control means, and pulse transmitting means, b. an address bus for transmitting an address signal from the central control and memory means to the scanning means, marker means, control means, and pulse transmitting means, c. a scan return bus for transmitting the state of the current sensitive means in the scanning means, to the central control and memory means, and d. an all-seems-well bus for transmitting an address correlation signal to the central control and memory means;

e. the scan return and all-seems-well buses coupling the scanning means and the central control and memory means, and the enable and address buses coupling the scanning means, marker means, control means and pulse transmitting means.

30. A telephone switching system as defined in claim 26, wherein the marker means comprises:

a. first sensing means for sensing idle transmission paths through each of said networks, b. second sensing means for sensing idle originating junctor means, c. matching means for matching said idle paths and said idle originating junctor means, d. selecting means for selecting one each of the matched said idle paths and said idle junctor means, e. operation means for operating said networks in response to the selection of one of said idle paths and one of said idle junctor means, to connect said one idle junctor means to said one idle path, f. buffer storage means for temporarily storing signals which may be transmitted thereby by the central control and memory means, and in response to predetermined types of said signals, for initiating operation of the first and second sensing means, and g. first number of interrogatable current sensitive means of the scanning means connected in predetermined intermittently current carrying portions of the marker means, for detecting and identifying the said one idle path and said one idle junctor means for the central and memory means, the scanning means comprising:

h. a multiplicity, including said first number, of interrogatable current-sensitive means disposed in intermittently current carrying portions of the line network, junctors, trunks, service circuits, and marker means, i. means for enabling the operation of the scanning means, j. means for addressing one of said current-sensitive means, k. the enabling and addressing providing an interrogation of said current-sensitive means, l. means for reading the state of said one of the current-sensitive means, and m. means for returning to the central control and memory means signals corresponding to the state of said one of the current-sensitive means, wherein the originating junctor means comprises:

n. input leads connected to the line circuit switching network, o. output leads connected to the destination switching network, p. first supervisory means connected to the input leads for supervising the state of the input leads, q. second supervisory means connected to the output leads comprising at least two sensitivity states, and means for detecting the presence, and its polarity, or the absence of potential which may appear on the output leads, r. activation means for selectively activating either or both the first and second supervisory means under control of the control means, and means for providing talking battery potential to the input leads when the first supervisory means is activated, further including:

s. an enable bus for transmitting enabling signals from the central control and memory means to the scanning means, marker means, control means, and pulse transmitting means, t. an address bus for transmitting address signals from the central control and memory means to the scanning means, marker means, control means, and pulse transmitting means, u. a scan return bus for transmitting the saturation states of the current-sensitive means in the scanning means, to the central control and memory means, and v. an all-seems-well bus for transmitting an address correlation signal to the central control and memory means;

w. the scan return and all-seems-well buses coupling the scanning means and the central control and memory means, and the enable and address buses coupling the scanning means, marker means, control means and pulse transmitting means.

* * * * *